United States Patent
Sato et al.

[11] Patent Number: 5,926,294
[45] Date of Patent: Jul. 20, 1999

[54] THREE-DIMENSIONAL IMAGE DISPLAY DEVICE HAVING AN ELEMENTARY HOLOGRAM PANEL AND METHOD FOR MANUFACTURING THE ELEMENTARY HOLOGRAM PANEL

[75] Inventors: Shunichi Sato; Koushi Koide, both of Chiba, Japan

[73] Assignee: Sharp Kabushiki Kaisha, Osaka, Japan

[21] Appl. No.: 08/764,361

[22] Filed: Dec. 12, 1996

[30] Foreign Application Priority Data

Dec. 12, 1995 [JP] Japan .................................... 7-323296
Aug. 5, 1996 [JP] Japan .................................... 8-206203

[51] Int. Cl.⁶ ............................. G03H 1/26; G03H 1/22
[52] U.S. Cl. ............................................ 359/22; 359/32
[58] Field of Search ................................. 359/11, 10, 22, 359/25, 32, 33, 567

[56] References Cited

U.S. PATENT DOCUMENTS

| 5,042,909 | 8/1991 | Garcia, Jr. et al. . |
| 5,187,597 | 2/1993 | Kato et al. ................................. 359/22 |
| 5,301,062 | 4/1994 | Takahashi et al. ...................... 359/567 |
| 5,506,701 | 4/1996 | Ichikawa .................................. 359/15 |

FOREIGN PATENT DOCUMENTS

| 56-500313 | 3/1981 | Japan . |
| 4-311916 | 11/1992 | Japan . |
| 6-82612 | 3/1994 | Japan . |
| 6-186901 | 8/1994 | Japan . |
| WO 80/02218 | 10/1980 | WIPO . |

*Primary Examiner*—Thong Nguyen
*Assistant Examiner*—Jared Treas
*Attorney, Agent, or Firm*—Dike, Bronstein, Roberts & Cushman, LLP; David G. Conlin

[57] ABSTRACT

A three-dimensional image display device capable of displaying a wide screen three-dimensional image which one can easily observe from any position and direction in the same way as viewing an existing object and which device can select display conditions not to allow a three-dimensional image to be semi-transparent, and a method for making said device. Three-dimensional image data includes image data and data on relative positions of each image point (pixel). A screen panel is composed of a plurality of elementary holograms for producing diffracted light for forming each point-image on a three-dimensional image (said elementary hologram is prepared by the method according to the present invention). On the basis of the three-dimensional image data, a control computer controls a modulator and X-Y deflector so that elementary holograms on the screen panel is illuminated one by one with modulated light by raster scanning of a laser light to represent a three-dimensional image composed of point-images. Modulation control is conducted by judging each point-image to be seen and selecting relating elementary holograms to be illuminated.

14 Claims, 41 Drawing Sheets

MICRO-AREA IN A CELL

THREE-DIMENSIONAL IMAGE DISPLAY DEVICE HAVING AN ELEMENTARY HOLOGRAM PANEL AND METHOD FOR MANUFACTURING THE ELEMENTARY HOLOGRAM PANEL

BACKGROUND OF THE INVENTION

A three-dimensional display using holography is well known as a display for producing a three-dimensional image in a space. The holography is a technique of recording and reproducing a three-dimensional image by recording both an amplitude and a phase of a light wave on a plane. A three-dimensional image thus produced can be seen at different angles from different viewing points. In comparison with other methods, this method can produce natural three-dimensional image that can satisfy all physiological factors (i.e., parallax, convergence, eye accommodation and so on) of human eyes when recognizing a stereoscopic subject.

A hologram to be used therein is prepared by recording a pattern produced by interference occurred between light scattered from an object (signal beam) and light from the other direction (reference beam). When the hologram is illuminated by light of the same wavelength as the reference light, it acts as a, diffraction grating and reproduces the same wave fronts as the original signal light, thus forming an object image in a space.

The holographic display usually represents a still picture, but several methods have been proposed to represent holographic moving pictures. One of the methods is the real-time video-holography display which was developed by Professor Benton et. al. of the MIT Media Laboratory.

In the real-time video-holography display, a hologram signal of a three-dimensional image is computed and inputted into an acousto-optic modulator (AOM). The laser light modulated by the AOM is scanned vertically by a galvanic mirror and horizontally by a polygon mirror.

Although the AOM can not simultaneously display all holograms necessary for reproducing a three-dimensional image, it can display holograms corresponding to a whole image within a specified duration by vertical and horizontal scans.

The horizontal scanning by the polygon mirror also compensates a flow of interference fringes, thus acting upon an image to be still. As a diffraction angle of light from the AOM is about 3 (degrees), the hologram is reduced in size to form an image through a reducing optical lens system, thus obtaining a visible area 5 to 6 times as large as the diffraction angle.

The use of the above-mentioned scanning and reducing optical systems can produce a virtual hologram about an output lens, which can be seen as a three-dimensional image through the output lens and a diffusing plate. The diffusing plate diffuses the light in a vertical direction to widen the visible area.

A monochromatic display system is as described above. A color display system can be realized by using three AOMs which correspond to three color lasers, respectively, a helium-neon (He—Ne) red laser of 632.8 nm, a neodymium-dopted (Nd) YAG green laser of 532.0 nm and a helium-cadmium (He—Cd) blue laser of 441.6 nm.

Japanese Laid-Open Patent Publication No. 6-186901 discloses a three-dimensional image display device which is simple in construction and capable of producing a holographic three-dimensional image.

In the display device, a laser beam emitted from a laser is enlarged through an enlarging lens and then falls as a reference beam onto a specified area on a hologram disc which can be rotated by a motor.

In this instance, the hologram disk has a plurality of holograms disposed in a circle thereon and bonded thereto. Each hologram is prepared so as to reproduce a virtual image of a point light source at a different position in a three-dimensional space.

Consequently, as the hologram disk is rotated from the motor, the holograms can be illuminated one by one by a reference laser beam, subsequently reproducing a virtual image of a point light source at plural different points in a three-dimensional space.

When holograms are formed so that virtual images of a point light source may be densely reproduced as, e.g., rectangles arranged in rows and columns of a matrix, each being disposed at respective different positions in a three-dimensional space, a desired image according to image signals can be reproduced by suitably selecting and displaying virtual images of these point light sources in the matrix. A rectangular box is floating in a space can be seen when all virtual images are lightened.

Japanese Laid-Open Patent Publication No. 6-82612 discloses a three-dimensional image display device using a diffraction grating array. In a diffraction grating array which is a plane substrate whereon a plurality of cells consisting of diffraction gratings is arranged. The cells are divided into areas corresponding to pixels of respective parallax images to represent a three-dimensional image. This method is featured by producing an image having a parallax.

In this conventional device, a diffraction grating array is prepared by arranging a plurality of cells, each consisting of a plurality of pixels on a flat substrate. Each cell is spatially divided by the pixels into areas with near slope and distance of gratings and the areas of the pixels correspond to respective parallax images. The diffraction grating array is used as a basic device capable of displaying a three-dimensional image having a parallax.

Another well known conventional three-dimensional image display with a diffraction grating array comprises a diffraction grating array, liquid crystal display elements, which are spatial light-modulating elements disposed behind the diffraction grating array, and color filters disposed behind the liquid crystal display elements. If a micro-area is observed in this three-dimensional image display, a color filter layer selects light of a certain wavelength from white incident light and a liquid crystal element selects transmission or shut-off of light. The transmitted light reaches a diffraction grating array.

The diffraction grating array made of light-transmitting resin plate or the like material diffracts light passing therethrough. The outgoing direction of the diffracted light is decided by the diffraction angle of the light which depends upon the gradient and the intergrating space of the microarea. This microarea is bright with the selected wavelength light when being observed from the diffraction angle direction of the light. A three-dimensional image can be produced by controlling each of microareas according to the total image to be produced.

Another conventional three-dimensional image display for reproducing a stereo-image in a space is based upon a volume scanning method. This type three-dimensional image display is featured in that it does not require an observer to use special glasses and can produce a three-dimensional image to be naturally focused.

The volume scanning type three-dimensional image display system is composed basically of a laser light source, a modulator, an X-Y deflector, a control computer, an image data memory and a screen panel.

The operation of the display is as follows:

Data on a three-dimensional image to be displayed is first prepared and the screen panel moves at a constant speed over the image starting from an initial display position to an end display position and instantly returns to the initial position, then repeats the same movement. Sections of a three-dimensional image, which correspond respective positions of the screen panel, are scanned by raster scanning with laser beams through the modulator and the X-Y deflector under the control of the control computer. The rasters of laser light are subsequently projected on the screen panel. A three-dimensional image is seen by the after image of vision in a space defined by the area×the movement stroke of the screen panel if the movements of the screen panel and the laser light are sufficiently rapid and synchronized with each other.

A real image type three-dimensional image display is described in Japanese Laid-Open Patent Publication No. 56-500313. The principle of this prior art device is as follows:

Light-emitting elements such as LED are two-dimensionally disposed to form a plane with a light-emitting element array which rotates about an axis being within the plane to produce a three-dimensional video by the after image of vision.

A three-dimensional image display using diffraction gratings is disclosed in Japanese Laid-Open Patent Publication No. 4-311916. This prior art device is based upon the method of deflecting light beams crosswise relative to incident light by using a diffraction grating which is prepared by disposing dot-like diffraction patterns on a plain substrate.

A liquid-crystal spatial light-modulator attached tight to the diffraction grating panel substrate is driven from a liquid crystal drive to rearrange a right parallax image and a left parallax image into an image which can be recognized as three-dimensional video according to the principle of stereogram.

The above-mentioned real-time video holography display, however, requires considerable time to compute interference fringes of a three-dimensional image, a large capacity data memory for storing a large amount of calculation results and high-speed data transmission. It is, therefore, much difficult to display a large-size three-dimensional image.

The three-dimensional image display using holograms involves such problems that a large size hologram must be prepared for representing a large size three-dimensional image and be driven by a large-sized driving mechanism and, furthermore, a three-dimensional image to be observed by one person can be prepared with processed hidden lines but a three-dimensional image to be observed by a number of persons is in principle semi-transparent to its rear side. The three-dimensional image display using an array of diffraction gratings can represent three-dimensional image only using a hologram.

The volumetric scanning type display can only provide a semi-transparent three-dimensional image to be seen to the rear side similarly to the case of the hologram type display.

The prior art device described in Japanese Laid-Open Patent Publication No. 56-500313 can not process hidden line and hidden dots in principle and reproduces an image with hidden lines and dots, which is limited to use.

The prior art device described in Japanese Laid-Open Patent Publication No.4-311916 is based upon stereogram system requires a viewer to look two parallax images by left eye and right eye respectively. This may tire the eyes of the viewer when viewing it for a long time.

As described above, the conventional three-dimensional display devices are difficult to represent a large-size stereo-image and may tire the eyes of viewers in particular when viewing stereogram type images.

The semi-transparent images in which the rear side also appears can be used for very limited applications such as three-dimensional representation of a CT image having previously cut fragments, air-traffic control radar display for indicating spatial locations of aeroplanes and the like.

SUMMARY OF THE INVENTION

The present invention relates to a three-dimensional image display device for displaying a three-dimensional object and particularly to a three-dimensional display device which can change a representable image by controlling illuminating light for each of diffraction elements (element holograms) composing a still screen panel to form a three-dimensional image represented by light from the diffraction elements, which can be observed from a wide angle of vision, and a method of preparing elementary holograms for use in the display.

The present invention is directed to provide a three-dimensional image display device which can represent a wide-screen three-dimensional image, form an a three-dimensional image allowing each observer to view from any desired position as if viewing an actually existing object, process hidden lines and points of the formed image and select such displaying conditions that the three-dimensional image may not be semi-transparent and may be used for wider application. The present invention is also directed to provide a method of easily manufacturing a screen panel to be used in the above-mentioned three-dimensional display device.

Accordingly, an object of the present invention is to provide (1) a three-dimensional image display device which comprises a screen panel, modulated-light generating means for generating coherent light and being capable of designating illuminating places on the screen panel and modulations for the illuminating places, data inputting means for inputting data on three-dimensional image to be displayed and image display control means for controlling the modulated-light generating means according to the three-dimensional image data entered by the data inputting means wherein the screen panel is composed of a plurality of diffraction elements prepared according to data of a three-dimensional image to be displayed, the image display control means controls the modulated-light generating means to illuminate the diffraction elements by modulated coherent light beams respectively so that the light beams effecting respective diffraction elements can represent different point-images depending upon characteristics of the diffraction elements prepared according to the three-dimensional image data, and output light is controlled by control means so that it may be adapted for representing a content of an image with an increased reality of a three-dimensional object.

(2) An other object of the present invention is to provide a three-dimensional image display device as defined in item (1), characterized in that plural diffraction elements composing the screen panel form the same point-image and respective diffraction elements of the plural diffraction elements divide a visible area of an image.

(3) Another object of the present invention is to provide a three-dimensional image display device as defined in item (1) or (2), characterized in that the modulated-light generating means comprises means for generating coherent light-beams, light-modulating means for modulating the coherent light-beams and scanning means for two-dimensionally scanning with the light-beams from the modulating means so that functions of the modulated-light generating means are conducted by the above-mentioned separate means respectively.

(4) Another object of the present invention is to provide a three-dimensional image display device as defined in item (3), characterized in that the scanning means for two-dimensionally scanning can scan the screen panel with parallel light beams repeatedly within a specified scanning area and thereby allows effective use of displaying surface of the screen panel by the light beams while scanning the screen panel. This can increase the efficiency of using a space of the device, making it easier to prepare necessary elementary holograms.

(5) Another object of the present invention is to provide a three-dimensional image display device as defined in any one of items (1) to (4), characterized in that the diffraction elements are elementary holograms whereby a screen panel can be composed of pixels which are easy to prepare and have excellent characteristics.

(6) Another object of the present invention is to provide a three-dimensional image display device as defined in item (5), characterized in that the modulated-light generating means comprises a light source for generating coherent light, an optical system for enlarging a diameter of a light beam from the light source and a liquid crystal spatial modulator being capable of adjusting the light transmittance and disposed in a path for the light-beam enlarged in diameter by the optical system, and the screen panel composed of the diffracting elements being elementary holograms and the liquid-crystal spatial modulator are integrated with each other so that each of the holograms may be illuminated with light whose quantity is regulated by the liquid-crystal spatial modulator.

(7) Another object of the present invention is to provide a three-dimensional image display device as defined in item (5) or (6), characterized in that the screen panel composed of the diffracting elements being elementary holograms is made of reflecting type which is capable of representing a three-dimensional image on its upper portion on the incident side of the reproduced light.

(8) Another object of the present invention is to provide a three-dimensional image display device as defined in item (5) or (6), characterized in that the screen panel composed of the diffracting elements being elementary holograms is made of transmission type that is capable of representing a three-dimensional image on its upper portion on the outgoing side of the reproduced light.

(9) Another object of the present invention is to provide a three-dimensional image display device as defined in item (8), characterized in that a transparent substrate is interposed between the liquid-crystal spatial modulator and the screen panel composed of the diffracting elements being elementary holograms to adjust an incident light angle in respect to the liquid-crystal spatial modulator so that zero-degree diffracted light can be brought out of a visible area.

(10) Another object of the present invention is to provide a three-dimensional image display device as defined in any one of items (1) to (9), characterized in that the screen panel is composed of two or more sheets of screen panels overlaid on each other so that it can represent more point-images and a larger three-dimensional image thereon.

(11) Another object of the present invention is to provide a three-dimensional image display device as defined in any one of items (1) to (10), characterized in that the screen panel has a curved surface to increase a visible area.

(12) Another object of the present invention is to provide a three-dimensional image display device as defined in any one of items (1) to (11), characterized in that a light-diffusing plate capable of acting upon light beams forming a three-dimensional image is added to obtain a wider visible area and to represent more point-images and a larger three-dimensional image thereon.

(13) Another object of the present invention is to provide a three-dimensional image display device as defined in any one of items (5) to (12), characterized in that each elementary hologram in the elementary hologram panel can represent a plurality of dot-images to represent more point-images and a larger three-dimensional image thereon.

(14) Another object of the present invention is to provide a method for preparing an elementary hologram panel composed of a plurality of elementary holograms, each hologram serving as an optical element, which includes steps of:

tightly disposing a hologram recording material between a reflection optical element for reflecting and focusing incident plane-wave light to a point and a mask covering the reflecting optical element and having a plurality of openings made therein according to a specified distribution pattern;

illuminating the masked side of the recording material by coherent light; and exposing the hologram recording material to light entered through the openings in the mask and light entered through the openings in the mask and then reflected by the reflecting optical element to form a record of dot-like patterns on the hologram recording material according to the opening patterns of the mask. This proposed method can easily prepare a reflection-type hologram for point-images in respective divisions of a visible area by forming interference patterns corresponding to openings made in the mask.

(15) Another object of the present invention is to provide a method for preparing an elementary hologram panel as defined in item (14), characterized in that a reflection-type hologram is used as the reflecting optical element to make the optical element be flat and thereby be easier to manufacture.

(16) Another object of the present invention is to provide a method for preparing an elementary hologram panel composed of a plurality of elementary holograms, each hologram serving as an optical element, which comprises steps of:

tightly disposing a hologram recording material between a transmitting optical element for transmitting and focusing incident plane-wave light at a point and a mask covering the transmitting optical element and having a plurality of openings made therein according to a specified distribution pattern; illuminating the masked side of the hologram recording material by coherent light; and exposing the hologram recording material by light entered through the openings in the mask and light entered through the openings in the mask and then acting upon the transmitting optical element to form a record of dot-like patterns on the hologram recording material according to the opening patterns of the mask. This proposed method can easily prepare a transmission-type hologram for point-images in respective divisions of a visible area by forming interference patterns corresponding to openings made in the mask.

(17) Another object of the present invention is to provide a method for preparing an elementary hologram panel as defined in item (16), characterized in that a transmission-type hologram is used as the transmitting optical element to make the optical element be flat and thereby be easier to manufacture.

(18) Another object of the present invention is to provide a method for preparing an elementary hologram panel as defined in any one of items (14) to (17), characterized in that a spatial light-modulator is used as the mask, which modulator can form openings by controlling light-transmittance so that holograms can be recorded precisely in respective openings. This can also realize real-time rewriting a mask-pattern.

BRIEF DESCRIPTION OF THE DRAWINGS

(FIGS. 12 to 15 illustrate respective states of different elementary holograms.)

FIG. 13 is a view showing another operation state of the screen panel used in the three-dimensional image display device according to the first embodiment of the present invention. (FIGS. 12 to 15 illustrate respective states of different elementary holograms.)

FIG. 14 is a view showing another operation state of the screen panel used in the three-dimensional image display device according to the first embodiment of the present invention. (FIGS. 12 to 15 illustrate respective states of different elementary holograms.)

FIG. 15 is a view showing another operation state of the screen panel used in the three-dimensional image display device according to the first embodiment of the present invention. (FIGS. 12 to 15 illustrate respective states of different elementary holograms.)

PREFERRED EMBODIMENT OF THE INVENTION

Prior to explaining preferred embodiments of the present invention, conventional three-dimensional image display devices to be referred as prior arts will be first described as follows:

A conventional three-dimensional display using holography has been well known as a display for producing a three-dimensional image in a space. The holography is a technique of recording and reproducing a three-dimensional image by recording both an amplitude and a phase of a light-wave on a plane. A three-dimensional image thus produced can be seen at different angles from different viewing points. In comparison with other methods, this method can produce a natural three-dimensional image that can satisfy all physiological factors (i.e., parallax, convergence, eye accommodation and so on) of human eyes when recognizing a stereoscopic subject.

A hologram to be used therein is prepared by recording a pattern produced by interference occurred between light scattered from an object (signal beam) and light from the other direction (reference beam). When the hologram is illuminated by light of the same wavelength as the reference light, it acts as a diffraction grating and reproduces the same wave front as the original signal light, thus forming an object image in a space.

Figure 1:
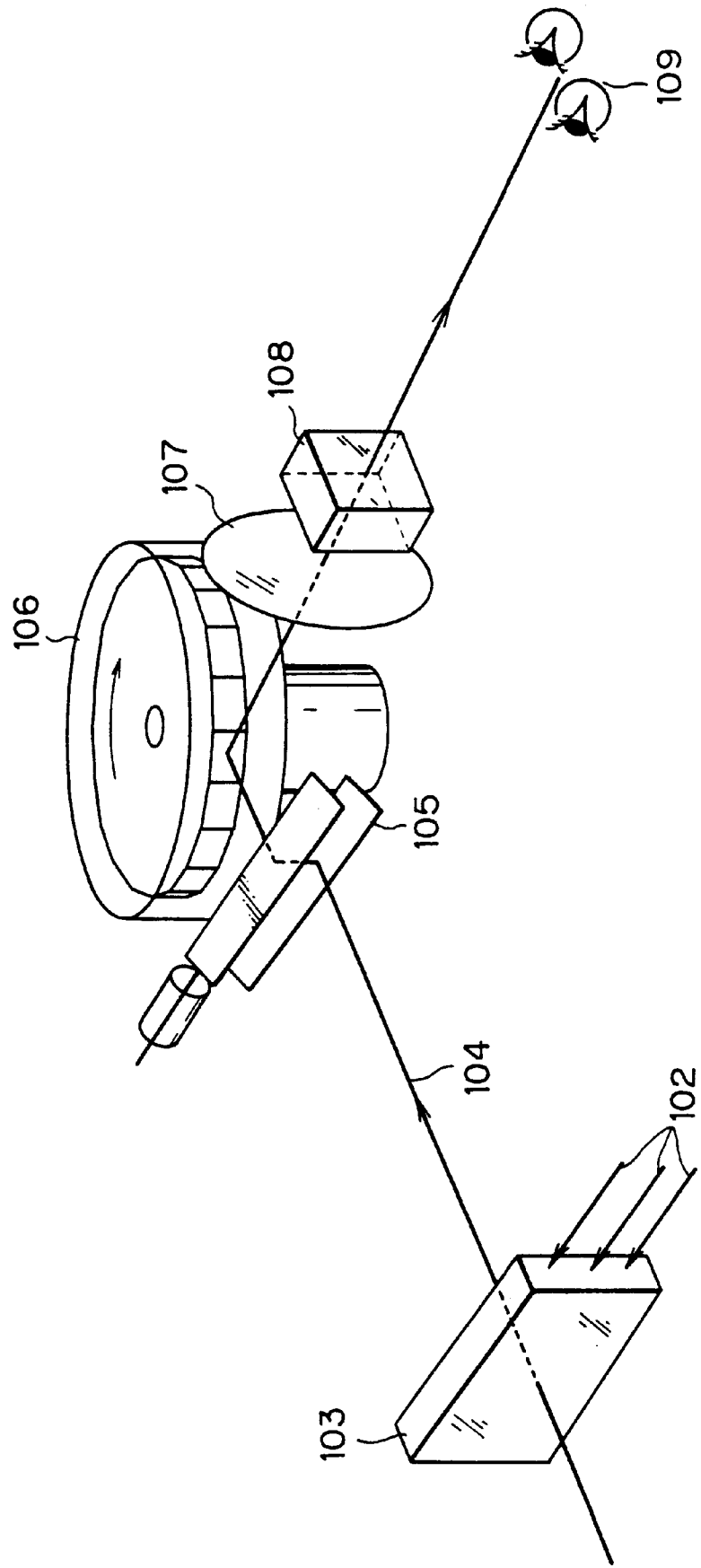
FIG. 1 is a schematic view of a conventional real-time video-holographic display.

The holographic display usually represents a still picture, but several methods for producing holographic moving pictures have been proposed. One of the methods is the real-time video-holography display which was developed by Professor Benton et. al. of the MIT Media Laboratory. FIG. 1 schematically illustrates the real-time video-holographydisplay.

In FIG. 1, a hologram signal 102 of a three-dimensional image 108 is computed by a computer (not shown) and inputted into an acousto-optic modulator (AOM) 103. The laser light modulated by the AOM 103 is scanned vertically by a galvanic mirror 105 and horizontally by a polygon mirror 106.

Although the AOM 103 can not simultaneously display all holograms necessary for reproducing a three-dimensional image 108, it can display holograms corresponding to a whole image within a specified duration by vertical and horizontal scans.

The horizontal scanning by the polygon mirror 106 also compensates a flow of interference fringes passing through the AOM103, thus causing an image to be still. As a diffraction angle of light from the AOM 103 is about 3 (degrees), the hologram is reduced in size to form an image through a reducing optical system (e.g., an output lens) 107, thus obtaining a visible area 5 to 6 times as large as the diffraction angle.

The use of the above-mentioned scanning and reducing optical systems can produce a virtual hologram near the output lens 107, which can be seen as a three-dimensional image 108 through the output lens 107 and a diffusing plate (not shown). The diffusing plate diffuses the light in a single vertical direction to widen the visible area.

Although the display system shown in FIG. 1 is monochromatic, it can be modified to be a color display system by using three AOMs which correspond to three color lasers, respectively, a helium-neon (He—Ne) red laser of 632.8 nm, a neodymium-dopted (Nd) YAG green laser of 532.0 nm and a helium-cadmium (He—Cd) blue laser of 441.6 nm.

Japanese Laid-Open Patent Publication No. 6-186901 discloses a three-dimensional image display device which is simple in construction and capable of producing a holographic three-dimensional image. This display is schemaically illustrated in FIG. 2.

Figure 2:
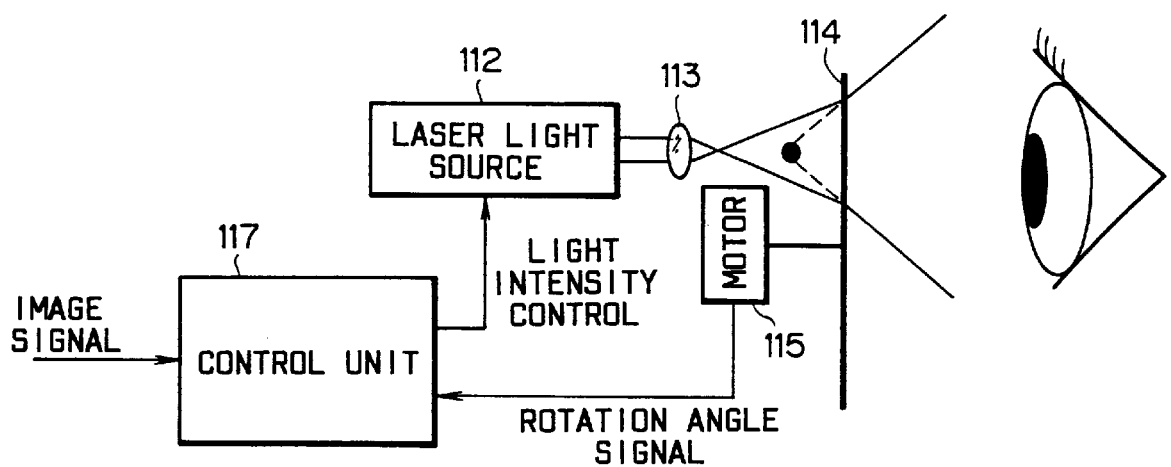
FIG. 2 is a schematic view of another conventional three-dimensional image display using holograms.

In FIG. 2, a laser beam emitted from a laser light source 112 is enlarged through an enlarging lens 113 and then falls as a reference beam onto a specified area on a hologram disc 114 which is rotatable by a motor 115.

Figure 3:
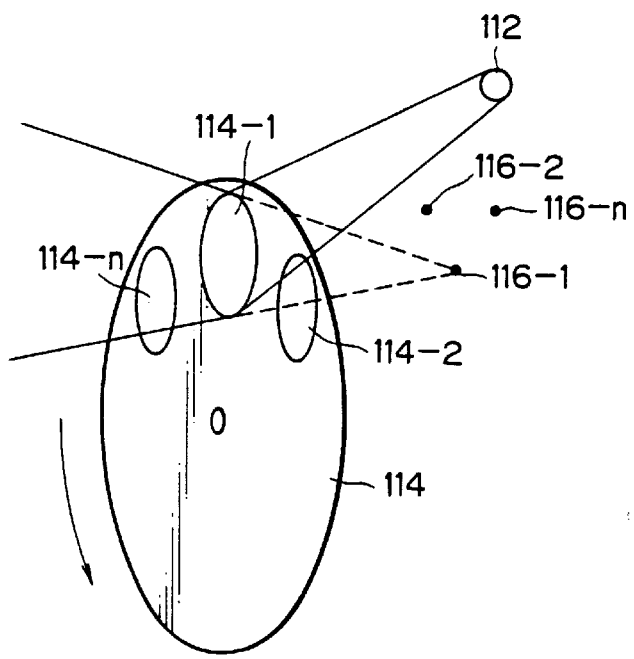
FIG. 3 is illustrative of holograms to be used in a conventional three-dimensional image display device used in the display as shown in FIG. 2.

In this instance, the hologram disc 114 has a plurality of holograms 114-1, 114-2, . . . , 114-n circularly disposed thereon and bonded thereto as shown in FIG. 3. The holograms 114-1, 114-2, . . . , 114-n are prepared so as to reproduce a virtual images 116-1, 116-2, . . . , 116-n of a point light source at different positions in a 3-dimensional space.

Consequently, as the hologram disc 114 is rotated from the motor 115, the holograms 114-1, 114-2, . . . , 114-n can be illuminated one by one with a reference laser beam, subsequently reproducing respective virtual images of pointlight sources at different points in a three-dimensional space.

When holograms 114-1, 114-2, . . . , 114-n are formed so that virtual images of point-light sources may be densely reproduced at respective different positions in a threedimensional space as, e.g., rectangles arranged in rows and columns of a matrix, it becomes possible to reproduce a desired image according to image signals by suitably selecting and displaying virtual images of these point-light sources in the matrix. In this case, a rectangular box floating a space is displayed when all virtual images are lightened.

Figure 4:
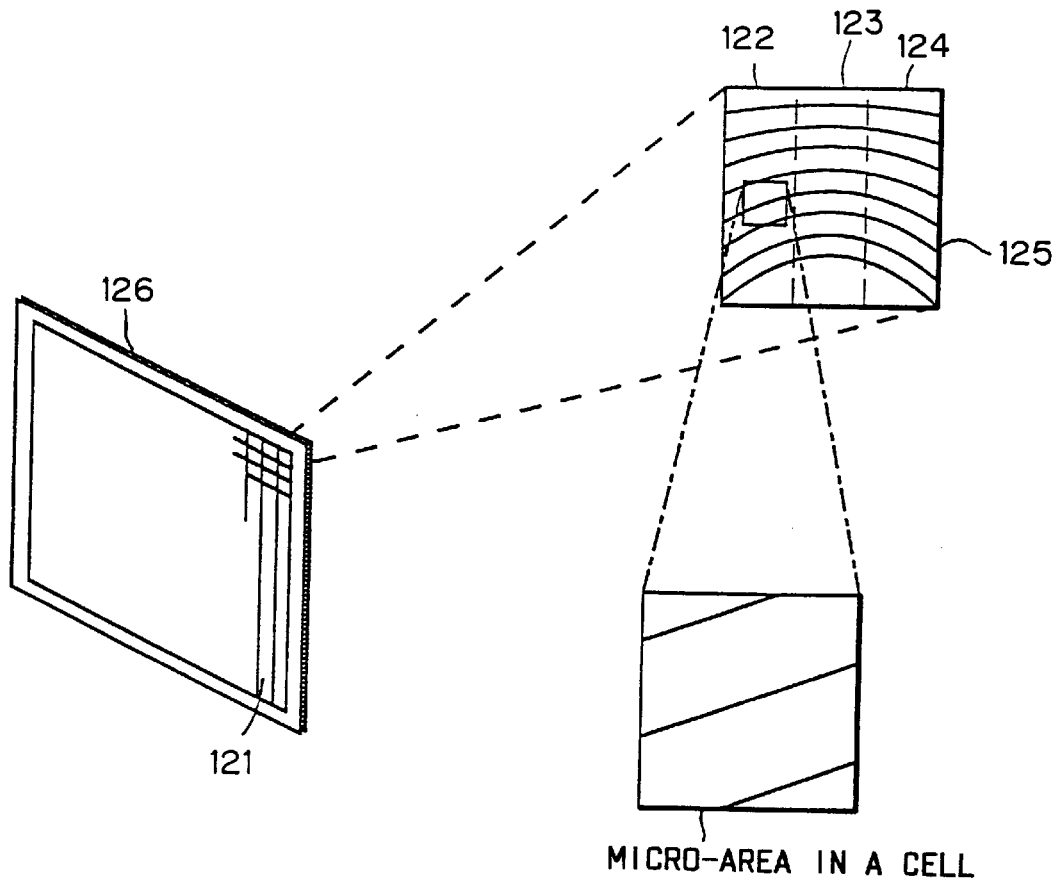
FIG. 4 is illustrative of arrays of diffraction elements to be used in another conventional three-dimensional image display device using holograms.

Japanese Laid-Open Patent Publication No. 6-82612 discloses a three-dimensional image display device using a diffraction grating array. In a diffraction grating array which is a plain substrate whereon a plurality of cells consisting of diffraction gratings is arranged in rows and columns. The cells are divided into areas corresponding to pixels of respective parallax images for representing a threedimensional image. This method is featured by producing an image having a parallax. FIG. 4 is a schematic view of a diffraction grating array for use in a three-dimensional display device. In FIG. 4, a diffraction grating array 121 is a flat substrate 126 which has thereon a plurality of cells 125 each of which consists of a plurality of pixels 122, 123, 124. Each cell 125 is spatially divided by the pixels 122, 123 and 124 into areas with near slope and distance of gratings and the areas of the pixels 122, 123 and 124 correspond to respective parallax images. The diffraction grating array 121 is used as a basic device capable of displaying a threedimensional image having a parallax.

Figure 5:
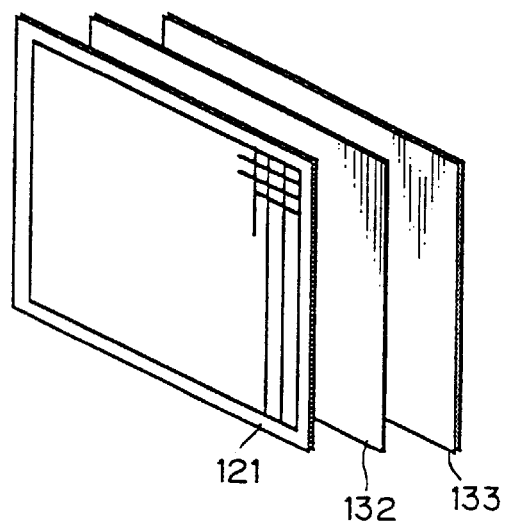
FIG. 5 is a schematic view of a conventional three-dimensional image display using the same diffraction elements as shown in FIG. 4.

FIG. 5 is a schematic view showing an essential portion of a three-dimensional display device using a diffraction grating array 121.

In FIG. 5, the three-dimensional display device comprises a diffraction grating array 121, liquid crystal display elements 132, which are spatial light modulating elements disposed behind the diffraction grating array, and color filters 133 disposed behind the liquid crystal display elements 132. If a microarea is observed in this threedimensional image display, a color filter layer 133 selects light of a certain wavelength from white incident light and a liquid crystal element 132 selects transmission or shut-off of light. The transmitted light reaches a diffraction grating array 121.

The diffraction grating array 121 is made of lighttransmitting resin plate or the like material and diffracts light passing therethrough. The outgoing direction of the diffracted light is decided by the diffraction angle of light which is dependent on the gradient and the intergrating space of the microarea. This microarea is bright with the selected wavelength light when being observed from the diffraction angle direction of the light. A three-dimensional image can be produced by controlling each of microareas according to the total image to be produced.

Figure 6:
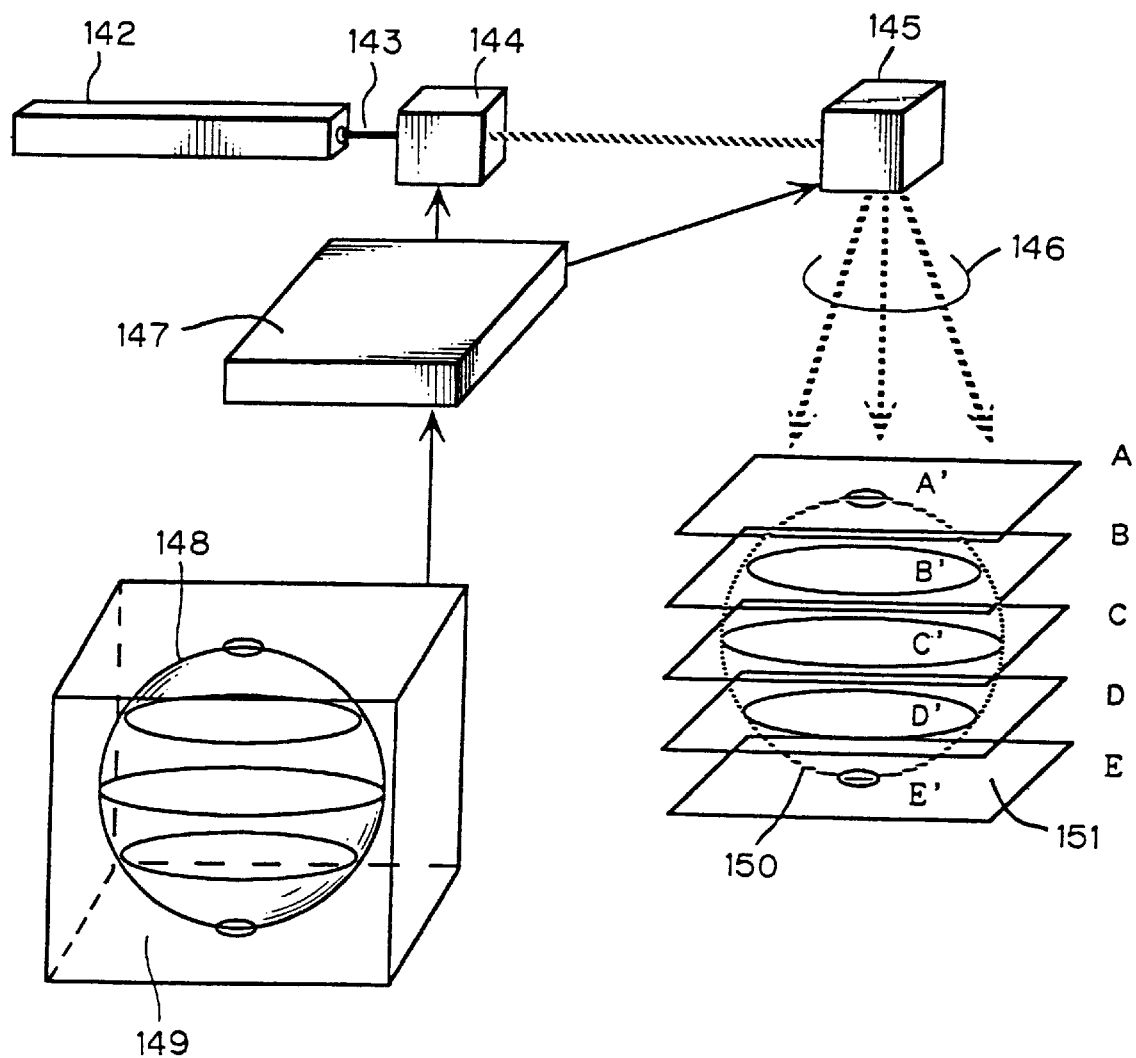
FIG. 6 is a schematic view of another conventional three-dimensional image display device using a volume scanning system.

Another conventional three-dimensional image display for reproducing a volume-image in a space is based on a volume scanning method. This type three-dimensional image display is featured in that it does not require an observer to use special glasses and can reproduce a threedimensional image to be naturally focused. FIG. 6 schematically illustrates the above-mentioned volume-scanning type three-dimensional image display system which, for the simplicity of explanation, represents five cross-section images.

This three-dimensional image display system is composed basically of a laser light source 142, a modulator 144, an X-Y deflector 145, a control computer 147, an image data memory 149 and a screen panel 151.

The operation of the display is as follows:

Data on a three-dimensional image 148 (of a spherical body in FIG. 6) to be displayed is first prepared and the screen panel 151 moves from a position A to a position E at a constant speed and instantly return to the position A, then repeats the same movement. The cross-section images A'–E' of the three-dimensional image, which correspond respective positions A–E of the screen panel 151, are projected in turn on the screen panel 151 by means of raster scanning with laser light 146 under control of the control computer 147 through the modulator 144 and the X-Y deflector 145. At this time, a three-dimensional image 150 is seen as an afterimage in human eyes in a space determined by multiplying the screen surface area by its moving stroke on the condition that the scanning speed of the laser beam 146 and the moving speed of the screen panel 151 are sufficiently synchronized with each other.

Figure 7:
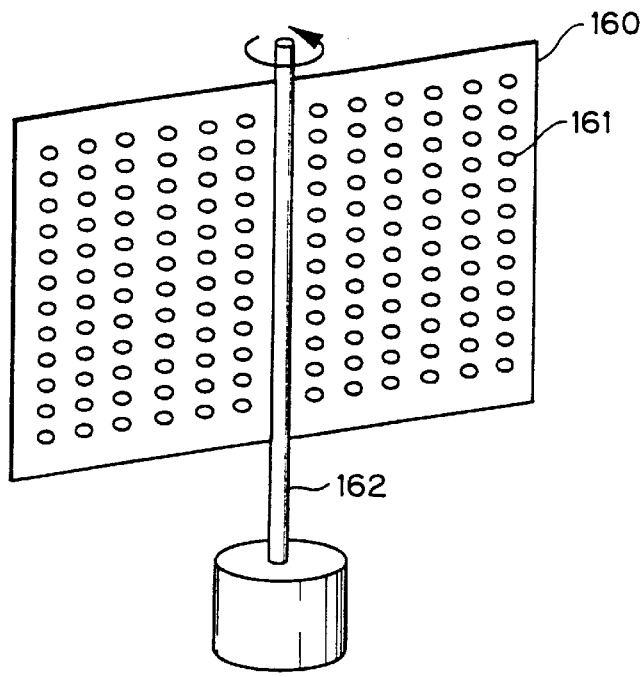
FIG. 7 illustrates another conventional three-dimensional image display device.

A real-image type three-dimensional image display is described in Japanese Laid-Open Patent Publication No. 56-500313. The principle of this prior art device is as follows: As shown in FIG. 7, light-emitting elements 161 such as LED are two-dimensionally disposed to form a plane with light-emitting element array 160 which rotates about a rotation axis 162 being within the plane to produce a three-dimensional video by the persistence of vision.

A three-dimensional image display using diffraction gratings is disclosed in Japanese Laid-Open Patent Publication No. 4-311916. This prior art device is based upon the method of deflecting light beams crosswise relative to incident light by using diffraction gratings prepared by disposing dot-like diffraction patterns on a plane substrate.

Figure 8:
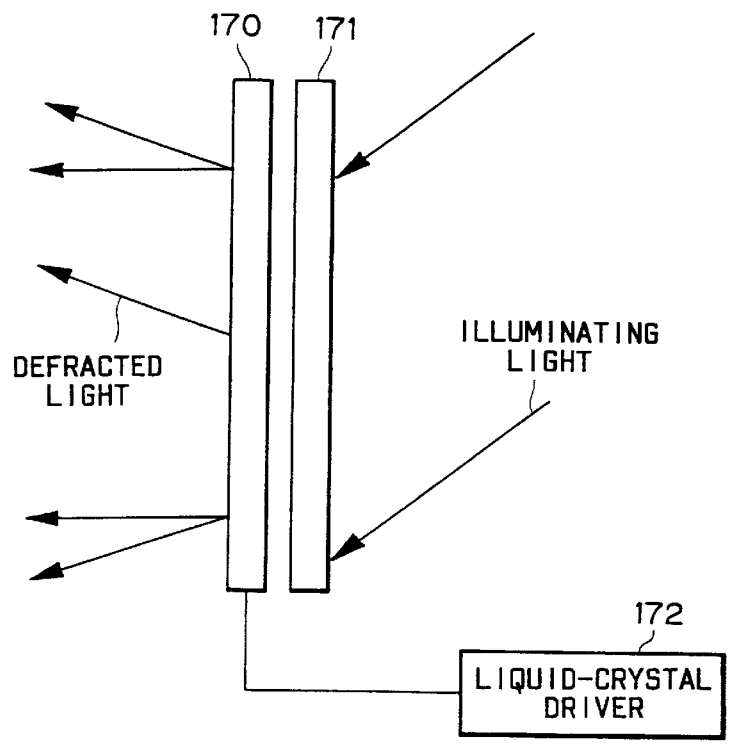
FIG. 8 illustrates another conventional three-dimensional image display device.

As shown in FIG. 8, a liquid-crystal spatial light-modulator 170 attached tight to the diffraction-grating panel substrate 171 is driven from a liquid-crystal driver 172 to rearrange right and left parallax images into an image which can be recognized as a stereo-video according to the principle of stereogram.

Referring now to the accompanying drawings, the preferred embodiments of the present invention will be described in detail.

First Embodiment

Figure 9:
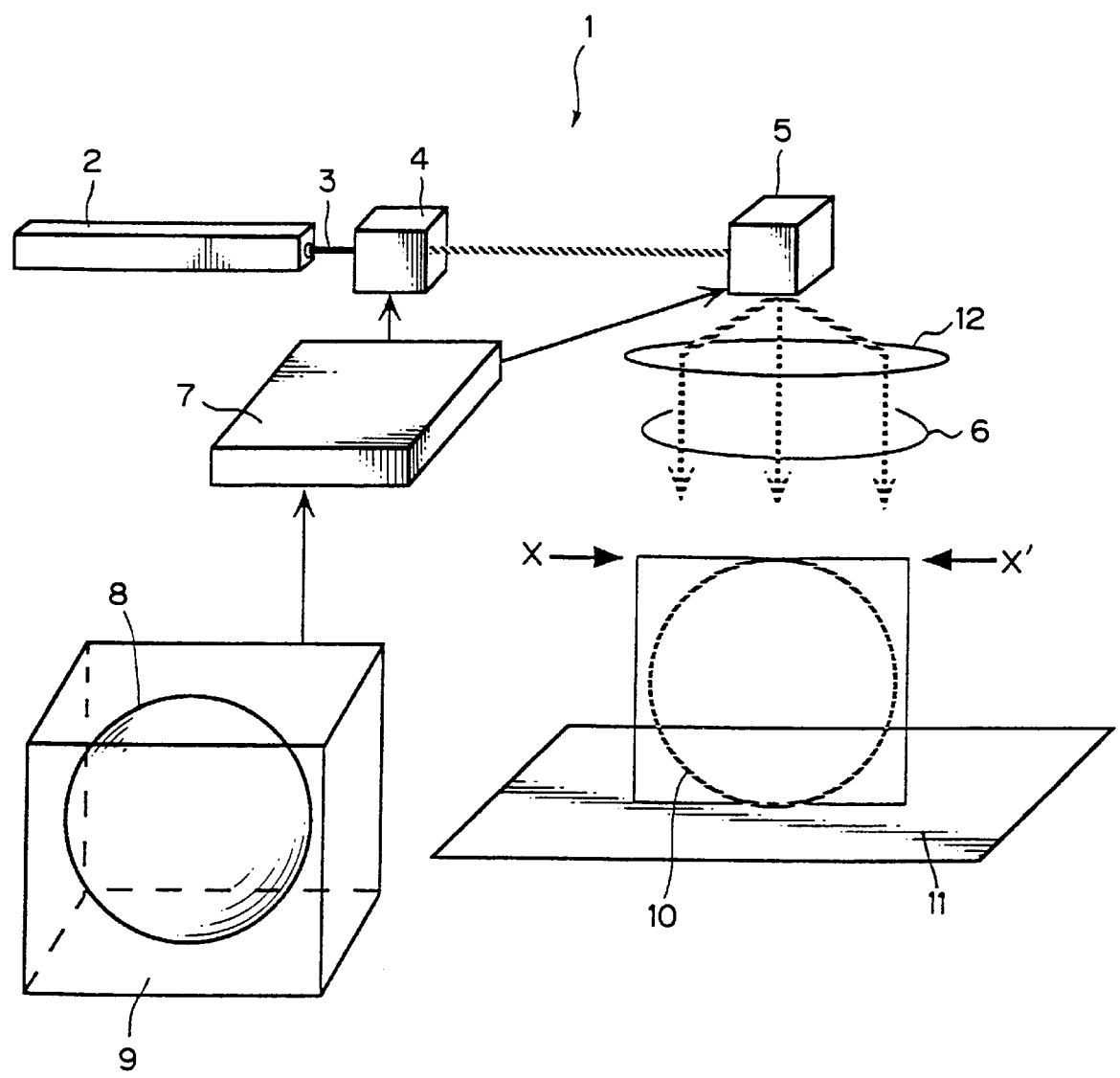
FIG. 9 is a schematic construction view of a three-dimensional image display device which is a first embodiment of the present invention.

FIG. 9 is a schematic view of a three-dimensional image display device according to the present invention. In FIG. 9, this three-dimensional image display device 1 is mainly composed of a laser light-source 2, a modulator 4, an X-Y deflector 5, a control computer 7, an image-data memory 9, a screen panel 11 and a projector lens 12. The screen panel 11 consists of a large number of elementary holograms (to be explained later in detail).

In FIG. 9, three-dimensional image data 8 of an object desired to be displayed (a spherical object in case of FIG. 9) is first prepared. The prepared data 8 contains data on relative positions (pixels) of the desired image in addition to three-dimensional image data used in the conventional device. The position data is used for making the rear side of the object invisible.

The control computer 7 controls the modulator 4 and the X-Y deflector 5 to successively illuminate elementary holograms on the screen panel, which correspond to point images composing the three-dimensional image, by laser light by raster scanning method.

Basically, the control computer 7 judges each point-image to be viewed or not and determines corresponding thereto elementary hologram to be illuminated by laser light. The three-dimensional image 10 is represented on the screen panel 11 on the condition that the scanning speed of the laser light 6 is sufficiently high.

The projecting lens 12 is used for entering the laser light 6 into the screen panel at substantially normal angle thereto. The screen panel It may be modified not to require vertically projection of a laser beam thereto.

Figure 10A:
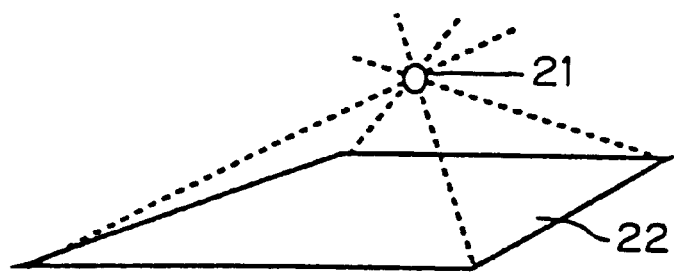
FIG. 10 is a view for explaining a principle of representing a dot image on a screen panel of the three-dimensional image display device according to the first embodiment of the present invention.
Figure 10B:
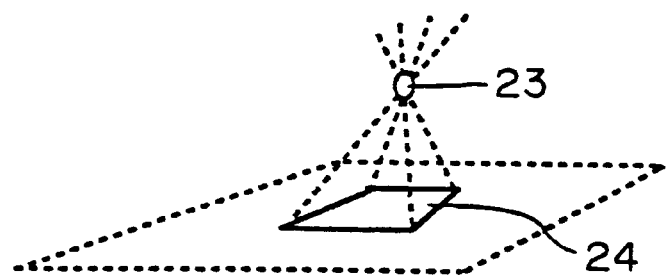
Figure 10C:
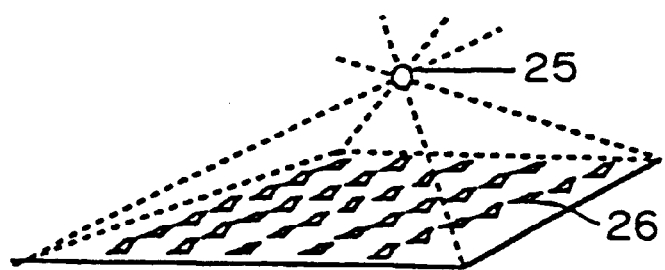

Referring to FIGS. 10A, 10B and 10C, the principle of representing a three-dimensional image of point-images by the screen panel will be described as follows:

FIG. 10A illustrates an example of representing one point-image 21 by a hologram 22. Data on wave-front representing the point-image 21 is written on a whole surface of the hologram 22. The data has a considerable redundancy and preferably reduced. A point-image 23 can be represented by using a part of a hologram 24 as shown in FIG. 10B. This, however, reduces a visible area wherein the point-image can be observed. Accordingly, small (elementary) holograms 26 are distributed in a wider area, thus obtaining a point-image 25 which is reproducible with a reduced amount of the data and observable in a wide visible area as shown in FIG. 10C.

A hologram area having no record of data may be used for writing data of another point-image. A large number of point-images are stored as holograms in a single screen panel. A three-dimensional moving picture image composed of a large number of point-images can be reproduced in this panel by selectively illuminating the necessary elementary holograms therein by laser light.

Figure 11:
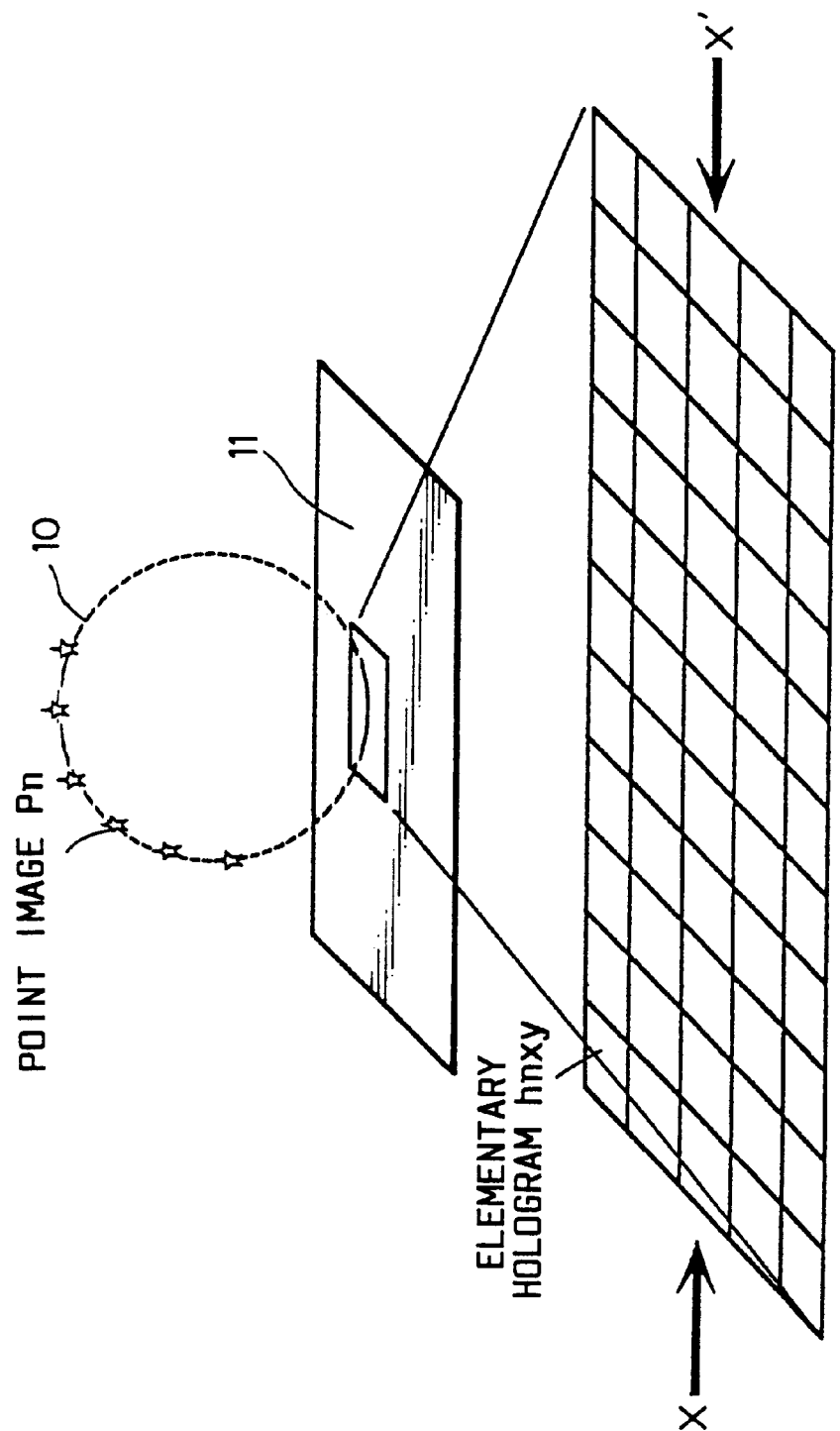
FIG. 11 is a view showing a modeled structure of a screen panel for use in the three-dimensional image display device according to the first embodiment of the present invention.

Referring to FIGS. 11 to 15, a practical method of forming a three-dimensional image by using the screen panel 11 will be described as follows:

As shown in FIG. 11, the screen panel 11 used in the three-dimensional image display device 1 is composed of a large number of diffraction elements which are defined as optical elements capable of reproducing wave fronts of point-images. In this embodiment, elementary holograms are applied as diffracting elements.

To simplify the description, incident laser-light is supposed to strike the flat surface of the screen panel at an angle of about 900. In this case, the zero-order light (reflected light) not diffracted by the elementary holograms return back along the same optical path that the incident light entered and, therefore, it does not fall into the observer's eyes.

Respective elementary hologram hnxy can diffract respective laser beams to produce wave fronts forming different point-images Pn. The formed point-images Pn form the three-dimensional image 10.

Figure 12:
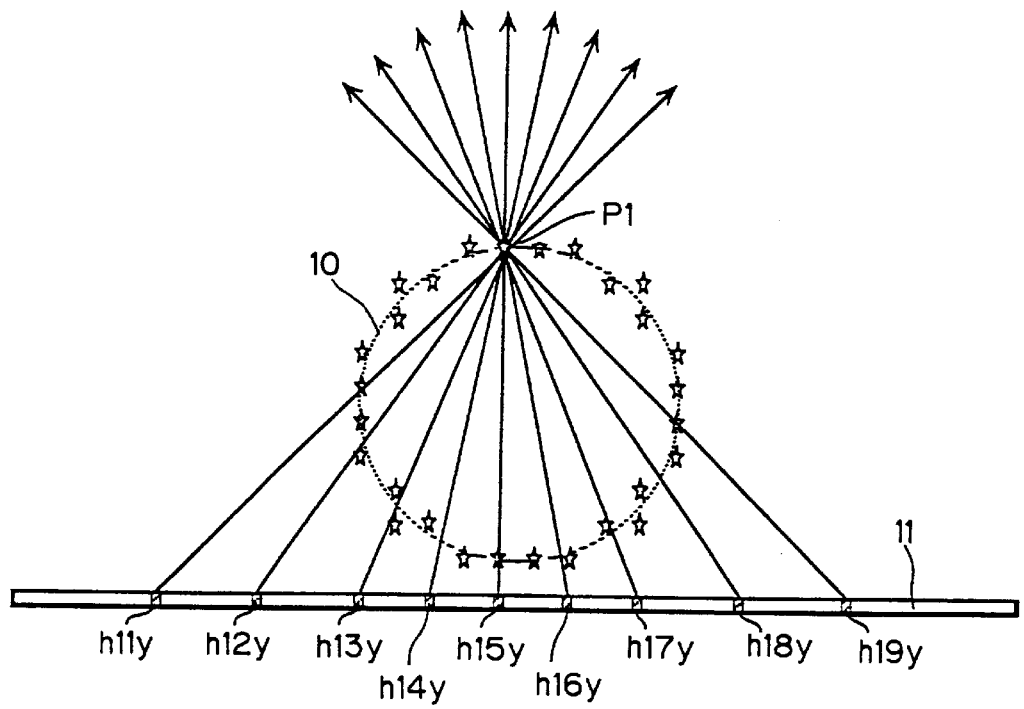
FIG. 12 is a view showing an operation state of a screen panel used in the three-dimensional image display device according to the first embodiment of the present invention.

FIGS. 12 to 15 illustrates how to diffract laser light by elementary holograms. In a section X-X' of FIGS. 9 and 11, there is shown a state that laser light diffracted by respective elementary hologram hnxy in the screen panel 11 form a three-dimensional image 10 (spherical body) above the screen panel 11. FIG. 12 shows, by way of an example and for sake of explanation, a case of reproducing a point-image Pn by using 9 elementary holograms hnxy. In FIG. 12, a point-image P1 can be seen from all directions above the point-image P1 in a specified visible area (at 90° in FIG. 12). All elementary holograms hnxy representing the point-image P1 are illuminated by laser light to diffract beams of laser light so that the point-image P1 can be observed from all directions.

On the other hand, a point-image P2 is partly hidden by the spherical body itself (three-dimensional image) 10 and, therefore, elementary holograms h26y to h29y are not illuminated by laser light.

Figure 14:
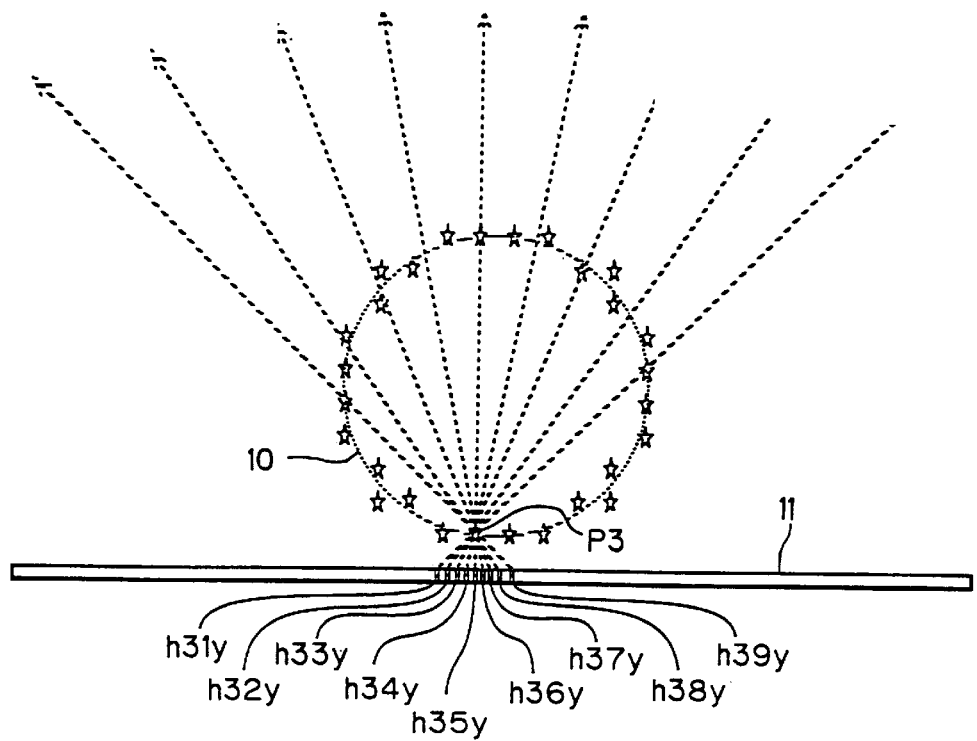

As shown in FIG. 14, a point-image P3 is the lowest portion of the object body, which is hidden by the object body itself and can not seen in the shown visible area. Therefore, elementary holograms hnxy (h31y to h39y) representing the point-image P3 are not illuminated by laser light.

Figure 13:
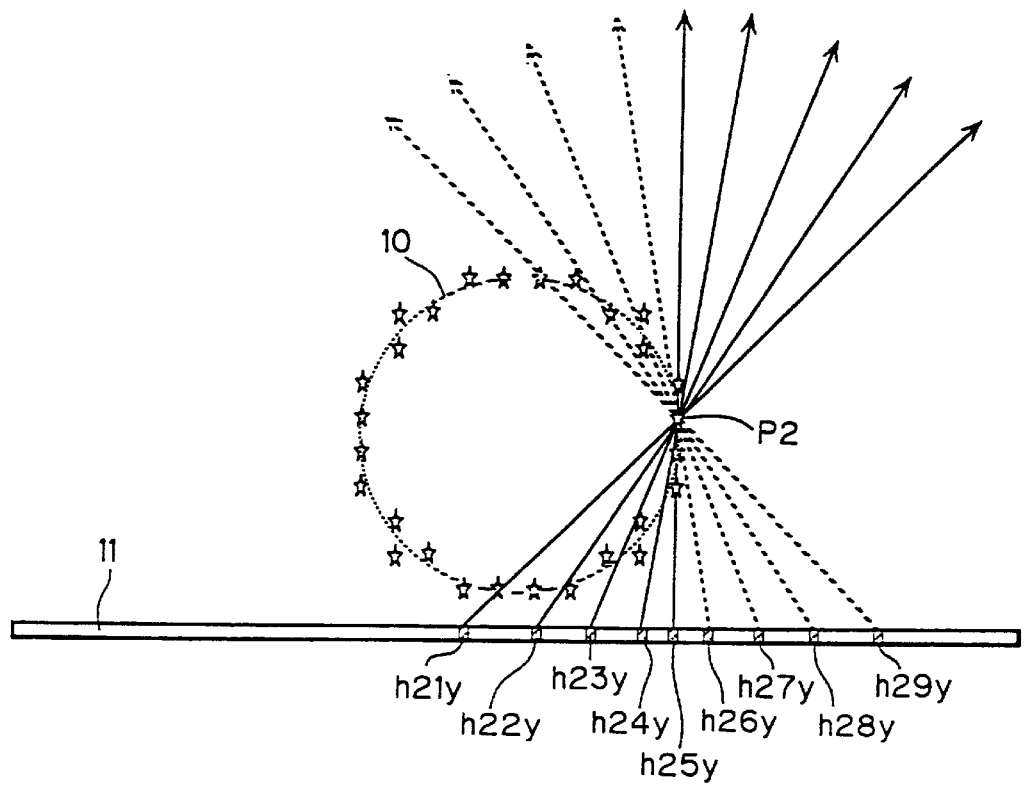
Figure 15:
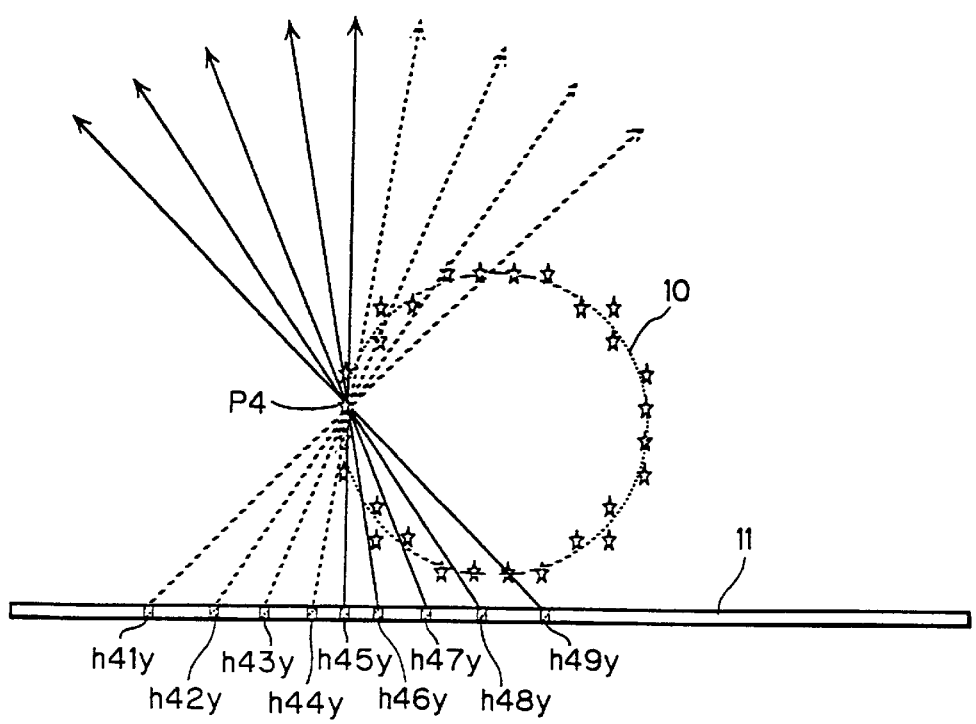

In FIG. 15, elementary holograms h41y to h44y representing a point-image P4 are not illuminated by laser light by the same reason as the point-image P2 of FIG. 13. A three-dimensional image 10 of the actual object can be reproduced by conducting the above-mentioned processing over all related elementary holograms.

Namely, elementary holograms to be illuminated (or not illuminated) are selected so that light may not be diffracted in the direction toward the areas hidden by the spherical body itself to be displayed or another object to be displayed at the same time. By doing so, it is possible to represent a real three-dimensional image of the object, preventing forming a semi-transparent image with its rear side seen through.

Figure 16:
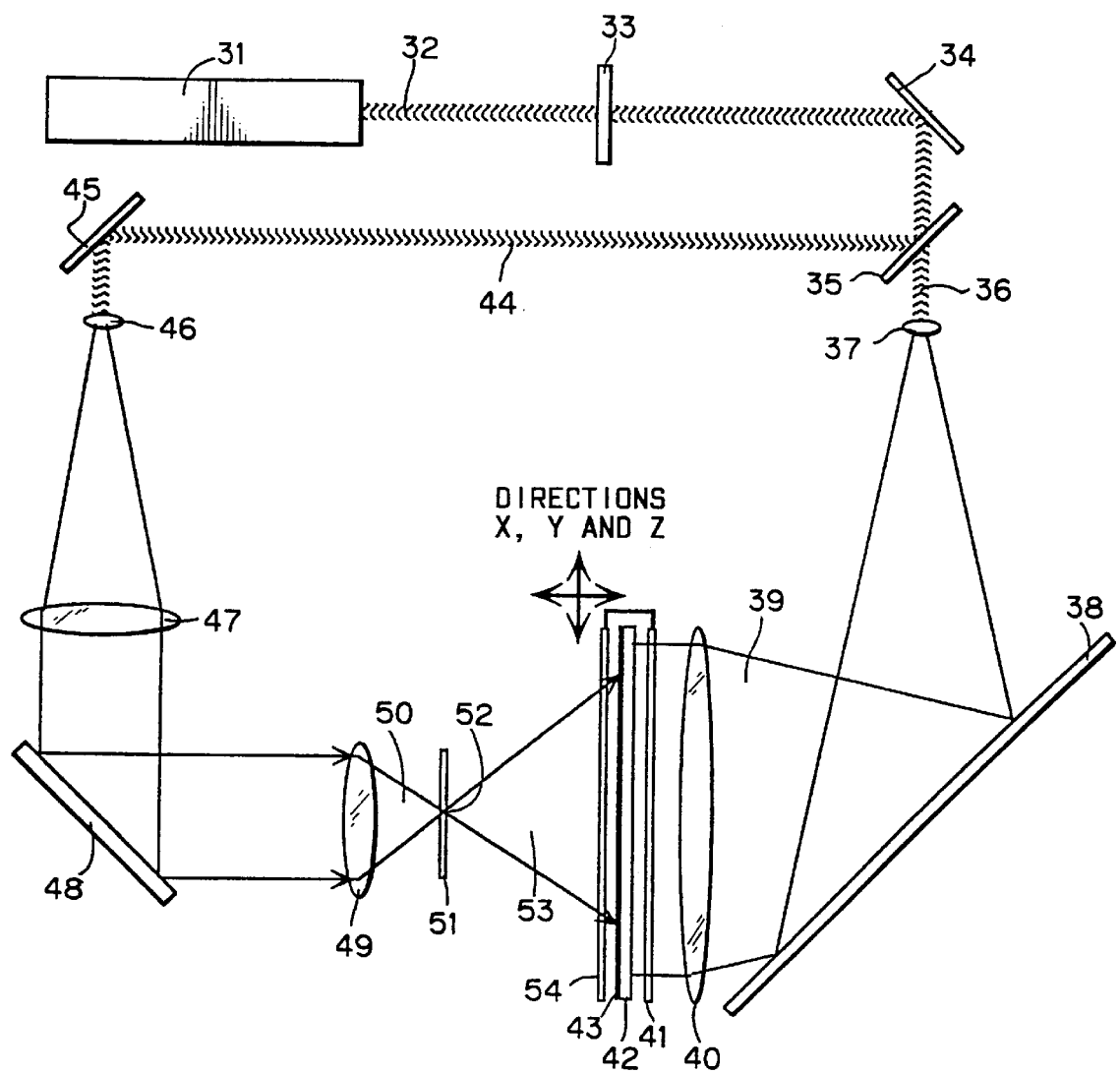
FIG. 16 is a view showing an exemplified method of preparing a screen panel usable in a three-dimensional image display device according to the present invention, with illustration of a manufacturing procedure and an optical system used for manufacturing the screen panel.

Methods for preparing a screen panel 11 and elementary holograms hnxy composing the screen panel 11 will be explained as follows:

FIG. 16 illustrates an optical system and a procedure for preparing elementary holograms.

Light-sensitive material such as photopolymer for recording elementary holograms is exposed to light through an optical system arranged as shown in FIG. 16. Photopolymer, e.g., HRF-7000 X015-20 (made by Dupon Company) can be used as the light-sensitive material for recording a hologram thereon.

In FIG. 16, laser light 32 emitted from a laser light source 31 through a shutter 33 is reflected by a mirror 34 and split in two by a beam splitter 35. One beam 66 having transmitted through the beam splitter 35 is converted through an objective lens 37 to a divergent beam which is then directed to a mirror 38. The laser light 39 reflected from the mirror 38 is converted through a collimating lens 40 to a parallel beam which falls through a mask 41 onto a film of light sensitive material 43 disposed on a screen panel substrate 42 through a mask 41. In this instance, the incidence angle of the laser beam falling onto the light-sensitive material has been set at 90° that is equal to the incidence angle of laser light to the screen panel 11.

On the other hand, the other laser beam 44 reflected from the beam splitter 35 is further reflected from a mirror 45 and passes through an objective lens 46 and collimating lens 47, being enlarged in its diameter. The enlarged laser beam 44 is reflected from a mirror 48 and collected by a collecting lens 49 to form a laser beam 50 that forms a point-image 52 on a diffusing plate 51. A laser beam 53 of the point-image 52 is diffused by the diffusing plate 52 and falls on the light-sensitive material 43 through a mask 54. In this instance, the position of the point image 51 on the diffusing plate 51 corresponds to a position of a point-image to be reproduced by the screen panel 11. An elementary hologram for reproducing the point-image 52 is formed on the light-sensitive material 43 at a position whereto the laser beams fall through the masks 41 and 54. The masks 41 and 54 are made of the same material and disposed facing to each other with the substrate 42 (with the light-sensitive material 43) between them. The shutter 33 is opened for a specified exposure time necessary for writing interference patterns onto the light-sensitive material 43.

Elementary holograms necessary for reproducing all point-images can be written onto the light-sensitive material by moving the substrate 42 in directions X, Y and Z for changing its position relative to the point-images 52. At the same time, the masks 41 and 54 change their positions relative to the substrate 42. Elementary holograms for reproducing point-images forming a plane equidistant (parallel) from the substrate 42 can be written through the same masks 41 and 54. However, different masks 41 and 54 must be used for writing elementary holograms for reproducing point-images 52 forming a plane having different distances (not parallel) from the substrate 42.

For example, the screen panel 11 may have a size of 20 cm by 20 cm if it is capable of representing 1000 (10×10×10) point-images each of which is represented by 40 elementary holograms each having a size of 1 mm by 1 mm.

Each of masks 41 and 54 has 40 square holes made therein for one point-image, each square hole having a size of 1 mm by 1 mm. If light from all point-images has the same divergence angle, point-images being at a larger distance from the screen panel may use a wider area of the screen panel.

As described above, different masks must be prepared for writing elementary holograms for reproducing point-images representing a plane having different distances from the substrate 42. Elementary holograms on the substrate 42 formed by the interference between two laser beams falling onto the light-sensitive material from both sides of the substrate 42. The Lippmann-type (volume-type) elementary holograms are thus formed.

The laser light-source 31 shown in FIG. 16 has the same wave-length that the laser-light source 2 of FIG. 9 has. In practice, semi-conductor-driven neodymium-doped YAG green laser (wave-length 532 nm) is used. Therefore, the use of this laser-light source can represent a green monochromatic three-dimensional image.

The three-dimensional display can display colored three-dimensional images if it is provided with three laser-light sources of red, green and blue light respectively and the screen panel 11 composed of three layers of elementary holograms corresponding to those of three (red, green and blue) colors of laser light respectively.

The elementary holograms corresponding to red, green and blue beams of laser light are prepared by using a dye laser that can emit different ranges of wavelength (611 nm of red light, 544 nm of green light and 453 nm of blue light) in the same optical system shown in FIG. 16. It is also possible to prepare holograms by using three separate (red, green and blue) laser light sources.

The screen panel 11 may be either a single panel having holograms corresponding to three primary colors (red, green and blue) or a three-layer panel composed of three screen-panels corresponding to respective primary colors. The screen panel 11 has a peak of diffraction efficiency in a plurality of wavelength ranges and it may have a substantially neutral (white) color light when beams of said different wavelengths are mixed.

The color laser units to be used in the three-dimensional color-image display device have the same wavelengths as those of the color laser units used for the above-mentioned moving flat screen 11.

Figure 17:
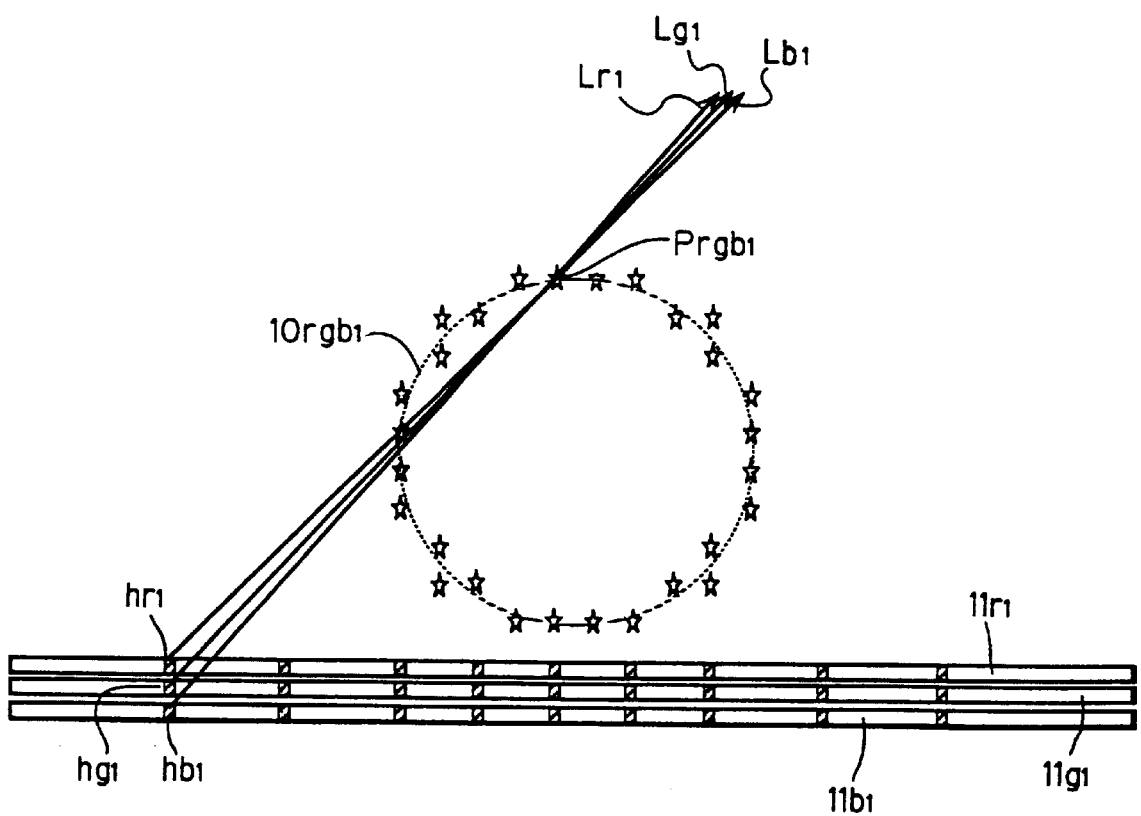
FIG. 17 shows an operating state of an exemplified screen panel composed of three overlaid screen panels.

A color screen panel composed of three screen panels laid on each other is explained below:

FIG. 17 illustrates the operation of the above-mentioned color screen panel.

In FIG. 17, three screen panels 11r1, 11g1 and 11b1 are laid on each other to form a three-layer color screen panel.

The screen panels 11r1, 11g1 and 11b1 are composed of elementary holograms hr1, hg1 and hb1 respectively for reflecting wavelengths of red, green and blue colors respectively.

As shown in FIG. 17, a point-image Prgb1, which is one of components forming a three-dimensional image 10rgb1, is represented by light beams Lr1, Lg1 and Lb1 reflected from the elementary holograms hr1, hg1 and hb1. A color point-image Prgb1 (colored three-dimensional image 10rgb1) can be thus displayed.

Figure 18:
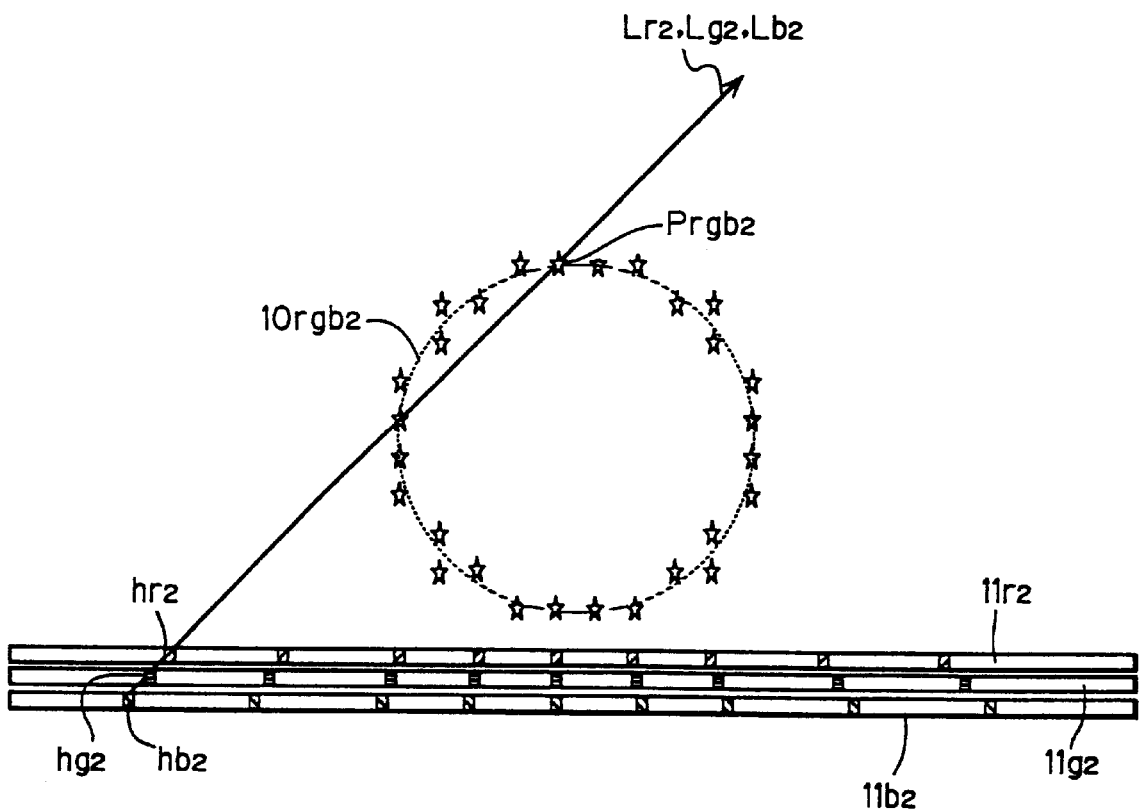
FIG. 18 shows an operating state of another exemplified screen panel composed of three overlaid screen panels.

The screen panel of FIG. 17 may have somewhat differently directed light-beams Lr1, Lg1 and Lb1 but be used with no problem if three component panels are made satisfactory thin. FIG. 18 shows such a possible countermeasure that elementary holograms hr2, hg2 and hb2 for representing a point-image Prgb2 is displaced to align three beams Lr, g, b2 in the same direction.

Figure 19:
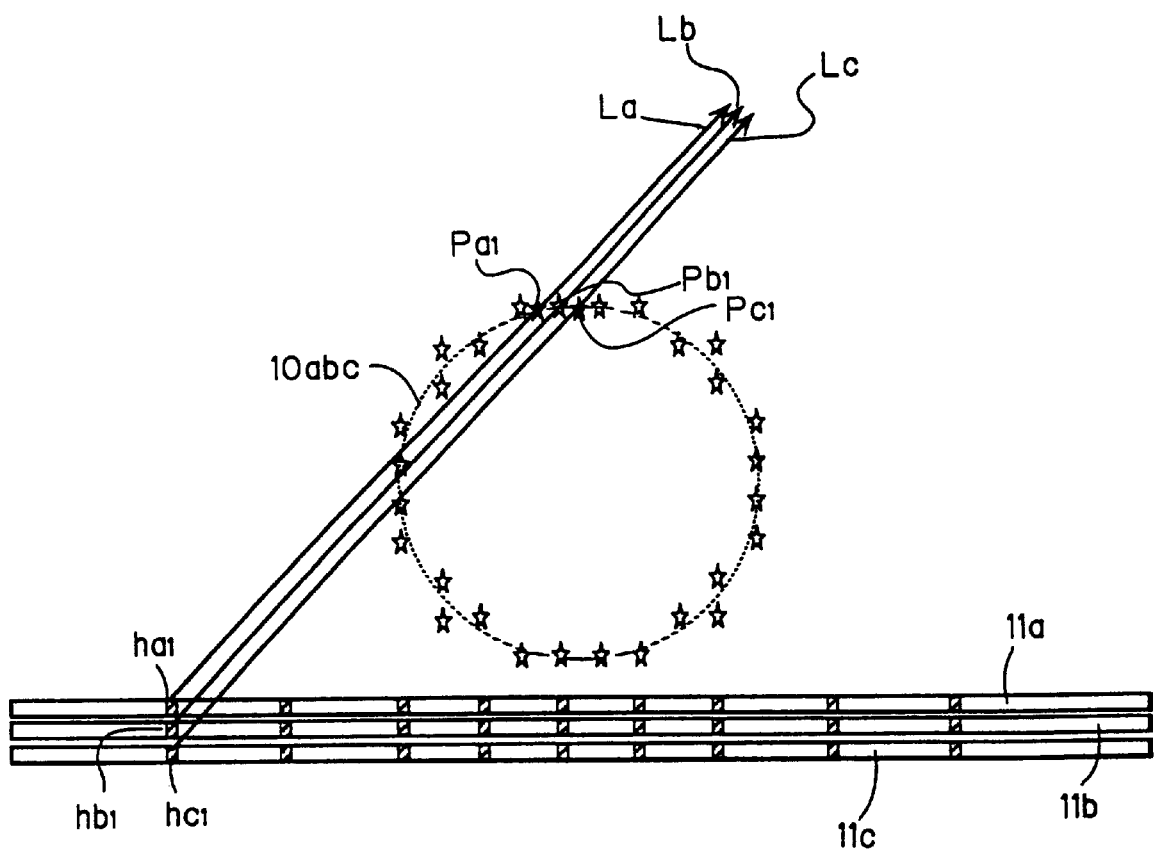
FIG. 19 shows an operating state of a further exemplified screen panel composed of three overlaid screen panels.

Another example of using a composite screen panel which is not colorized but realizes forming a large number of point-images is described below:

FIG. 19 shows the operating state of a screen panel composed of three screen panel 11a, 11b and 11c overlaid on each other. In the shown example, light beams La, Lb and Lc reflected from respective holograms disposed at the substantially same position form respective point-images Pa1, Pb1 and Pc1 at different positions on a three-dimensional image. With this screen panel, the number of point-images to be displayed can be thus increased.

Second Embodiment

Figure 20:
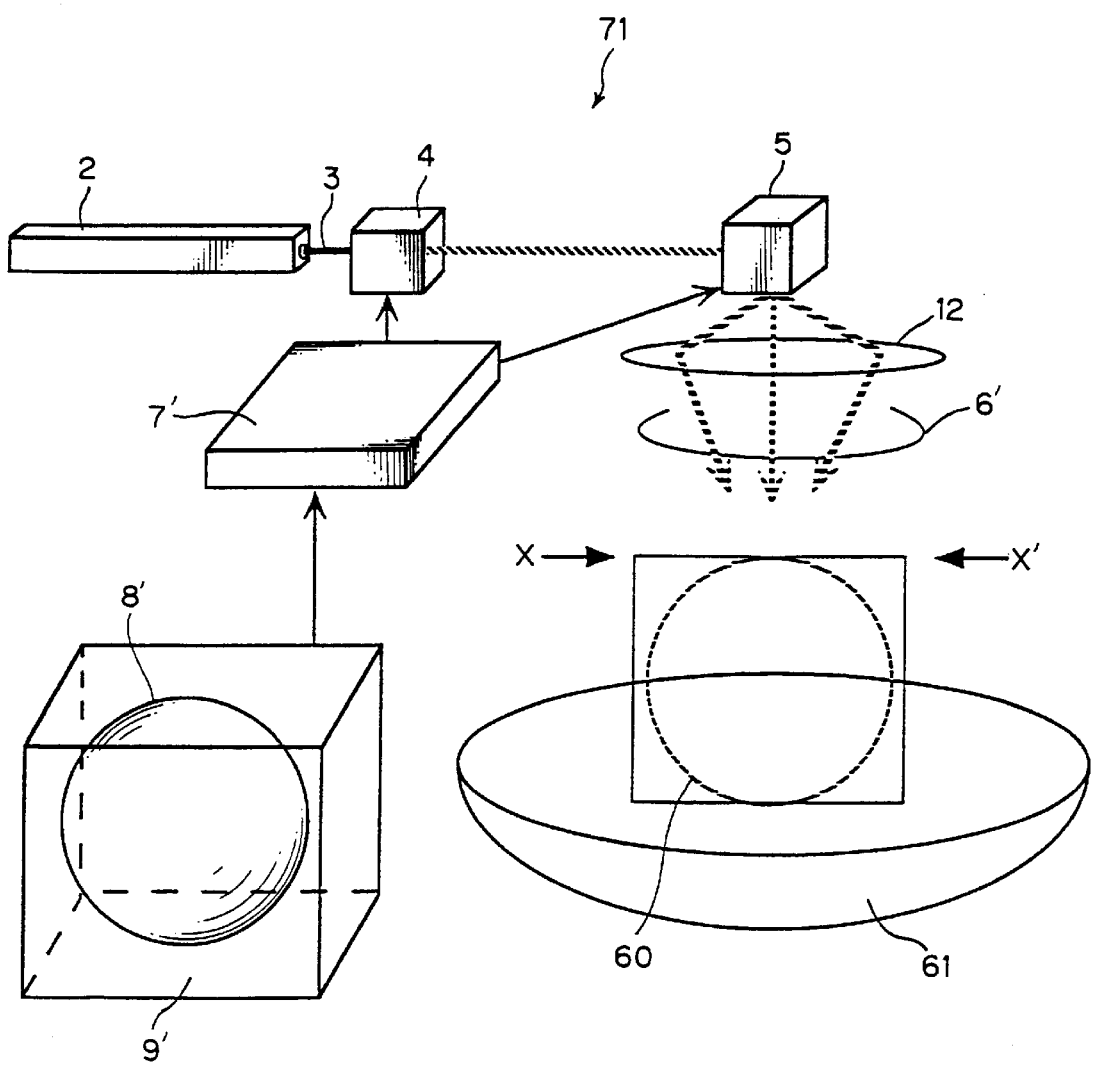
FIG. 20 is a schematic construction view of a three-dimensional image display device with a curved panel, which is a second embodiment of the present invention.

Referring to the accompanying drawings, the second embodiment of the present invention will be described below in detail:

FIG. 20 is a schematic view of a three-dimensional image display device 71 having a curved screen panel according to the present invention.

The three-dimensional image display device 71 mainly comprises a laser-light source 2, a modulator 4, an X-Y deflector 5, a control computer 7', an image-data memory 9', a screen panel 61 and projecting lens 12. Similarly to the first embodiment, the screen panel 61 is composed of a large number of elementary holograms.

In FIG. 20, data 8' for a three-dimensional image desired to be displayed (a spherical body in the shown case) is first prepared in the image-data memory 9'. The three-dimensional image data 8' includes, in addition to conventional three-dimensional image data, relative position data of points (pixels) of each image to be displayed. Using the above-mentioned data makes it possible to represent the object image without appearing its hidden rear side.

In the screen panel 61, elementary holograms corresponding to point-images composing a three-dimensional image are illuminated one by one by laser light when the control computer 7' performs a sequential raster scan of the screen panel using the modulator 4 and the X-Y deflector 5.

The operation principle is such that computer discriminates each point-image to be seen or not and decides relating elementary holograms to be radiated with laser light.

At this time, one can observe a three-dimensional image 60 on the screen panel 61 if the scanning speed of the laser light 6' is sufficiently high.

The projecting lens 12 allows the laser light 6' to strike the screen 61 at a substantially right angle. To realize this, outgoing light from the projecting lens 12 may be either converging or diverging. This incident angle condition right angle, however, is not always necessary and depends upon the structure of a usable screen panel 61.

This embodiment differs from the first embodiment in that the screen panel has a curved surface, thus obtaining a wider visible area.

Figure 21:
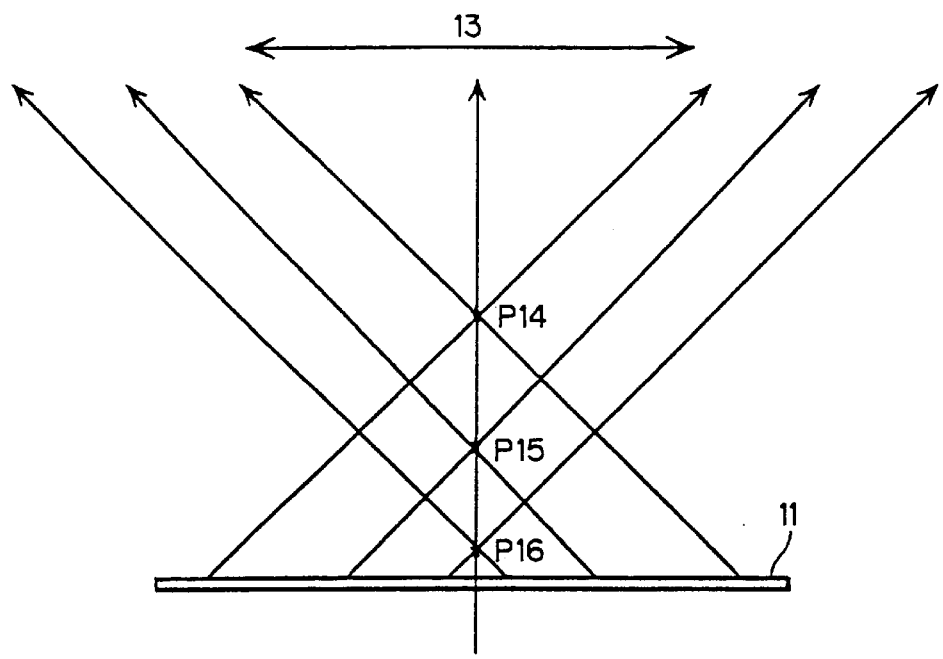
FIG. 21 shows an operating state of a flat screen panel of a three-dimensional image display device according to the present invention.
Figure 22:
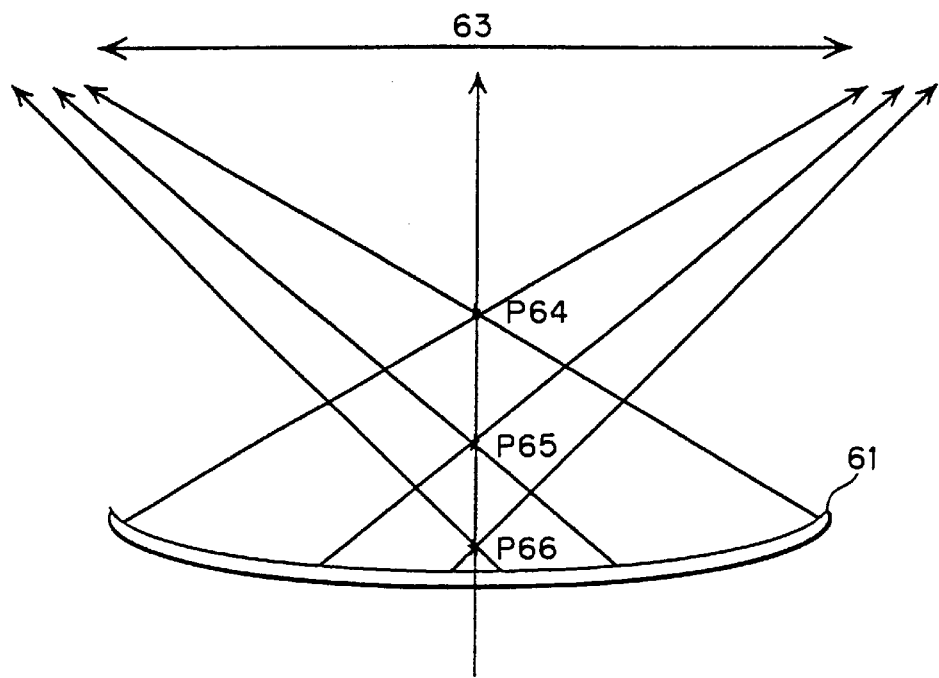
FIG. 22 shows an operating state of a curved screen panel (similar to the panel of FIG. 20) of a three-dimensional image display device according to the present invention.

Referring to FIGS. 21 and 22, the relation between the shape of the screen panel 11, 61 and its visible area will described below. As shown in FIG. 21, a flat screen panel 11 has a visible area 13 in which all point-images P14, P15 and P16 can be observed. On the other hand, a curved screen panel 61 has a visible area 63 in which all point-images P14, P15 and P16 can be seen. Namely, the curved screen panel 61 has a wider visible area 63 than the visible area 13 of the flat screen panel 11.

Third Embodiment

Figure 23:
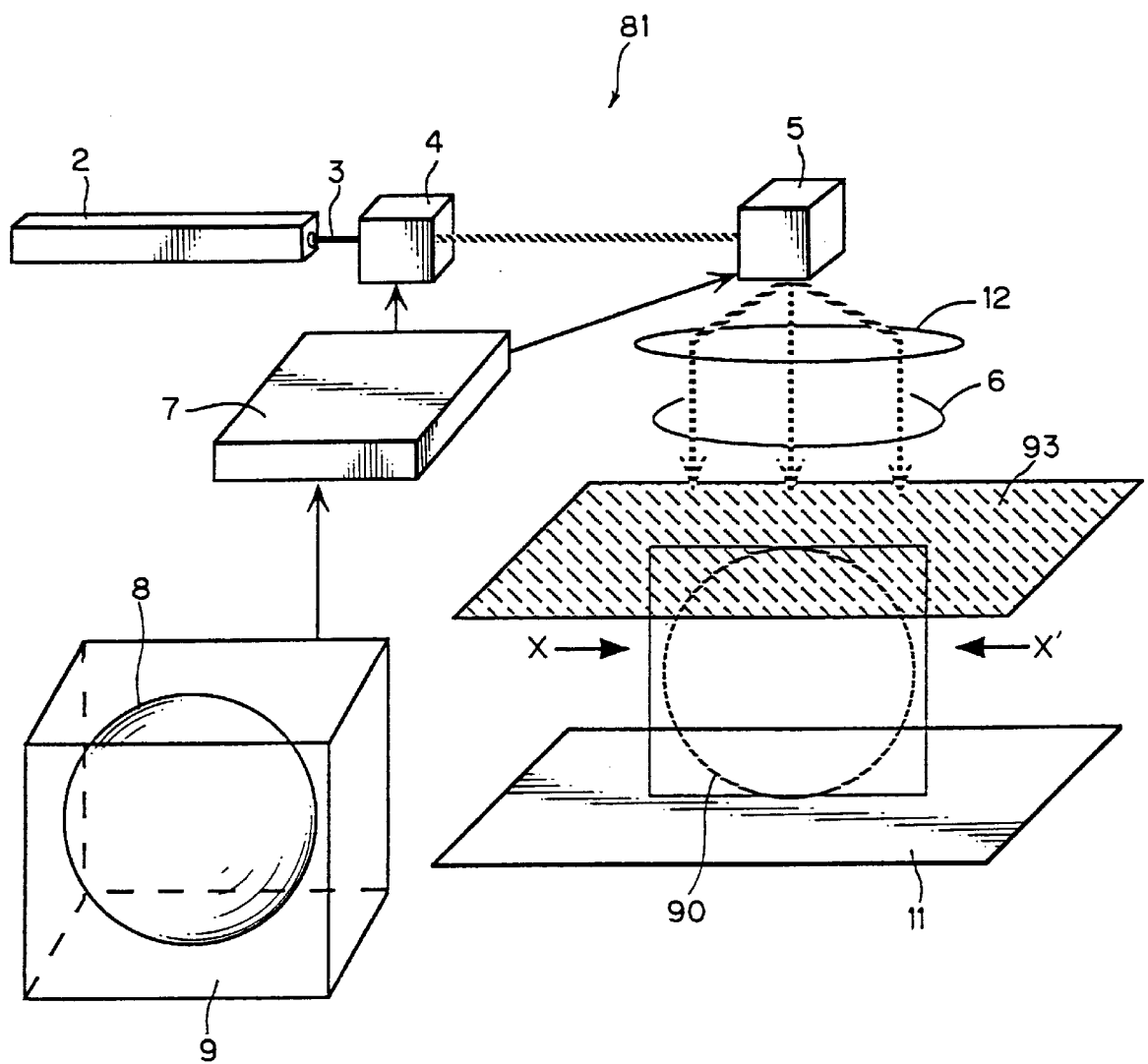
FIG. 23 is a schematic construction view of a three-dimensional image display device with a light-diffusing plate, which is a third embodiment of the present invention.

Referring to the accompanying drawings, the third embodiment of the present invention will be described below in detail:

FIG. 23 is a schematic view of a three-dimensional image display device 81 having a diffusing plate according to the present invention.

The three-dimensional image display device 81 mainly comprises a laser-light source 2, a modulator 4, an X-Y deflector 5, a control computer 7, an image-data memory 9, a screen panel 11 and projecting lens 12 and a diffusing plate 93.

In FIG. 23, data 8 for a three-dimensional image desired to be displayed (a spherical body in the shown case) is first prepared in the image-data memory 9. The three-dimensional image data 8 includes, in addition to conventional three-dimensional image data, relative position data of points (pixels) of each image to be displayed. Using the above-mentioned data makes it possible to represent the object image without appearing its hidden rear side.

In the screen panel 11, elementary holograms corresponding to point-images composing a three-dimensional image are illuminated one by one by laser light when the control computer 7 performs a sequential raster scan of the screen panel using the modulator 4 and the X-Y deflector 5.

Laser light 6 does not be affected by the diffusing plate 93 and falls onto the screen panel 11. Diffracted light from the screen panel 11 is diffused somewhat in its propagating direction by the diffusing plate 93. This can widen a visible area with the small quantity of elementary holograms.

The operation principle is the same that the first and second embodiments. Namely, the computer discriminates each point-image to be seen or not and decides relating elementary holograms to be illuminated with laser light. In this case, one can observe a three-dimensional image 90 on the screen panel 11 if the scanning speed of the laser light 6 is sufficiently high.

The projecting lens 12 allows the laser light 6 to strike the screen panel 11 at a substantially right angle. This incident angle condition, however, is not always necessary and depends upon the structure of a usable screen panel 11.

Figure 24:
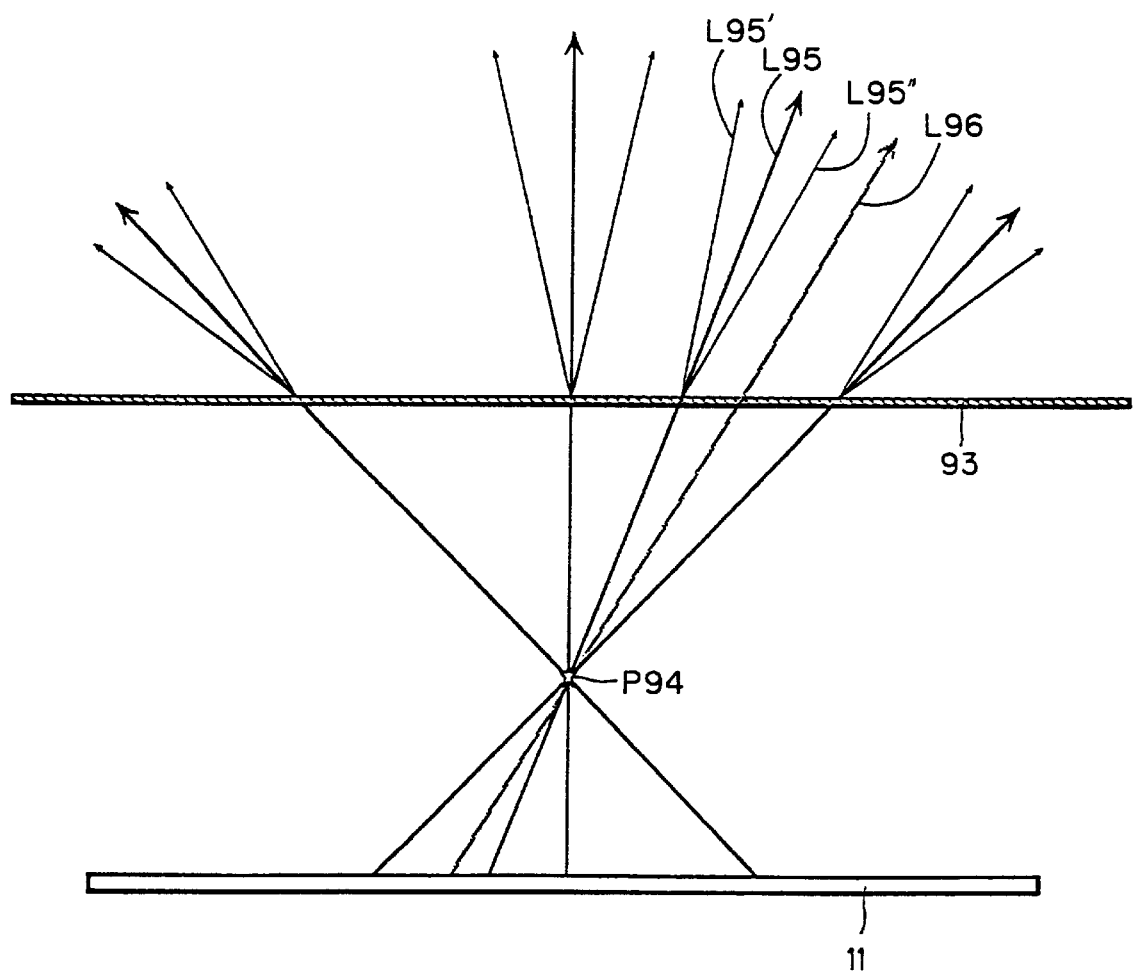
FIG. 24 shows an operating state of a light-diffusing plate (similar to the plate of FIG. 22) of a three-dimensional image display device according to the present invention.

FIG. 24 is a view for explaining the effect of the above-mentioned diffusing plate 93. As shown in FIG. 24, a beam L95 of light for reproducing a point image P94 is diffused in the range of a beam L95' to L95" by the diffusing plate 93. Accordingly, the beam L96 can cover the visible area of the point image to be reproduced. This can save the necessary number of elementary holograms. Namely, this screen panel 11 as compared with other panel of the same size can reproduce more point images.

Figure 25:
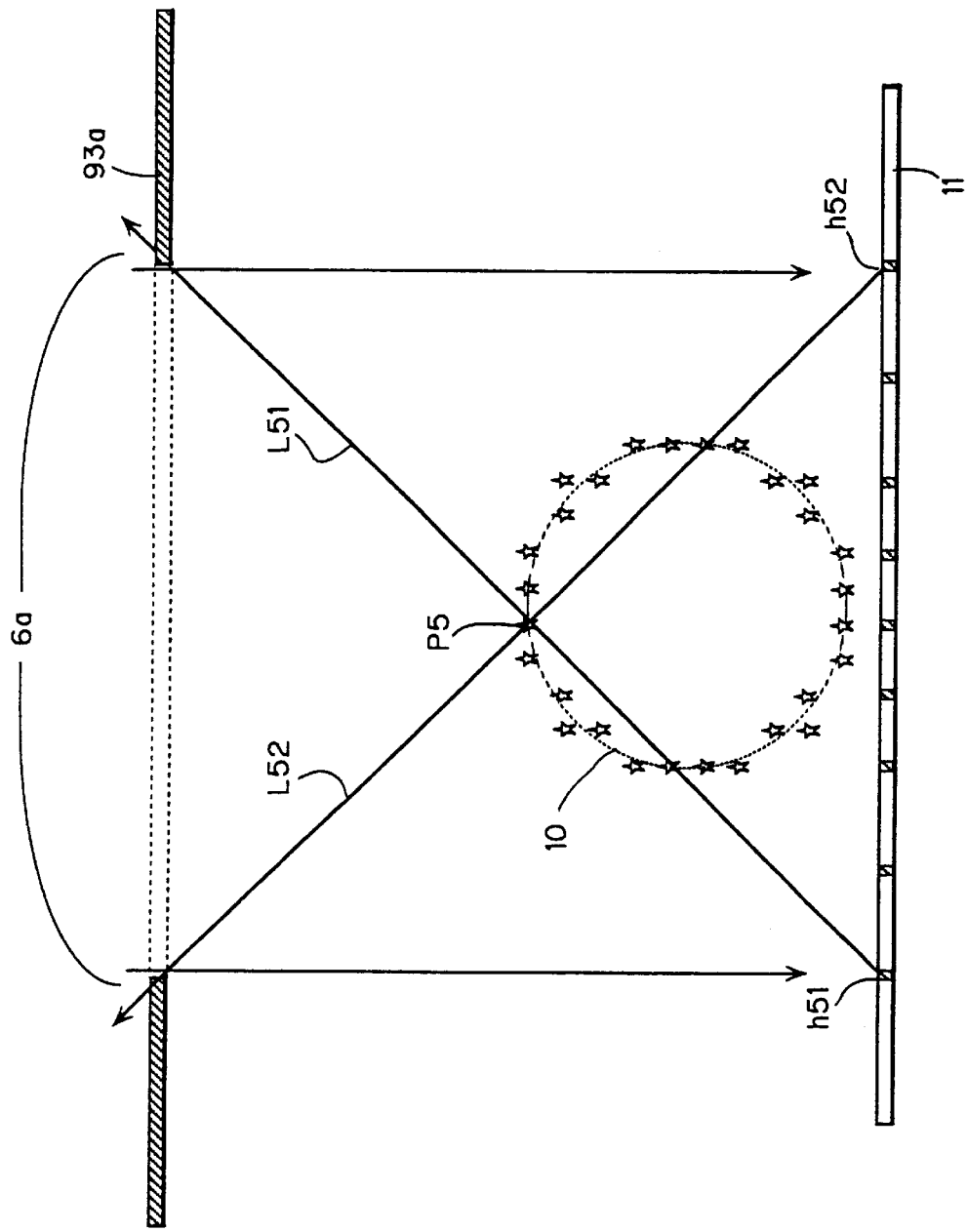
FIG. 25 illustrates an exemplified three-dimensional image display device wherein a light-diffusing plate according to the present invention is applied.
Figure 26:
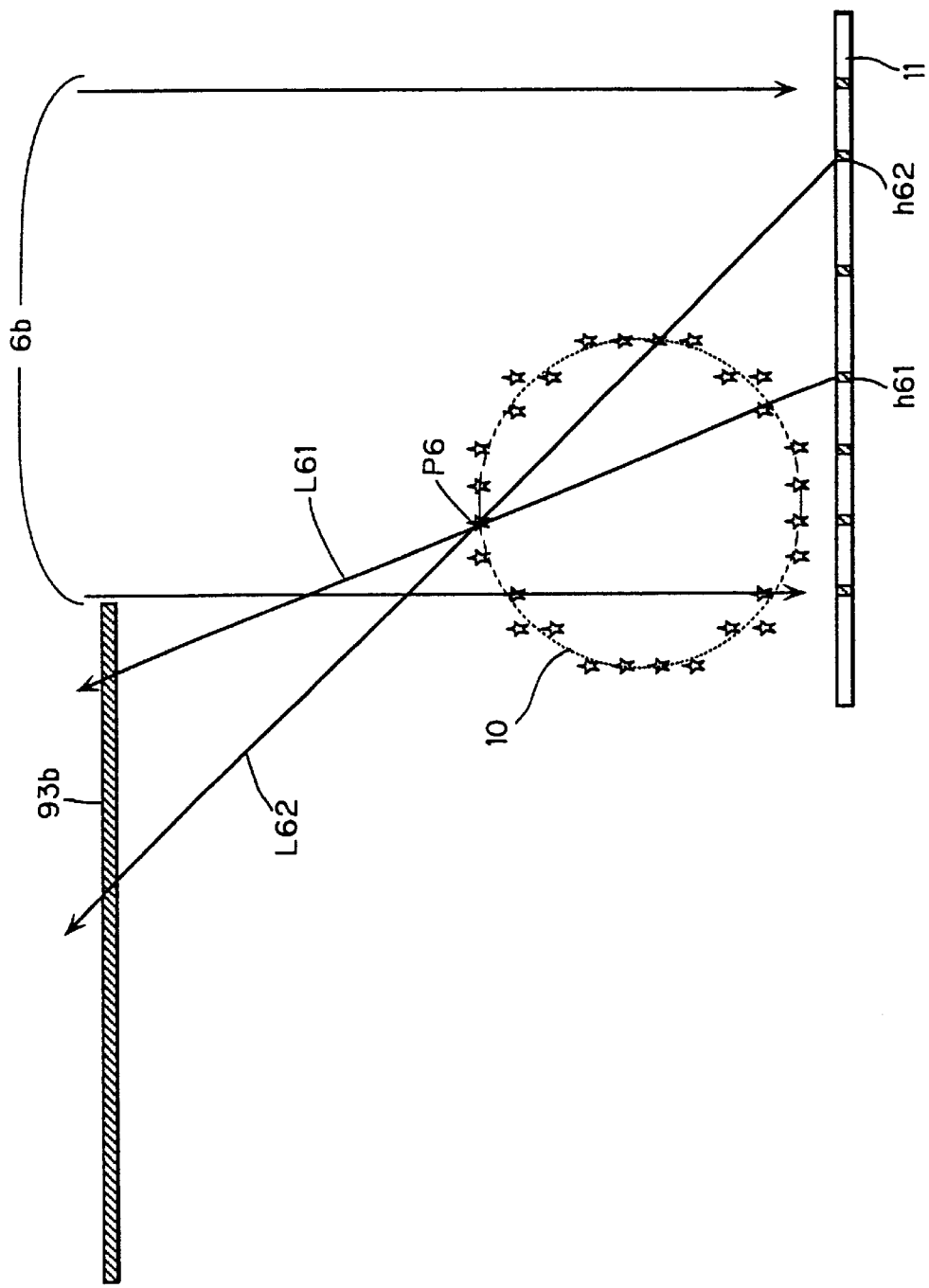
FIG. 26 illustrates another exemplified three-dimensional image display device wherein a light-diffusing plate according to the present invention is applied.
Figure 27:
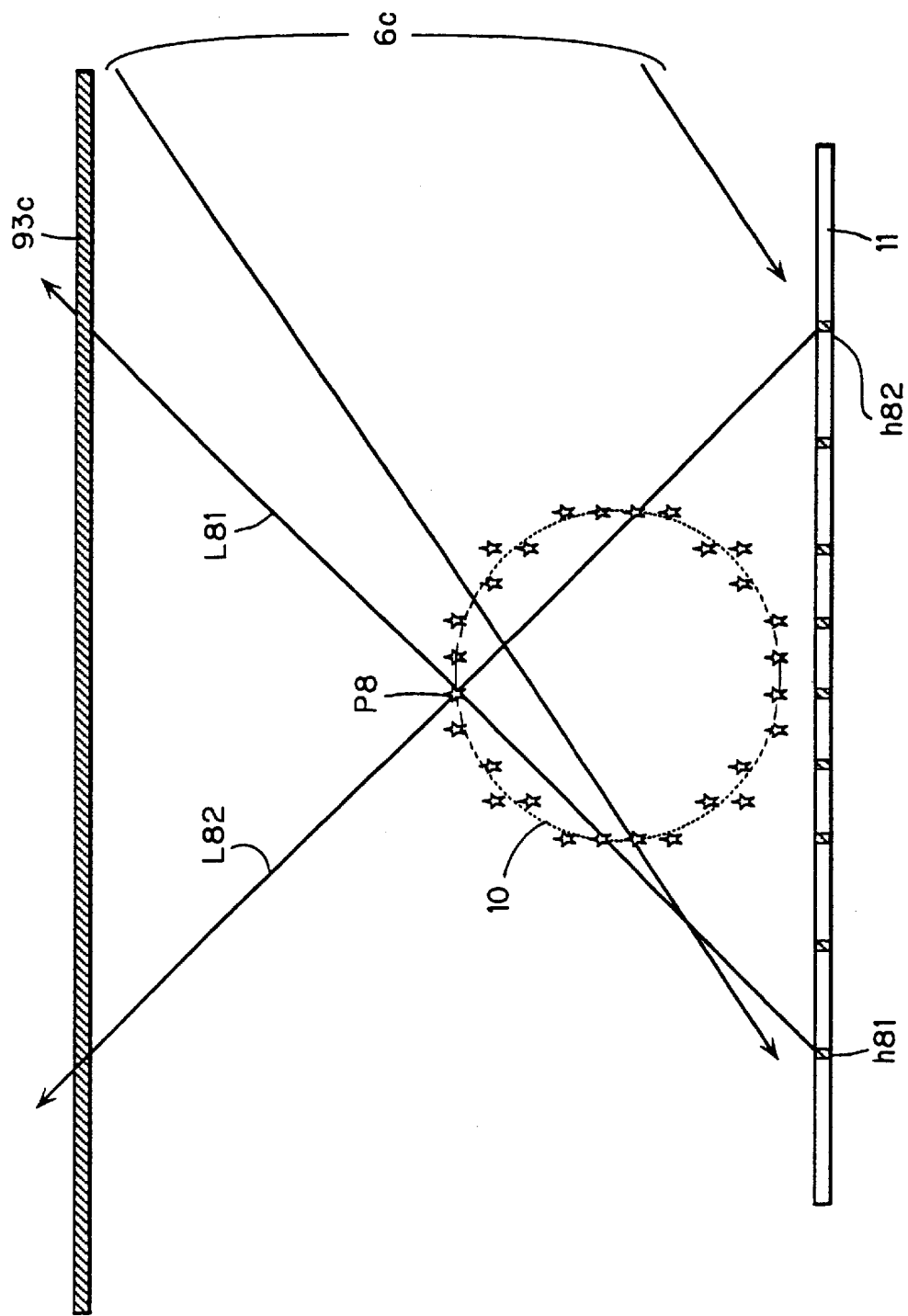
FIG. 27 illustrates a further exemplified three-dimensional image display device wherein a light-diffusing plate according to the present invention is applied.

FIGS. 25 to 27 shows examples of practical application of the above-mentioned diffusing plate.

In FIG. 25, there is shown a ring-type diffusing plate 93a having a center bore allowing laser light 6a to pass. Diffracted beams of light from holograms h51 and h52 in the screen panel 11 form a three-dimensional image at P5 while a three-dimensional image 10 formed by beams L52 and L51 can be seen through the diffusing plate 93a.

In FIG. 26, laser light 6b does not be affected by a diffusing plate 93b and falls directly onto the screen panel 11 by previously displacing the diffusing plate 93b relative to the screen panel 11. In the same way as shown in FIG. 25, a three-dimensional image 10 can be seen through the diffusing plate 93b.

In FIG. 27, laser light 6c is directed slantways to the screen panel 11 so that it may not be diffused by a diffusing plate 96c. Similarly to the cases of FIGS. 25 and 26, a three-dimensional image 10 can be seen through the diffusing plate 96c.

In the three-dimensional image display devices described above as the embodiments 1 to 3, elementary holograms composing the screen panel are of the same size but they may be also of different size depending upon distances between the screen panel and point-images to be displayed. The reason is the fact that a point-image may become fuzzy as relating elementary holograms are smaller or/and a distance between the point image and the elementary holograms. Accordingly, a distant point-image is represented by a large elementary hologram and a near point-image is represented by a small elementary hologram. This solution may also improve the efficiency of using the screen area. Namely, the screen panel 11 of the same size may have more quantity of elementary holograms formed therein and, therefore, can reproduce (represent) more quantity of point-images. The screen panel can also provide a wider visible area.

To realize the above-mentioned solution, it is necessary to change a size of laser beam striking the screen panel in accordance with a size of each elementary hologram (a distance between the screen panel and a point-image to be represented). The diameter size of the laser beam striking the screen panel can be changed by adjusting a focal point of the laser beam in the optical axis direction.

Although the three-dimensional image display devices (the embodiments 1 to 3) are intended to represent every point-image by the same specified number of elementary holograms, it is also possible to change the number of elementary holograms corresponding to a point-image according to the position of said point-image. This may improve the efficiency of using the screen area because the screen panel of the same size can reproduce (represent) more quantity of point-images by using the limited quantity of the elementary holograms.

In the three-dimensional image display devices described above as the embodiments 1 to 3, it is also possible to represent a plurality of point-images by one elementary hologram. Namely, plural point-images can be represented by one elementary hologram if the point-images are located near to each other and in the path of diffracted light from the elementary hologram. The screen panel can represent more quantity of point-images.

Figure 28A:
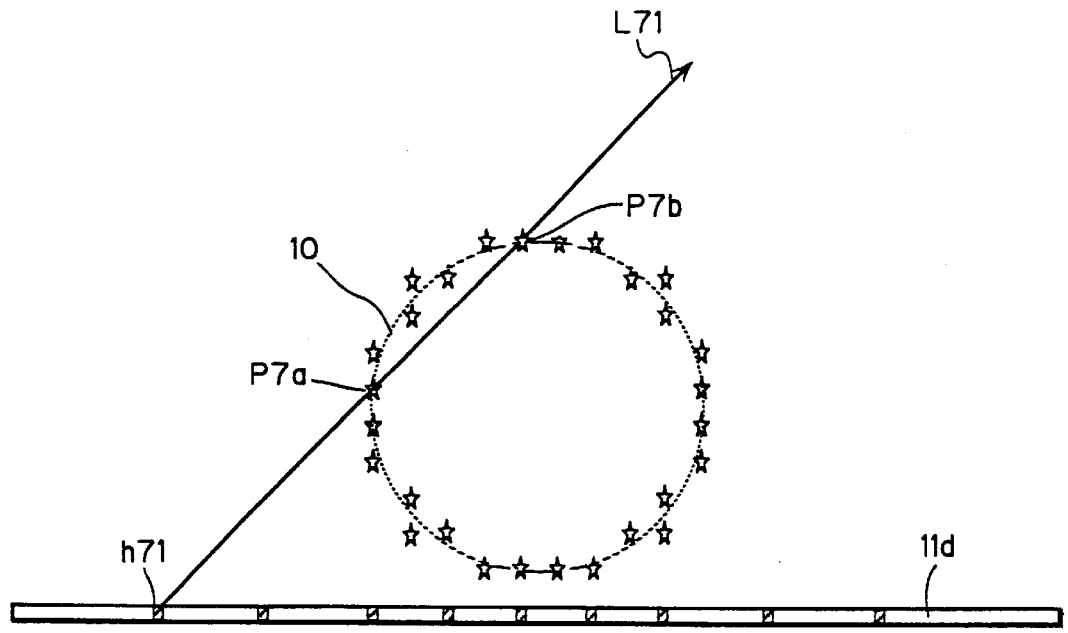
FIG. 28 shows an operating state of a light-diffusing plate when a plurality of dot images by an elementary hologram.
Figure 28B:
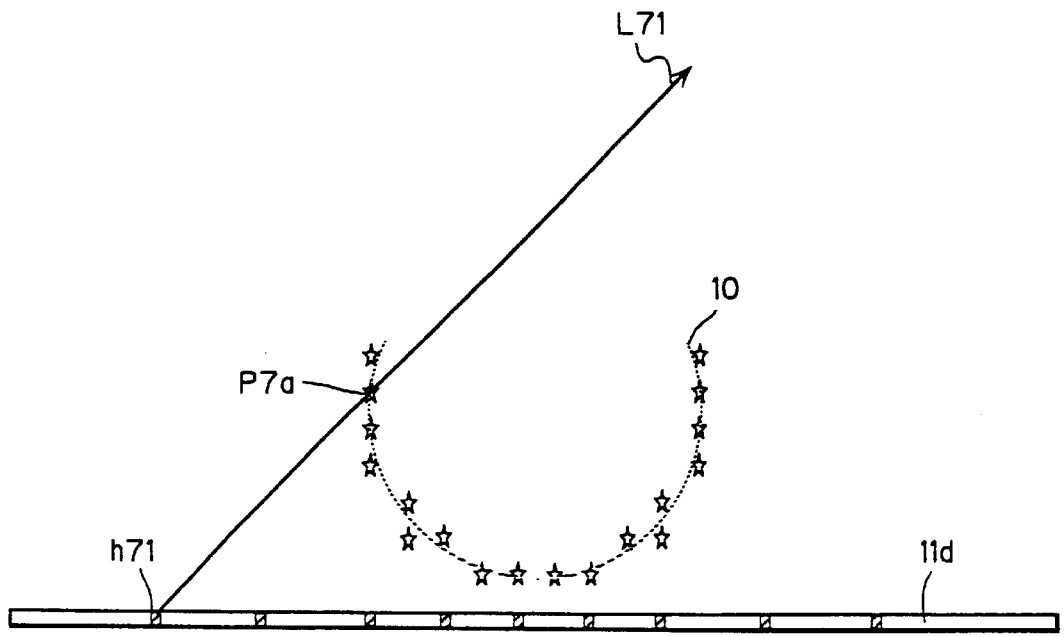

Referring to FIGS. 28A and 28B, the above-mentioned method is explained as follows:

FIGS. 28A and 28B shows the operating state of the device when representing a plurality of point-images by using an elementary hologram. In FIGS. 28A and 28B, an elementary hologram h71 in a screen panel 11$d$ can represent point-images P7$b$ and P7$a$. In the case of FIG. 28A, the point-image P7$a$ has not need to be represented because it is hidden by the point-image P7$b$ when viewing a coming light beam L71. On the other hand, the case of FIG. 28B requires representing the point-image P7$a$ of a three-dimensional cup-shaped image by the hologram h71. This enables the device to represent many point-images by effectively using the limited number of elementary holograms.

Although the three-dimensional image display devices (the embodiments 1 to 3) adopt Lippmann-type (volume-type) elementary holograms as diffraction gratings, it may also use two-dimensional holograms in place of the Lippmann-type holograms. Namely, the screen panel may be of reflection type using the Lippmann-type holograms or it may also be either of reflection type or transmission type by using two-dimensional elementary holograms or diffraction gratings.

The embodiments of three-dimensional image display devices using a reflection type screen panel composed of elementary holograms were explained and an example of preparing elementary holograms composing the screen panel was described with reference to FIG. 16. An embodiment of another method of preparing elementary holograms according to the present invention and an embodiment of three-dimensional image display device which uses a screen panel made by the elementary hologram preparing method will be described below:

Fourth Embodiment

Figure 29:
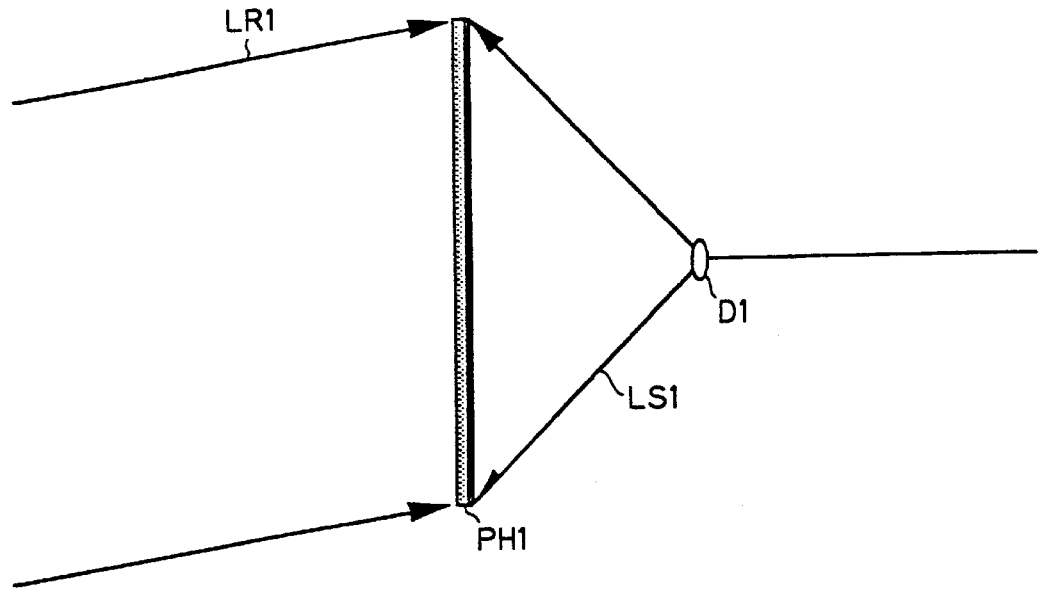
FIG. 29 shows an optical system for producing a master hologram for a dot hologram to be used in a process of preparing a reflecting type elementary hologram.
Figure 30:
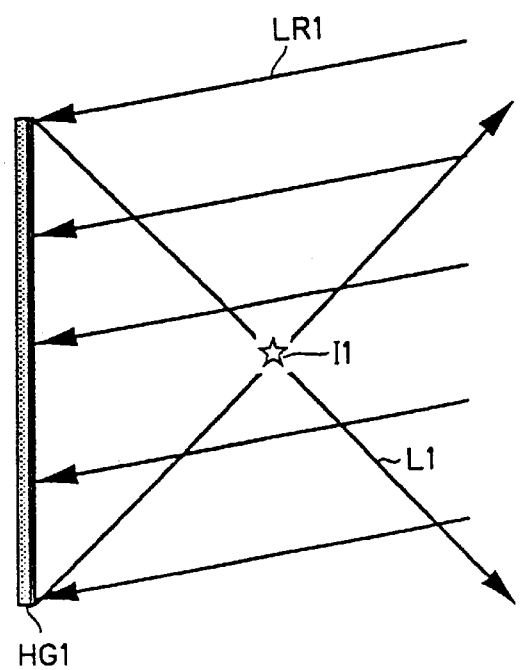
FIG. 30 shows an image reproducing effect of a dot image hologram prepared by the process shown in FIG. 29.
Figure 31:
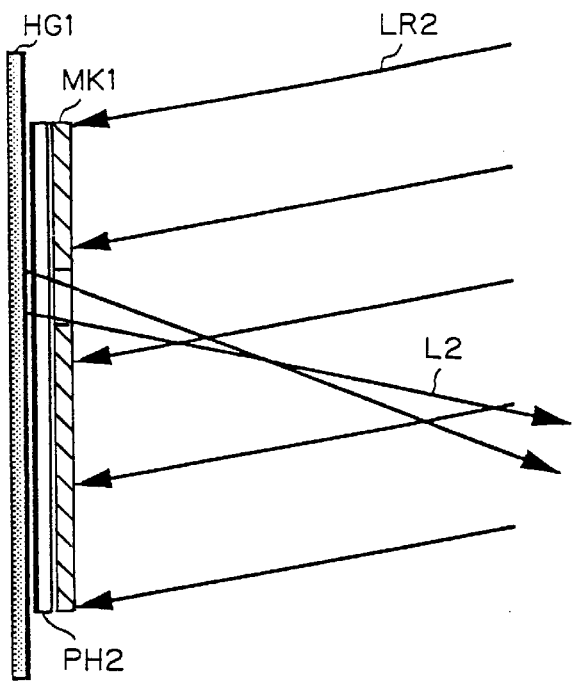
FIG. 31 shows an optical system for preparing an elementary hologram by using a dot-image hologram prepared by the process shown in FIG. 29.

FIGS. 29 to 31 schematically illustrate a method for preparing elementary holograms according to the present invention.

As shown in FIG. 29, a transparent substrate coated with holographic light-sensitive material (hereinafter referred to as hologram recording material PH1 in FIG. 29) is first placed with coated side directed to a diffusing plate D1. A coherent beam of, e.g., laser light is directed into the diffusing plate D1 and spherical divergent light LS1, which is a beam of diffused transmitted light from the diffusing plate D1, is entered as a signal beam diffracted by the object into the hologram recording material PH1. Plane-wave light LR1 as a reference beam is entered into the back side of the hologram recording material PH1 as shown in FIG. 29. In this case, it is possible to converge diffused light by using a projecting lens disposed at a distance of its focal length from the light-source side of the diffusing plate D1 and an aperture disposed just behind the diffusing plate D1. This is applied to reduce a size of a point-image (to be described later).

The used hologram recording material PH1 is processed for settling after being developed and bleached if it is made of silver-salt. The hologram recording material PH1 is processed by ultraviolet-ray curing and baking if it is photopolymer material.

When a prepared hologram HG1 of a point-image is illuminated by plane-wave light LR1' from the opposite side to the reference beam used for recording the point-image, as shown in FIG. 30, it can reproduce a bright dot-like point-image at a place whereat the diffusing plate D1 used for recording the hologram was located.

This point image is a real image reproduced as the result of converging thereat light L1 diffracted (reflected) by the point-image hologram HG1.

The point-image hologram HG1 which can act as a reflecting mirror is tightly attached to a mask MK1 with an opening of a desired size and an unexposed hologram recording material PH2 as shown in FIG. 31.

The mask MK1 may be prepared by stripping a metal film deposited on a glass substrate by using an electron beam drawing machine which is usually used for drawing IC mask patterns and the like. A liquid-crystal spatial light-modulator, which is usually used in LC televisions, may be also used as a mask allowing real-time rewriting.

It is desired that the recorded side of the point-image hologram HG1 and the material side of the unexposed hologram recording material PH2 are disposed face to face, and the mask MK1, the point-image hologram HG1 and the unexposed hologram recording material PH2 are tightly attached to each other to securely record an interference pattern formed by the plane-wave light LR2 and the diffracted light L2 on the hologram recording material PH2. Diffracted light L2 from the point-image hologram HG1 and plane-wave light LR2 can not enter an area on the hologram recording material, which corresponds to the opening in the mask if there is a space between the recorded surface of the point-image hologram HG1 and the light-sensitive surface of the hologram recording material PH2.

The plane-wave light LR2 propagating reverse to the plane-wave light LR1 shown in FIG. 29 is introduced into the hologram recording material PH2 through the mask MK1. The plane-wave light LR2 and the diffracted light L2 from the point-image hologram HG1 enter from the both opposite sides into the same areas of the unused hologram-recording material PH2 and form an interference pattern that is thus recorded therein.

The interference pattern is a copy of a point-image hologram which is a part of the point hologram HG1 and defined by the visible area of the opening in the mask MK1 as shown in FIG. 31. This single hologram is called hereinafter an elementary hologram and the substrate (hologram recording material) with a record of the elementary hologram is called an elementary hologram panel.

Figure 32:
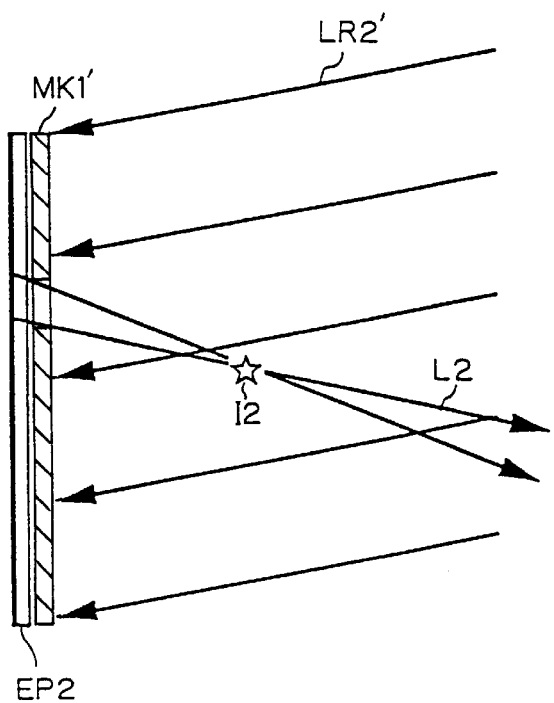
FIG. 32 shows an optical system for reproducing an elementary hologram prepared by using a dot-image hologram prepared by the process shown in FIG. 31.

As shown in FIG. 32, the prepared elementary hologram panel EP2 is overlaid on the mask MK1' being the same as that shown in FIG. 31. When the elementary hologram on the elementary hologram panel EP2 is illuminated by plane-wave light LR2' from the mask side MK1', it reproduces the point-image 12 which is seen in a space.

The description hereto relates how to prepare and reproduce one elementary hologram. In practice, the hologram recording material PH2 is written with a large number of elementary holograms for reproducing respective point-images each having separate visible areas. The following description treats with a recording method that can record a large number of elementary holograms on a hologram recording material so that a three-dimensional space may be discretely filled with point-images each having a wide visible area.

A method for preparing elementary holograms for reproducing a point-image with a widened visible area is first described below.

In FIG. 31, a mask MK1 has an opening and, therefore, the visible area of a point-image 12 is defined by the opening size of the mask as shown in FIG. 32. The visible area of the point image 12 can be widened by using a mask MK2 having a plurality of openings as shown in FIG. 33.

Figure 33:
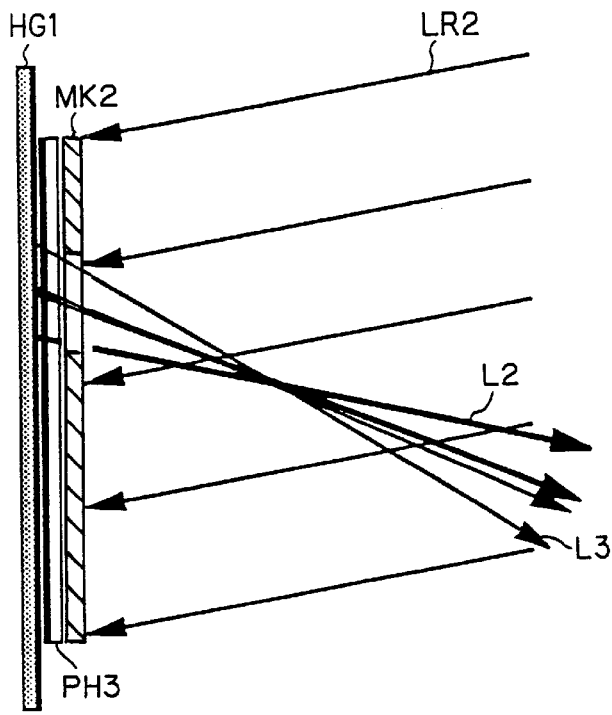
FIG. 33 shows an optical system for preparing an elementary hologram, which is similar to the system of FIG. 31 but has an increased quantity of openings in a mask.
Figure 34:
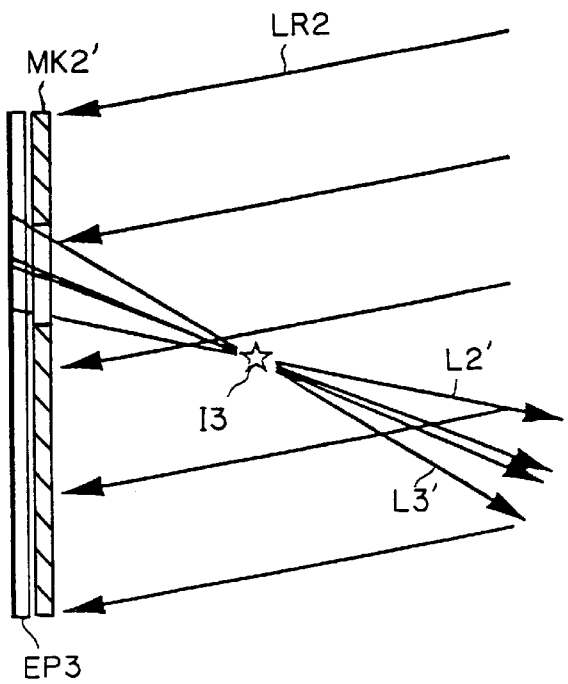
FIG. 34 shows an optical system for reproducing an elementary hologram prepared by using a dot-image hologram prepared by the optical system shown in FIG. 33.

In this instance, the openings in the mask MK2 may be made continuously as shown in FIG. 33. It is, however, preferable to discretely distribute openings for one point image in a whole area of the mask MK2 since elementary holograms for reproducing a plurality of point-images must be recorded on the elementary hologram panel. Namely, the mask having a plurality of discrete openings divides the visible area of one point-image hologram and prepares a plurality of corresponding elementary holograms on the elementary hologram panel. Similarly to the case of FIG. 34, the elementary hologram panel EP3 can reproduce through openings thereon a real point-image I3 having a wide visible area attained by the effect of diffracted beams L2'and L3'.

Figure 35:
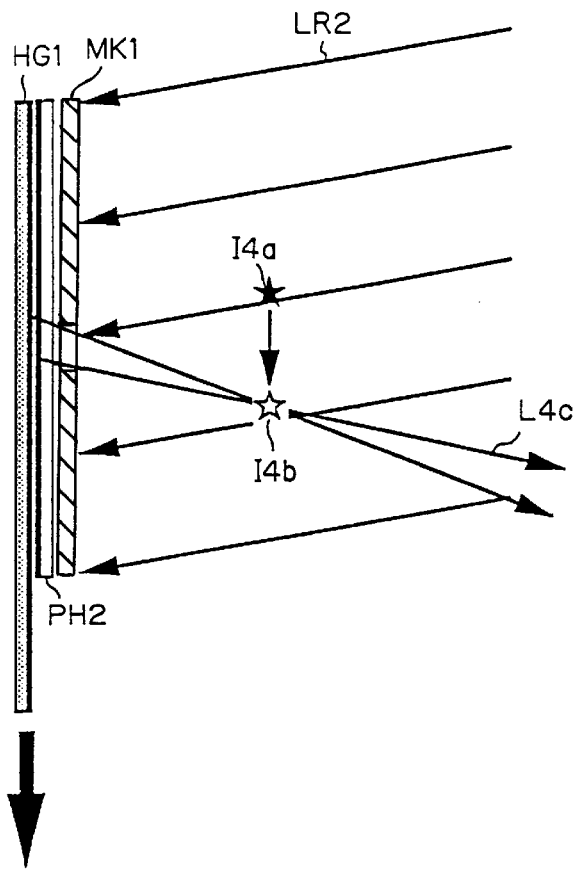
FIG. 35 shows an optical system for preparing an elementary hologram which is capable of reproducing a plurality of dot images.

Another method for recording a plurality of elementary holograms arranged in a two-dimensional plane is described as follows:

As shown in FIG. 35, only a point-image hologram HG1 is moved in the direction of an arrow, a mask having an opening made at a different place (as compared with the mask of FIG. 33) is placed on a hologram recording material PH2 and then a plane-wave beam is introduced into the material PH2 through the mask MK1. A diffracted beam L4c (which forms a real point-image 14b at a position displaced parallel with the material PH2 but at the same vertical distance therefrom) and a plane-wave beam LR2 (which entered thereinto through the mask MK1) form an interference pattern that is recorded as an elementary hologram in the hologram recording material PH2.

In this instance, the mask MK1 must be replaced when the point-image hologram HG1 is displaced. A liquid crystal spatial light modulator may be used in place of the mask MK1 and it can modulate transmittance of e ac h open pixel, eliminating the necessity of replacement of the mask MK1.

Elementary holograms can be prepared one by one on the elementary hologram recording material PH2 by repeating the steps of displacing the point-image hologram HG1 in a two-dimensional plane and opening a different open passage (or increasing the transmittance of a different open pixel). When a thus prepared elementary hologram panel EP4 (FIG. 36) is illuminated by plane-wave light LR2' from the mask MK1' side, two different point-images 15a and 15b are reproduced at the reverse side of the element hologram panel EP4. These two point-images are different from each other by positions and in size of their visible areas (of diffracted beams L4a', L4b' and L4c').

Figure 37:
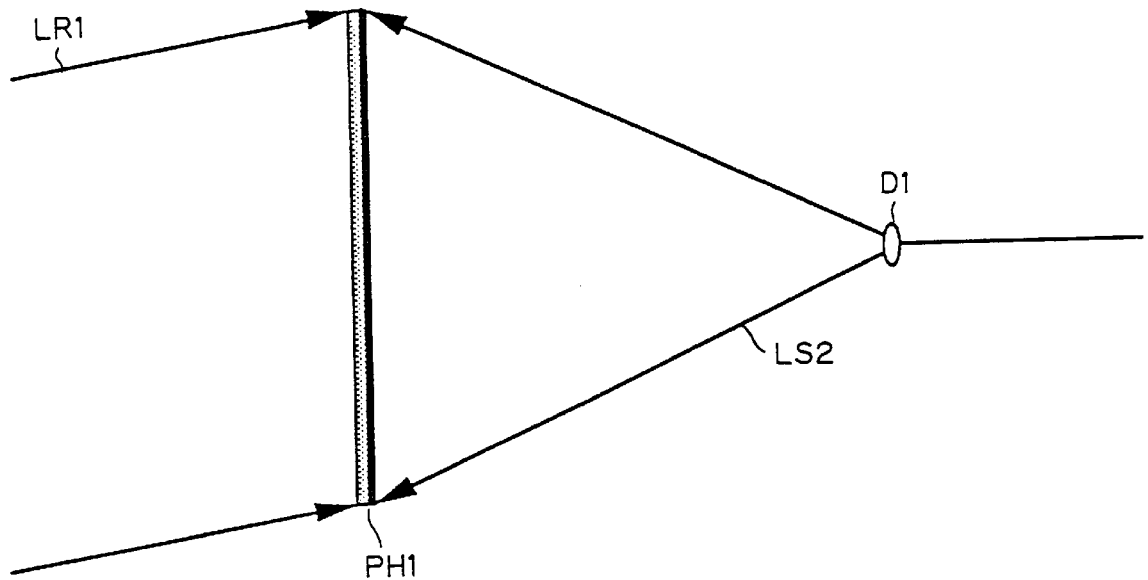
FIG. 37 shows an optical system for preparing a master hologram for a dot image, which is similar to the system of FIG. 29 but differs therefrom by a vertical position of the dot image relative to the hologram surface.

The above-mentioned method relates to preparation of elementary holograms in an elementary hologram panel for reproducing a plurality of point-images having divided visible areas in a plane parallel to the surface of the elementary hologram panel. Next, a method of preparing elementary holograms in an elementary hologram panel for reproducing a plurality of point-images having divided visible areas in a plane at any desired vertical distance from the elementary hologram panel will be described below:

To prepare an elementary hologram for reproducing a point-image at a specified vertical distance from an elementary hologram panel, a diffusing panel D1 is first displaced from a position shown in FIG. 29 to a necessary position shown in FIG. 37 (at larger distance) relative to a hologram recording material and a master point-image hologram HG1 is prepared.

Figure 38:
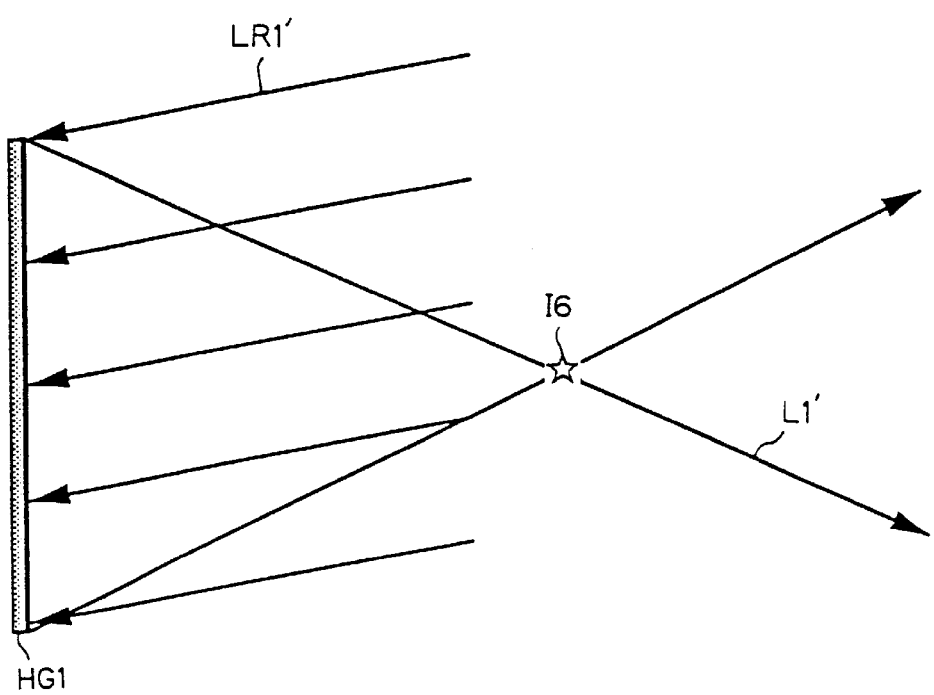
FIG. 38 shows a method for forming a reproduced image of a dot-image hologram prepared by the optical system shown in FIG. 37.

When the recorded point-image hologram HG1 is illuminated by a plane-wave beam LR1' (FIG. 38) whose propagating direction is reverse to that of a plane-wave beam LR1 (FIG. 37), a diffracted beam L1' occurs and reproduces a real point-image I6 at a position whereat the diffusing plate was placed.

Figure 36:
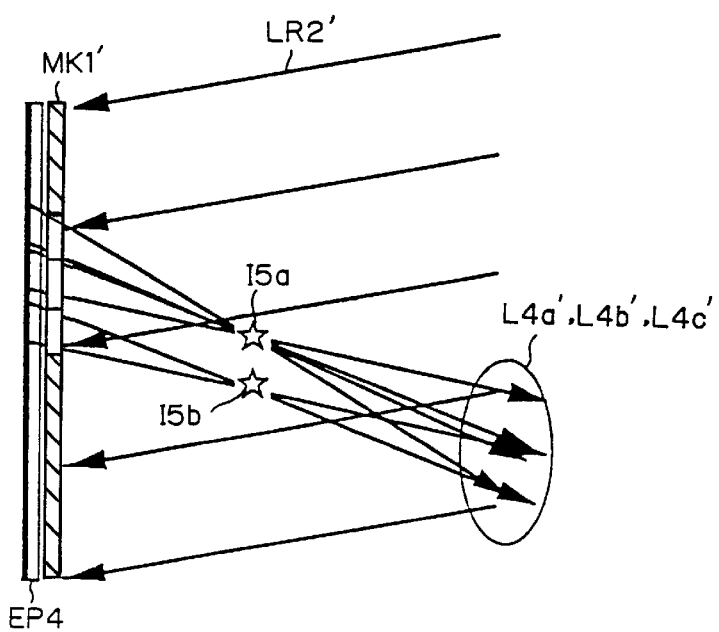
FIG. 36 shows an optical system for reproducing an elementary hologram prepared by the process shown in FIG. 35.
Figure 39:
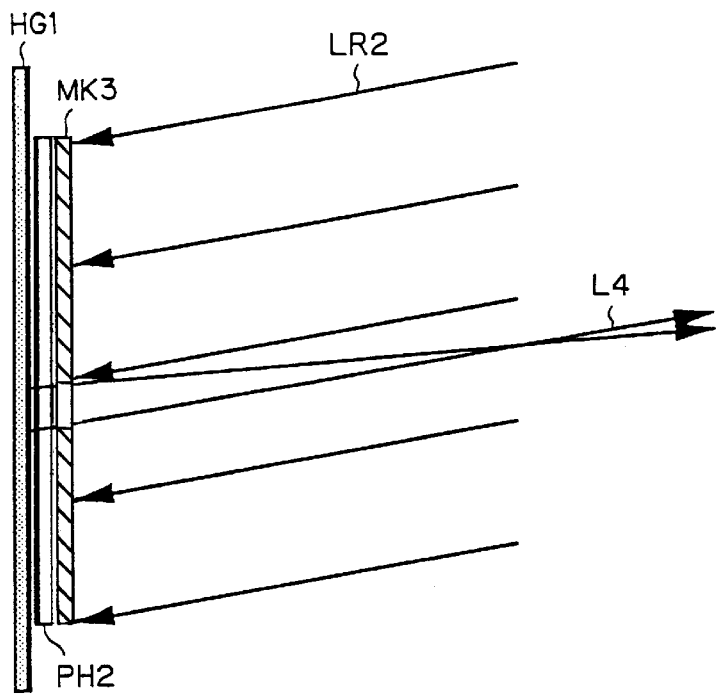
FIG. 39 shows an optical system for producing an elementary hologram prepared by the process shown in FIG. 37.

As shown in FIG. 39, a hologram recording material PH2 is sandwiched between a thus acting point-image hologram HG1 and a mask MK3 having an opening whose position is different from that of the mask MK1' (FIG. 36). With radiation of a plane-wave beam LR2 through the mask MK3, a diffracted beam L4 from the point-image hologram HG1 and the plane-wave beam LR2 form an interference pattern by two beams, which pattern is recorded on an unexposed portion of the hologram recording material as an elementary hologram.

Figure 40:
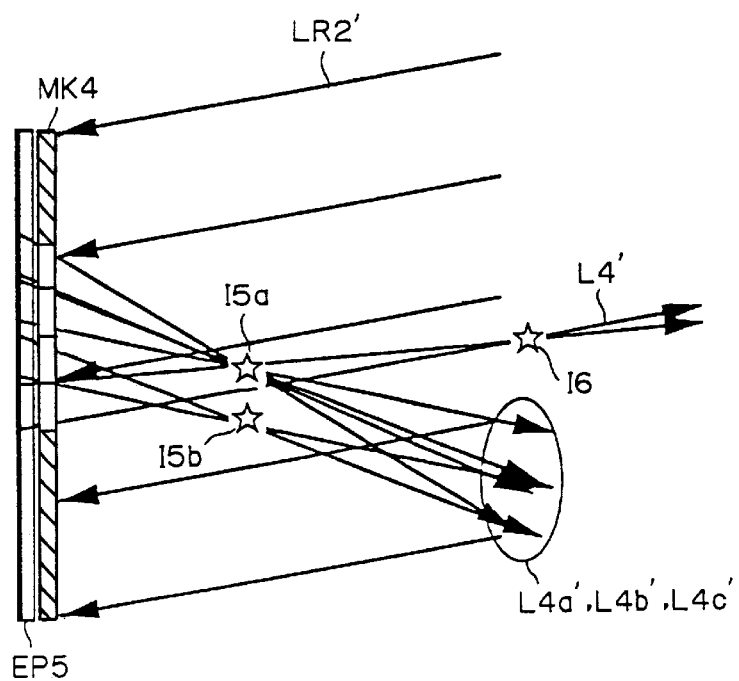
FIG. 40 shows an optical system for reproducing an elementary hologram synthesized from holograms of FIGS. 36 and 39.

The thus prepared elementary hologram panel EP5 is placed in a position shown in FIG. 40 and can reproduce another distant point-image I6 in addition to two point-images 15a and 15b (FIG. 36).

A plurality of master holograms HG1 of point-images having different depths are prepared by discretely changing a distance between the hologram recording material PH1 and the diffusing plate D1 (FIG. 37), then elementary holograms for reproducing point-images at different distant positions in a depth direction can be prepared by repeating the above-described procedure with the master holograms HG1.

Furthermore, a number of elementary holograms for dividing a visible area of each of different distant point-images are recorded on a whole surface of a hologram recording material by applying the method shown in FIG. 31 as well as a number of elementary holograms for reproducing point-images in different two-dimensional planes being parallel to the elementary hologram panel are recorded on a whole surface of the hologram recording material by applying the method shown in FIG. 35.

A total procedure including the above-mentioned methods is as follows:

First step is to prepare a plurality of holograms for reproducing point-images at different levels and tightly sandwich an unexposed hologram recording materiel between each point-image hologram and a mask (liquid crystal spatial light-modulator).

Figure 41:
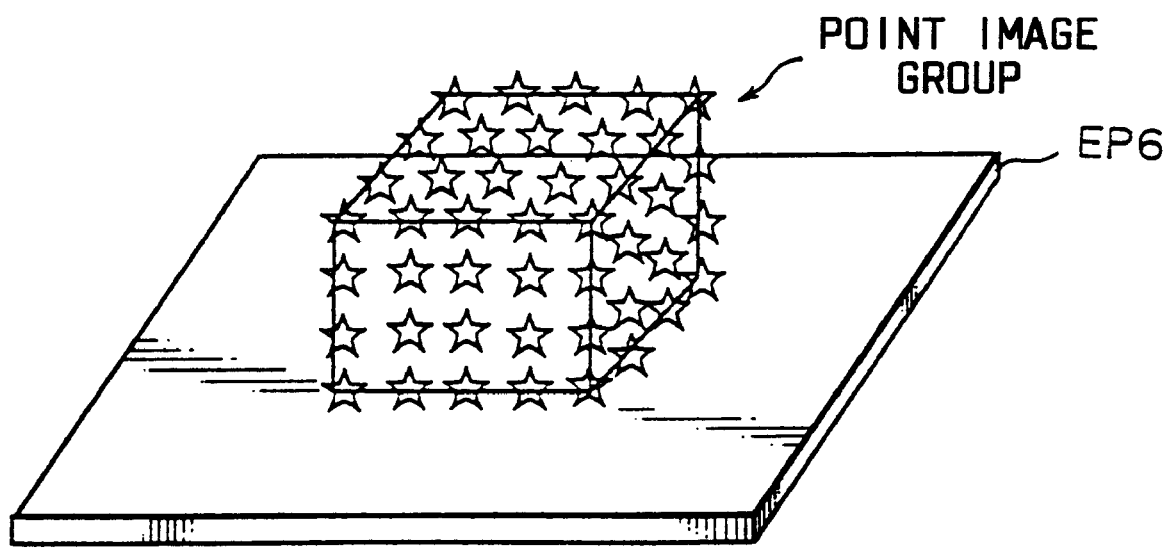
FIG. 41 shows a state that all point-images prepared as elementary holograms in an elementary hologram panel are reproduced.

The point image hologram is moved in a plane. The transmittance of suitably selected open pixels in a whole surface of the liquid-crystal spatial light-modulator is increased to allow light enough to expose the hologram recording material, thus copying point-image holograms thereto. When the point-image hologram moved all over the plane of the hologram recording material and all point-image holograms were copied thereon, the point-image hologram is replaced by another one and, then, the same copying procedure is repeated. As the result of the repeated operations, the thus prepared elementary hologram panel EP6 can reproduce a three-dimensional group of point-images set in a space above the elementary hologram panel EP6 as shown in FIG. 41.

In this embodiment, a point-image hologram is used as a master hologram and recorded in divisions of its visible area. However, it is not necessarily to use a point-image hologram. A reflecting mirror, which is capable of reflecting incident plane-wave light and collecting it at a point, can be applied in place of the point-image hologram.

In the case of recording a large number of elementary holograms for reproducing a large number of point-images in a plane at the same level from an elementary hologram panel, the shown embodiment moves a master hologram of point-images (or a reflecting mirror that can reflect incident plane-wave light to collect at a point) in its plane and replaces a mask by another. The same pattern mask may be used for recording elementary holograms of respective point-images. In this instance, the same pattern mask whose openings have the same relative positions and differ from each other only by their absolute positions of gravity center of the mask pattern and, therefore, another point-image elementary holograms of another point-image can be also recorded on an unexposed portion of the hologram recording material PH2 by moving the point-image hologram HG1 (FIG. 35) and the mask MK1 at the same time.

Fifth Embodiment

A three-dimensional image display device which is the fifth embodiment of the present invention and which uses a reflection type elementary hologram panel made by the procedure described in the fourth embodiment will be explained below.

Figure 42:
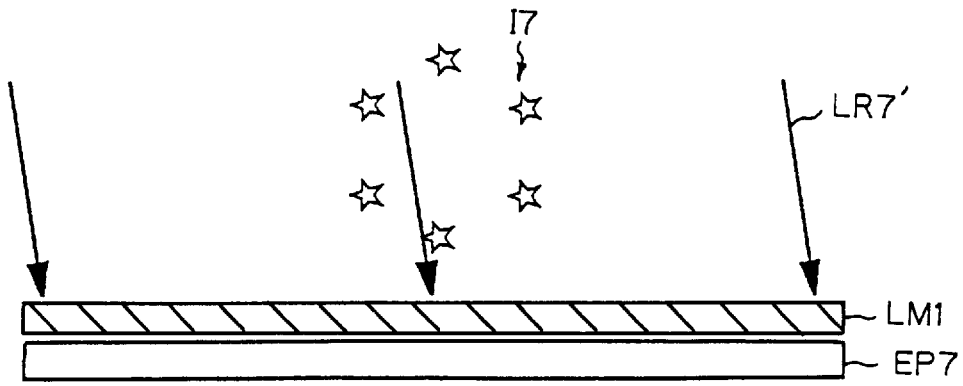
FIG. 42 is a construction view of a three-dimensional image display device using reflection type elementary holograms according to the present invention.

In FIG. 42, a liquid crystal spatial light-modulator LM1 is placed on an elementary hologram panel EP7 in such a manner that respective elementary holograms in the elementary hologram panel EP7 correspond to respective pixel openings in the liquid crystal spatial light-modulator LM1. When plane-wave light LR7' enters into the liquid-crystal spatial light-modulator LM1, the latter LM1 selects illumination or non-illumination (or intensity) for each elementary hologram and reproduces a circular image I7 above the elementary hologram panel EP7.

As shown in FIG. 41, elementary hologram panel EP6 contains elementary holograms which can reproduce discrete point-images in a limited three-dimensional space above the elementary hologram panel EP6. A visible area of each point-image is restricted by the size of the elementary hologram panel EP6.

The liquid-crystal spatial light-modulator LM1 can control every elementary hologram to be reproduced (illuminated) or not to be reproduced (illuminated) by controlling the transmittance of its pixel openings each of which corresponds to one of the elementary holograms in the elementary hologram panel EP6.

A circular image shown in FIG. 42 can be represented above the elementary hologram panel EP7 when element holograms for reproducing point-images composing the circle are selected, only corresponding pixel openings are lightened (by increasing their transmittance) and other pixel openings are shut off (by reducing their transmittance to zero) by the liquid-crystal spatial light-modulator LM1. In this instance, it is, of course, possible to adjust the brightness of the reproduced image by controlling the transmittance of the selected pixel openings at a desired, e.g., middle level.

When all elementary holograms corresponding to respective point-images are reproduced, all point-images obtain a widened visible area, resulting in that normally hidden point-images appear. To solve this problem, the shown device conducts the following hidden point/line processing:

Commonly in the cases of FIGS. 42 to 45, the upper surface of the liquid-crystal spatial light-modulator LM1 is illuminated by a plane-wave beam LR7' which diameter is the same as the diameter of the modulator LM1. This is achieved by using a well known optical system (not shown). Namely, a coherent laser beam from a laser light source is enlarged by a combination of a microscope object lens and collimating lens for or a combination of a microscope object lens and a parabolic mirror.

Figure 43:
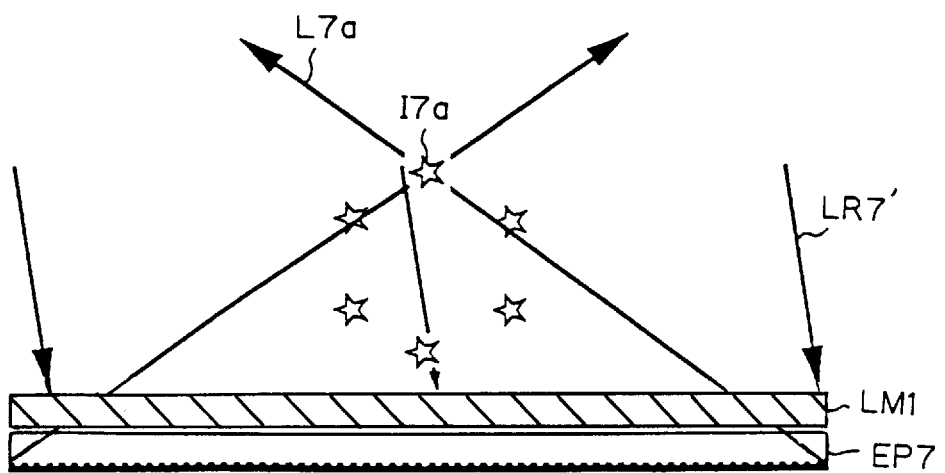
FIG. 43 shows is a view for explaining how to process hidden dots and lines, which is a part 1 of the explanation and illustrates a three-dimensional image display similar to that shown in FIG. 42.

In FIG. 43, a top point-image I7a, which is one of point-images forming a circular image and has a plurality of elementary holograms widely dispersed on a whole surface of an elementary hologram panel EP7, may be reproduced by reproducing all corresponding elementary holograms since a light beam from the reproduced image point I7a does not transverse any other image point. Therefore, the liquid-crystal spatial light-modulator LM1 selects and reproduces all relating elementary holograms of the top point-image I7a, i.e., all elementary holograms which relate to the top point-image I7a and are illustrated by dotted line on the elementary hologram panel EP7.

Figure 44:
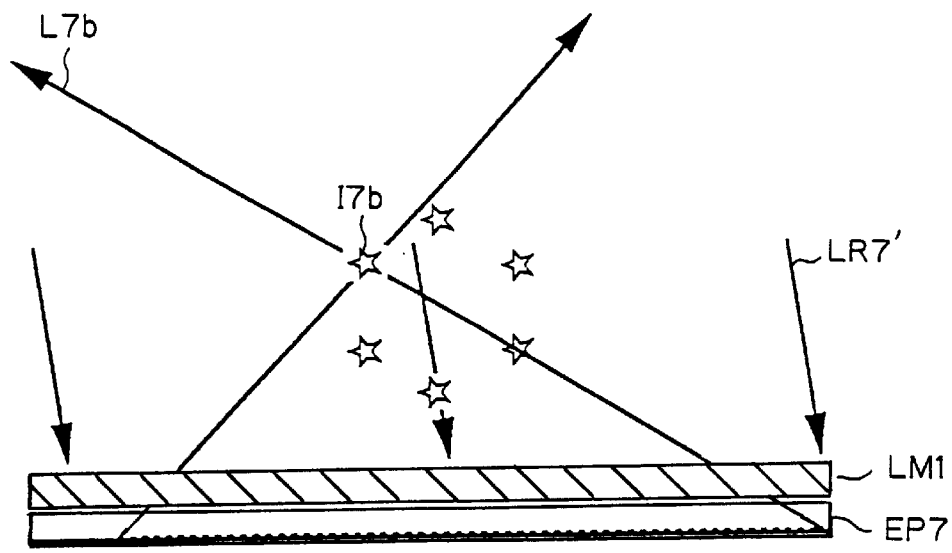
FIG. 44 is a view for explaining how to process hidden dots and lines, which is a part 2 of the explanation and illustrates a three-dimensional image display similar to that shown in FIG. 42.

In FIG. 44, a second (from the top) point-image I7b may be reproduced with processing hidden points and lines in the following way:

In this case, the second point-image I7b can be reproduced by selecting and reproducing all elementary holograms which relate to the second image point I7b and exist on a right-side area (dotted-line portion of the panel shown in FIG. 44) since light (diffracted light L7b) from the reproduced second point-image I7b does not cross any other point-image and can not be seen through any other point image. Accordingly, it is possible to process the hidden points and lines in relation to this point image I7b.

Figure 45:
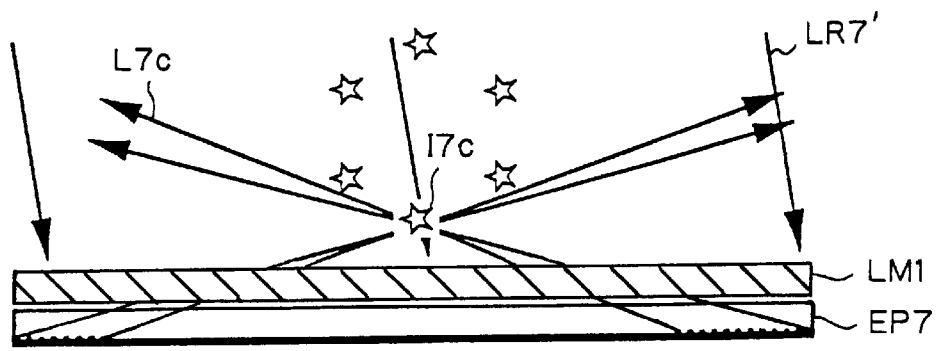
FIG. 45 is a view for explaining how to process hidden dots and lines, which is a part 3 of the explanation and illustrates a three-dimensional image display similar to that shown in FIG. 42.

Similarly, in FIG. 45 a bottom point image I7c may be reproduced by selecting and reproducing elementary holograms which exist in both end-side-areas (shown by a dotted line on the elementary hologram panel) and correspond to the point-image I7c.

Figure 46:
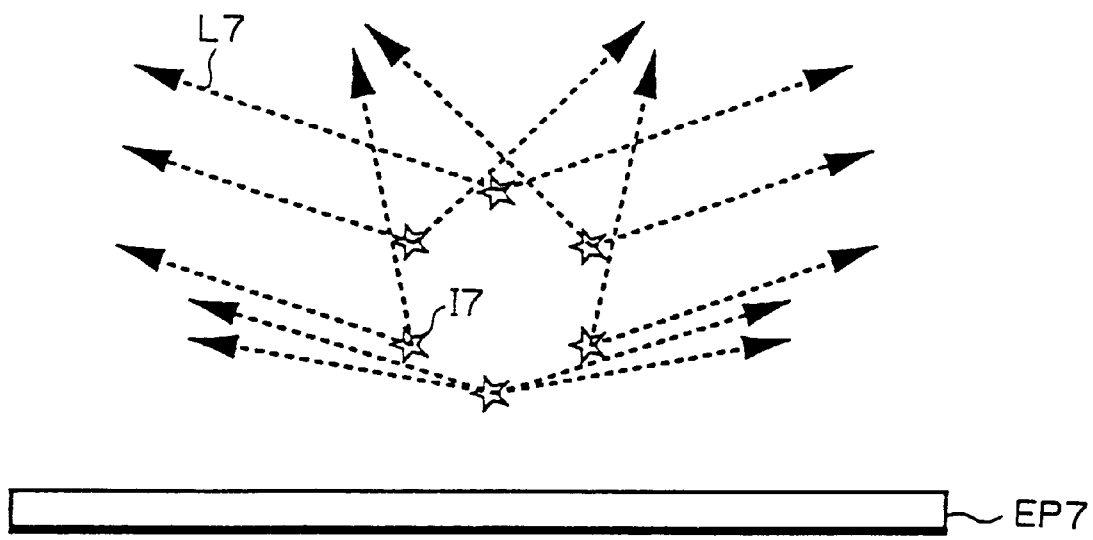
FIG. 46 illustrates a three-dimensional image which has been processed for eliminating hidden dots and lines.

Other point-images are produced in the same way and at the same time. As a result, no light-beam L7 from any one of the point images is found within the areas of respective point-images when viewing a whole reproduced image from the top side of the elementary hologram panel EP7 as shown in FIG. 46. Namely, a circular stereo-image can be visually recognized with processed hidden points and lines.

As described above, the three-dimensional image display device provided with the elementary hologram panel according to the present invention can reproduce any desired three-dimensional image with processed hidden points/lined (without appearing hidden points and lines) above the elementary hologram panel.

Although no reflected-light (zero-order light) is shown in related figures, it is also possible to bring reflected light out of visible area by slanting plane-wave light incident to the liquid-crystal spatial light-modulator. This method, however, may sometime cause such a problem that any liquid-crystal layer of the spatial light modulator may change diffraction angle of light therefrom allowing transmission of undesirable light threrethrough. Accordingly, it is preferred to allow incident light strikes the liquid-crystal spatial light-modulator at a normal angle thereto.

An elementary hologram panel having a high diffraction efficiency may be prepared on a thick sheet of hologram-recording material such as photopolymer HRF700X001-20 made by Doupon Company.

Data on a three-dimensional image to be reproduced may be previously stored in a memory by use of electronic means or may be computed by a computer. The data is transferred to a driver (not shown) of the liquid-crystal spatial light-modulator that can realize real time representation of a three-dimensional image. This feature enables three-dimensional moving picture display.

Sixth Embodiment

While the fifth embodiment uses the liquid-crystal spatial light-modulator to select and reproduce necessary elementary holograms on the elementary hologram panel, the selection of elementary holograms to be reproduced can be also realized by using the following embodiment which uses a high-speed X-Y laser scanning optical system consisting of a light-beam deflector and lens in combination with a light-beam intensity modulator (FIG. 9 shows a basic construction of this embodiment).

In this case, the light-beam intensity modulator not only selects transmission or no-transmission of light but also can control transmittance of light, thus changing the intensity of reproduced light which acted upon the elementary holograms and was diffracted from the elementary hologram panel. This means that brightness of the reproduced image can be adjusted.

The operation of the light-beam intensity modulator is synchronized with the scanning operation of the light-deflector by synchronizing means (not shown). The light-beam intensity modulator determines elementary holograms necessary to be reproduced and brightness of reproduced light on the basis of three-dimensional image data stored by means of a suitable electronic device.

The light-beam deflector performs high-speed horizontal and vertical (X-Y) scans of a plane-wave light-beam having an intensity modulated by the light-beam intensity modulator. This light-beam deflector is disposed at a distance of the focal length from the optical lens.

Light deflected by the light-beam deflector is directed to an elementary hologram panel in such a way that it may fall onto the elementary hologram panel at a substantially right angle therewith. Thus, the shown system can conduct raster scanning of all elementary holograms on the elementary hologram panel with plane-wave light.

A three-dimensional image with processed hidden points and lines according to the present system can be represented on the same principle as described with the fifth embodiment. The further description is therefore omitted.

Although light beams are illustrated as falling perpendicularly to the elementary hologram panel in the related drawings, this embodiment in contrast to the fifth embodiment has no liquid-crystal spatial light-modulator for selecting elementary holograms to be reproduced and can, therefore, slant the incident light to the elementary hologram panel so as to bring zero-order diffracted light from each elementary hologram out of a visible area of an image to be reproduced.

However, in the case of preparing an elementary hologram panel, the liquid-crystal spatial-light-modulator can not be used as a masking device for the above-mentioned purpose because it has usually inferior diffraction characteristics for slant incident light. In this instance, it is desirable to a fixed mask having openings made therein.

As described above, this embodiment can display a three-dimensional image with processed hidden points and lines on an elementary hologram panel according to the image data held by electronic means and can realize real-time rewriting.

The following description relates to a method for preparing a transmission type elementary hologram panel and an embodiment of three-dimensional display device provided with the transmission type elementary hologram panel.

Seventh Embodiment

Figure 47:
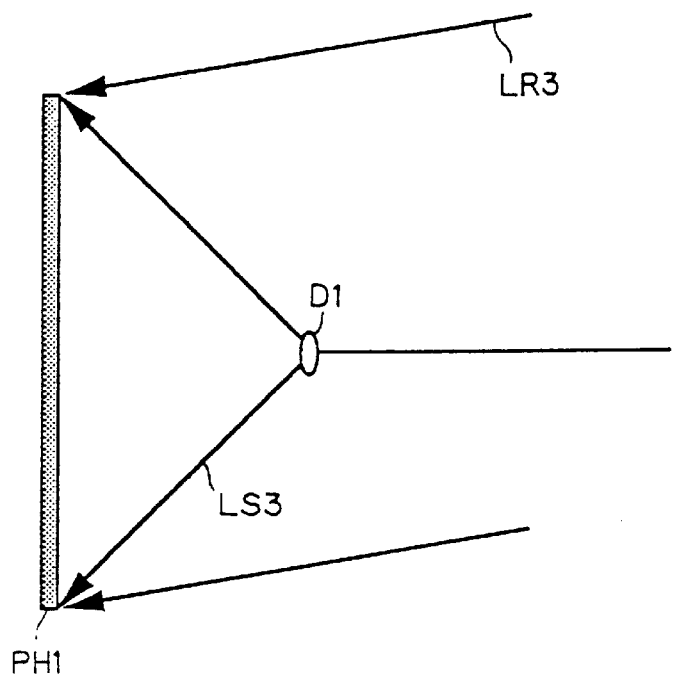
FIG. 47 shows an optical system for producing a master hologram of a dot image to be used in a process of preparing a transmission type elementary hologram.
Figure 48:
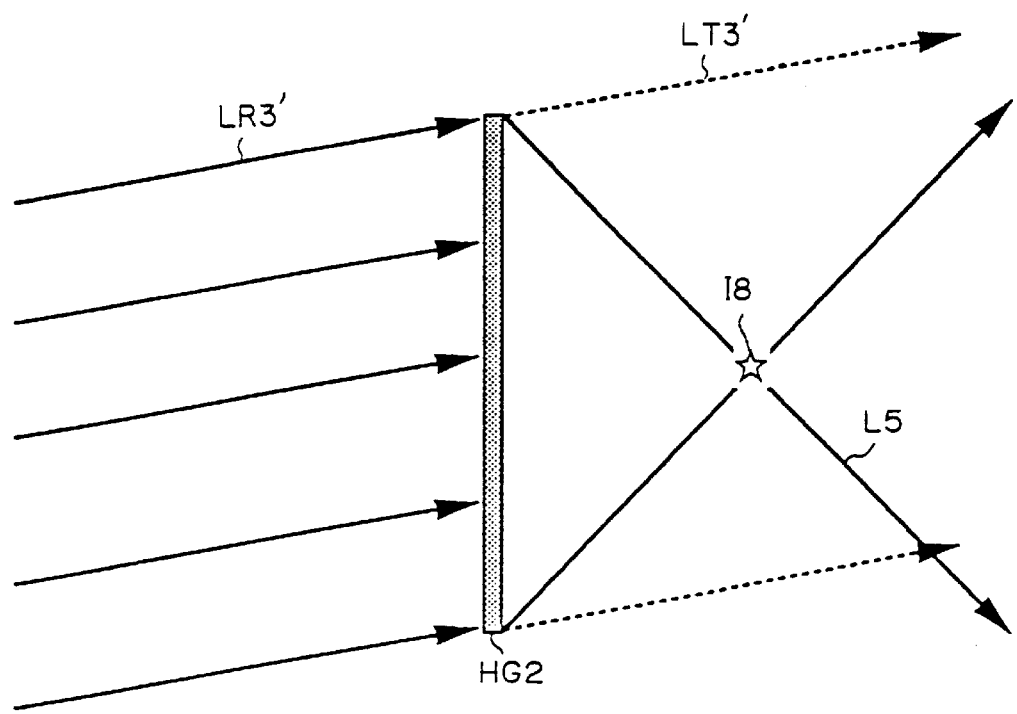
FIG. 48 shows an image reproducing effect of a dot image hologram prepared by the process shown in FIG. 47.
Figure 49:
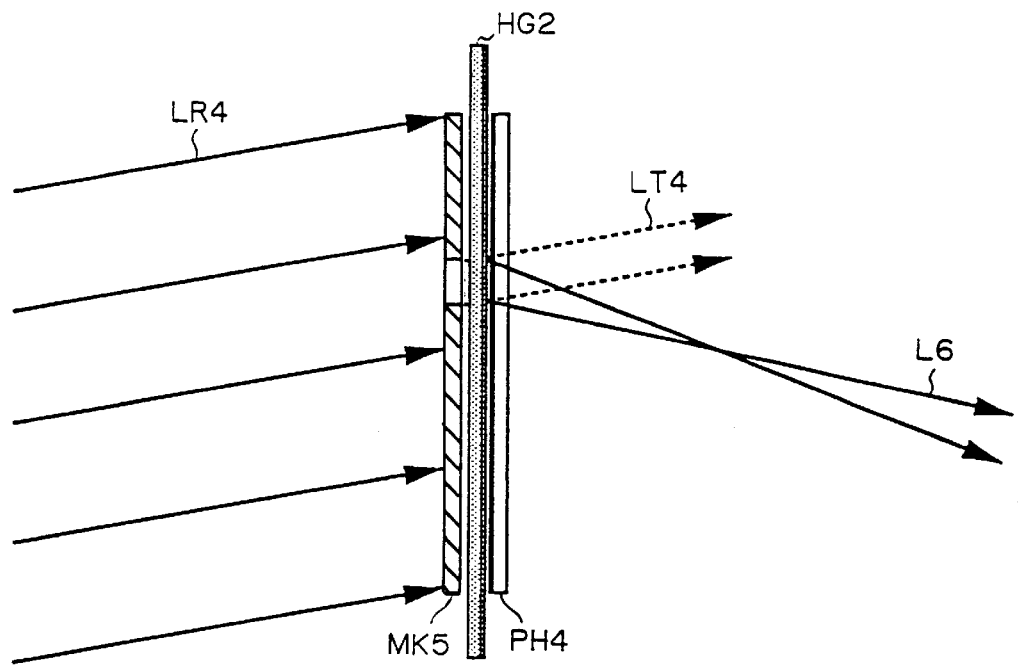
FIG. 49 shows an optical system for preparing an elementary hologram by using a dot-image hologram prepared by the process shown in FIG. 47.

FIGS. 47 to 49 schematically illustrate a method for preparing a transmission type elementary hologram panel according to the present invention.

In FIG. 47, a transparent substrate coated with holographic light-sensitive material (hereinafter referred to as "hologram recording material PH1" including a substrate as shown in FIG. 47) is placed with its coated side directed to a diffusing plate D1.

A coherent beam of, e.g., laser light is brought into the diffusing plate D1 wherefrom diffused transmitted light (spherically scattered light LS3) appears and falls as a signal beam onto the hologram recording material PH1. A plane-wave beam LR3 as a reference beam falls directly onto the hologram recording material PH1 from the same side as the signal beam LS3 (see FIG. 47). In this case, the reference beam LR3 strikes the hologram recording material with a slant angle.

The diffraction efficiency of a hologram to be prepared depends upon light exposure. In this instance, the hologram recording material is exposed to light adjusted so that the hologram may have diffraction efficiency of 50%. The exposed hologram recording material PH1 is processed for settling ofter being developed and bleached if it is made of silver-salt. The hologram recording material PH1 is processed by ultraviolet-ray curing and baking if it is photopolymer material.

When a prepared hologram HG2 of a point-image is illuminated by plane-wave light LR3' from the opposite side to the reference beam used for recording the point-image, it can reproduce a bright dot-like point-image at a place whereat the diffusing plate D1 used for recording the hologram was located.

This point image is a real image reproduced by diffracted light L5 from the hologram HG2 and its visible area depends upon the size of the hologram HG2. This hologram may produce transmitted light LT3' (zero-order diffracted light) since the hologram possesses diffraction efficiency of 50%.

The point-image hologram HG2 is tightly attached to a mask MK5 with an opening of a desired size and an unexposed hologram recording material PH4 as shown in FIG. 49.

The mask MK5 may be prepared by stripping a metal film deposited on a glass substrate by using an electron beam drawing machine which is usually used for drawing IC mask patterns and the like. A liquid-crystal spatial light-modulator, which is usually used in LC televisions, may be also used as a mask allowing real-time rewriting.

The recorded side of the point-image hologram HG2 and the unexposed coat side of the hologram recording material PH4 are closely faced to each other.

It is desired that the mask MK5, the point-image hologram HG2 and the hologram recording material PH4 are disposed as close as possible to each other. If there is a gap between the point-image hologram HG2 and the hologram recording material PH4, an interference pattern of two beams (transmitted light LT4 and diffracted light L6) may be recorded in a small area on the hologram recording material. If there is a gap between the mask MK5 and the hologram recording material PH4, the light LR4 for reproducing the point-image hologram HG2 may have a wave front deformed due to diffraction at an opening of the mask.

The plane-wave light LR4 propagating reverse to the plane-wave light LR3 shown in FIG. 47 is introduced into the point-image hologram HG2 through the opening of the mask MK5. The transmitted light LT4 and the diffracted light L6 from the point-image hologram HG2 enter into the same areas of the unused hologram-recording material PH4 and form an interference pattern that is recorded therein.

The interference pattern is a partial copy of the point-image hologram HG2, which part is defined by the visible area of the opening of the mask MK5 as shown in FIG. 49. This single hologram is called hereinafter "an elementary hologram" and the substrate (hologram recording material) with a record of the elementary hologram is called "an elementary hologram panel".

Figure 50:
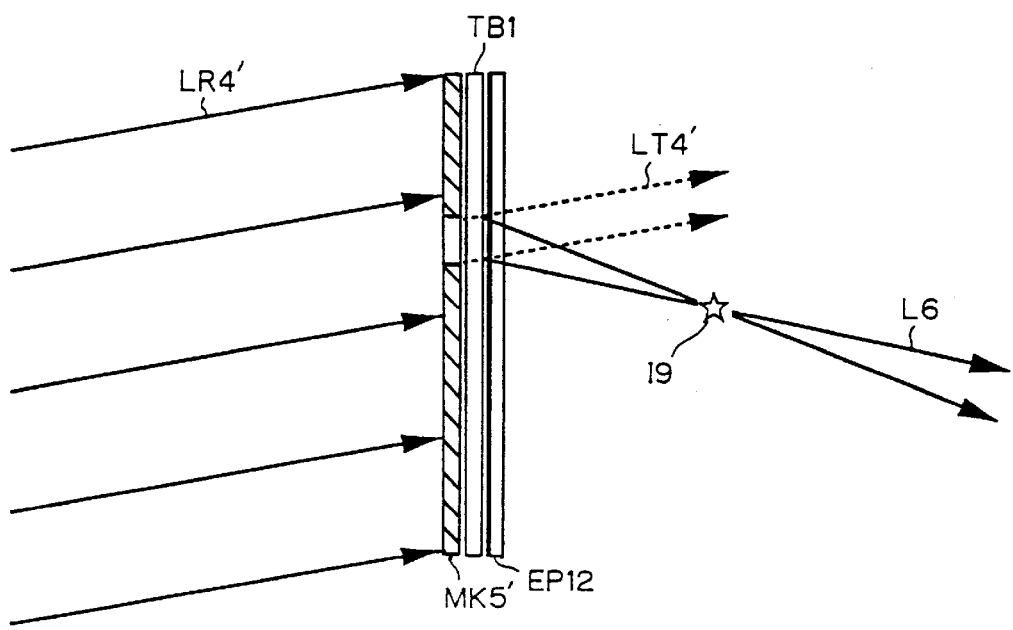
FIG. 50 shows an optical system for reproducing an elementary hologram prepared by using a dot-image hologram prepared by the optical system shown in FIG. 49.

As shown in FIG. 50, the prepared elementary hologram panel EP12 is overlaid on a transparent substrate TB1 placed on the mask MK5' being the same as that shown in FIG. 49. The transparent substrate TB1 has the same refractive index and thickness as the point-image hologram HG2.

When the elementary hologram panel EP12 is illuminated by plane-wave light LR4' through the mask MK5', the elementary hologram prepared therein (by the process of FIG. 49) reproduces the point-image I9 in diffracted light, which is seen in a space above the transmission side of the elementary hologram panel EP12. If the plane-wave light LR4' enters at a slant into the mask MK5' as shown in FIG. 50, it can propagate in the same direction as the light for preparing the hologram through the transparent substrate having the same refractive index and thickness as the elementary hologram panel EP12. Consequently, the point image I9 of the elementary hologram reproduced by the plane-wave light LP4' is bright with no deformation.

The foregoing description relates to a method for preparing and reproducing one elementary hologram. In practice, the hologram recording material PH4 may have a large number of records of elementary holograms for reproducing respective point-images each having divided visible areas. The following description, therefore, treats with a recording method that can record a large number of elementary holograms on a hologram recording material so that a three-dimensional space may be discretely filled with point-images each having a wide visible area.

A method of preparing elementary holograms for reproducing a point-image having an enlarged visible area is first described below:

The point-image I9 prepared by the method of FIG. 49 can reproduce a point image whose visible area is, however, limited by the opening of the used mask MK5 as shown in FIG. 50. Accordingly, a mask having a plurality of openings is used for preparing holograms that can reproduce a point-image having an enlarged visible area.

Figure 52:
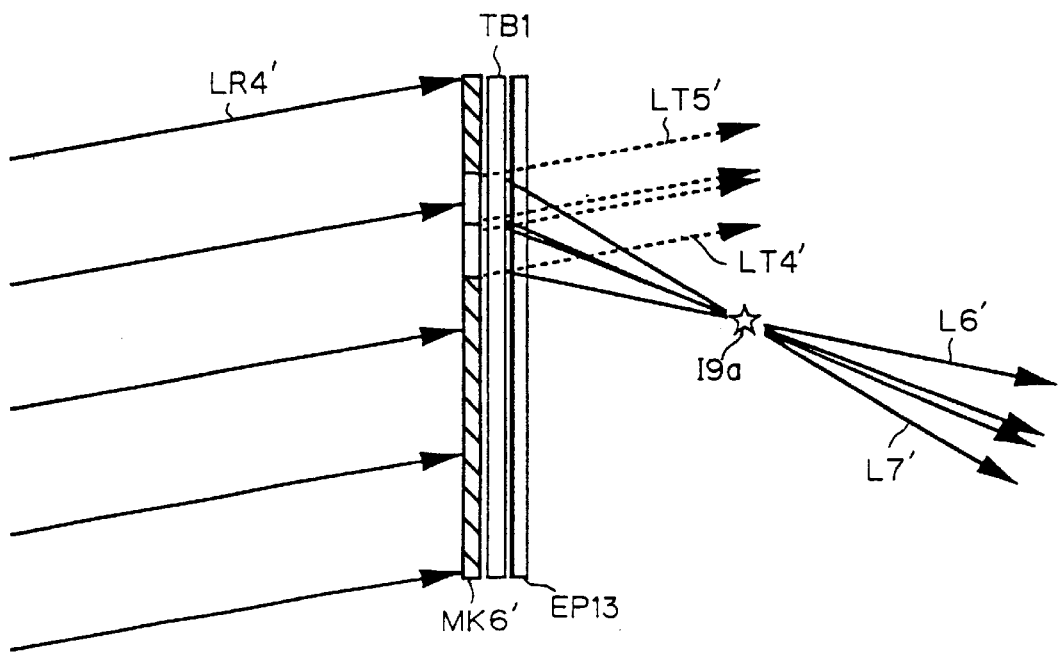
FIG. 52 shows an optical system for reproducing an elementary hologram prepared by using a point-image hologram prepared by the optical system shown in FIG. 51.

Thus, a plurality of elementary holograms having respective divided visible areas are prepared by using a mask having a plurality of openings. These elementary holograms act together for reproducing a point-image having a visible area enlarged (by diffracted beams L6' and L7') as shown in FIG. 52 (in comparison with the point-image of FIG. 50).

Figure 51:
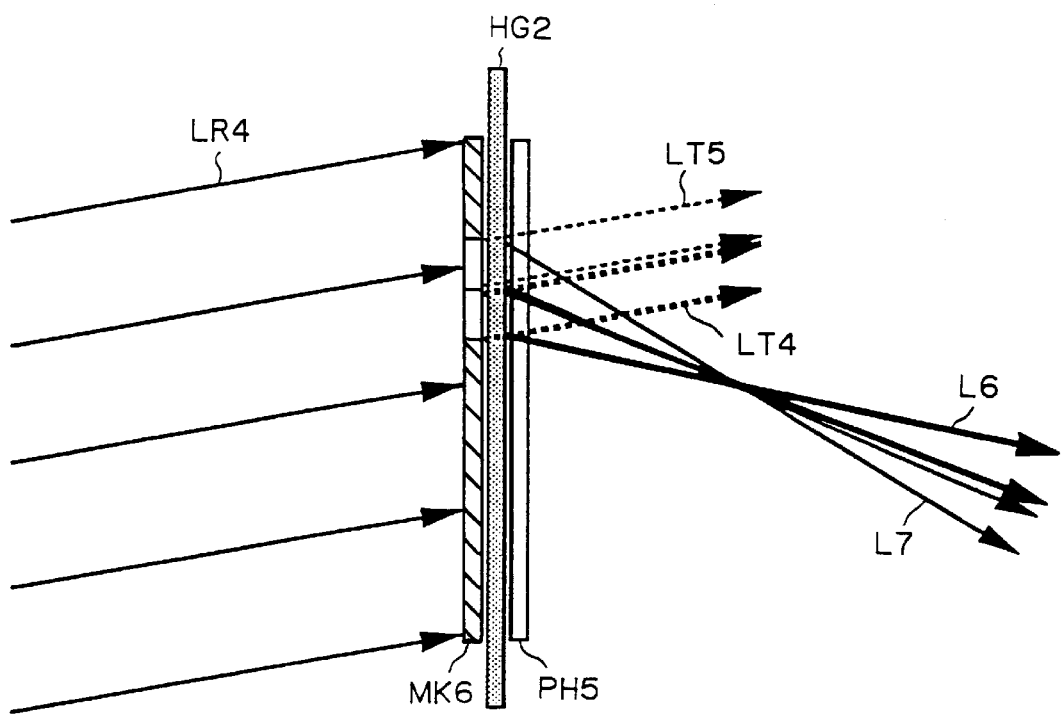
FIG. 51 shows an optical system for preparing an elementary hologram, which is similar to the system of FIG. 49 but has an increased quantity of openings in a mask.

In the case of FIG. 51, the mask MK6 has neighboring openings made therein. However, in view of the necessity of preparing a number of elementary holograms for a plurality of point-images, it is preferred to make openings (for preparing holograms for one point-image) as scattered over a whole area of the mask.

A method for preparing elementary holograms for reproducing a plurality of point-images as arranged in a two-dimensional plane is described below.

Figure 53:
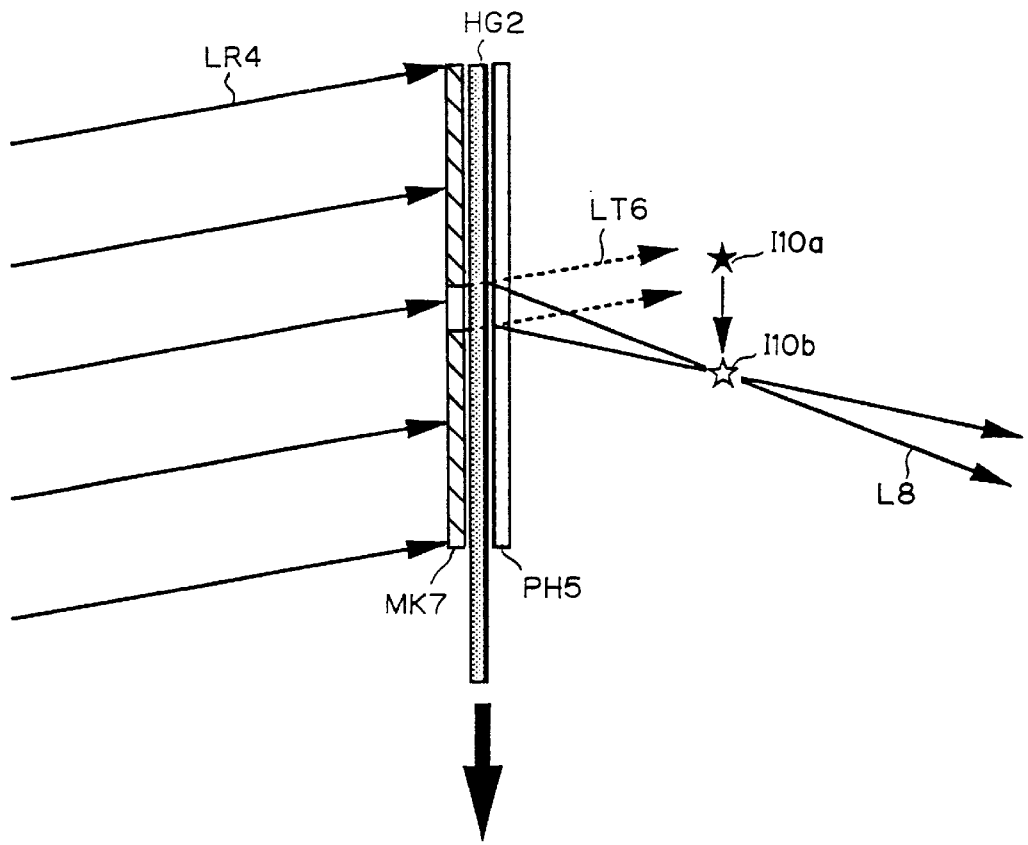
FIG. 53 shows an optical system for preparing an elementary hologram which is capable of reproducing a plurality of point-images.

As shown in FIG. 53, a point-image hologram HG2 sandwiched between a mask MK7 and a hologram recording material PH5 is moved and exposed to a plane-wave light LR4 through a mask MK7 (which differs the mask of FIG. 51 by the arrangement of its opening). A diffracted beam L8 (which forms a real point-image I10b at a position displaced parallel with the material PH5 but at the same vertical distance therefrom) and a plane-wave beam LT6 (which transmitted through the point-image hologram HG2) form an interference pattern that is recorded as an elementary hologram in the hologram recording material PH5.

In this instance, the mask MK7 must be replaced for another one (with a different opening) every time when the point-image hologram HG2 is displaced. A liquid crystal spatial light modulator may be used in place of the mask MK7 and it can modulate transmittance of each open pixel, eliminating the necessity of replacement of the mask MK7.

Figure 54:
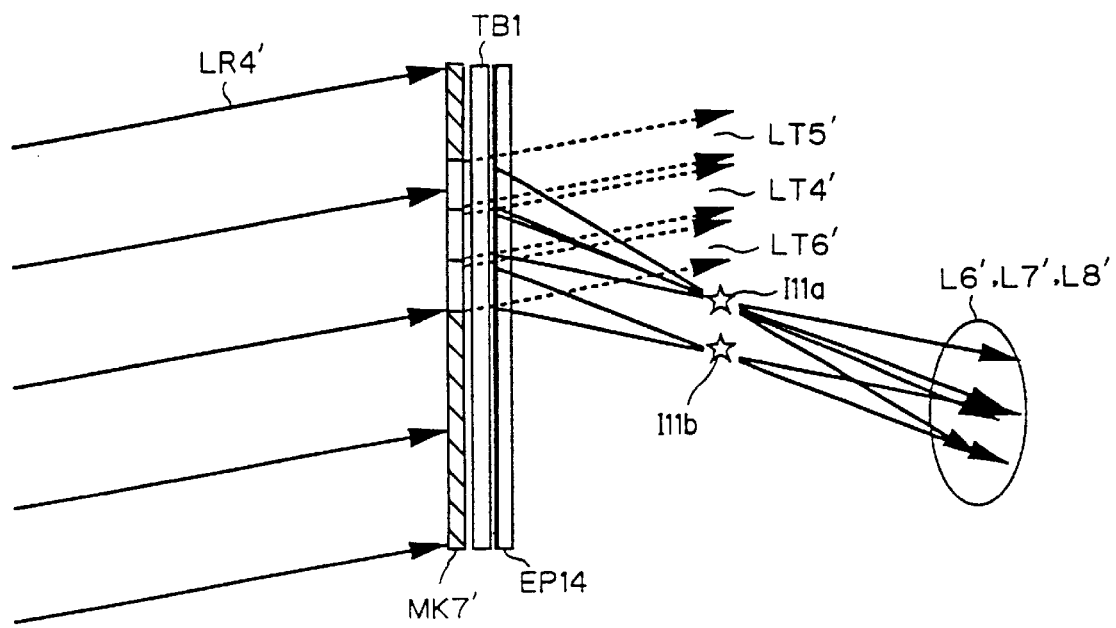
FIG. 54 shows an optical system for reproducing an elementary hologram prepared by the optical system shown in FIG. 53.

Elementary holograms can be prepared one by one on the elementary hologram recording material PH5 by repeating the steps of displacing the point-image hologram HG2 in a two-dimensional plane and opening a different passage (or increasing the transmittance of a different pixel opening). A thus prepared elementary hologram panel EP14 is tightly assembled with a transparent substrate TB1 (whose refractive index and thickness are the same as the panel EP14) and mask MK7' as shown in FIG. 54. When the elementary hologram panel EP14 is illuminated by plane-wave light LR4' through the mask MK7' and the transparent substrate TB1, two point-images I11a and I11b are reproduced in a space on the transmission side of the elementary hologram panel EP14. These two point-images are different from each other by positions and in size of their visible areas.

Figure 55:
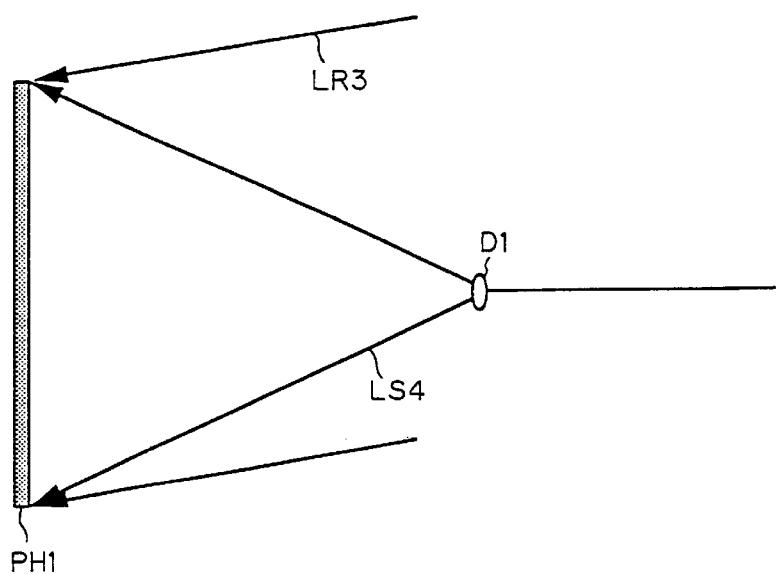
FIG. 55 shows an optical system for preparing a master hologram for a point image, which is similar to the system of FIG. 47 but differs therefrom by a vertical position of the point image relative to the hologram surface.

The above-mentioned method relates to preparation of elementary holograms in an elementary hologram panel for reproducing a plurality of point-images I11 each having divided visible areas in a spatial plane parallel to the surface of the elementary hologram panel EP14. Next, a method of preparing elementary holograms in an elementary hologram panel for reproducing a plurality of point-images each having divided visible areas in a spatial plane at any desired vertical distance from the elementary hologram panel will be described below:

To prepare an elementary hologram for reproducing a point-image at a specified vertical distance from an elementary hologram panel, a diffusing panel D1 is first displaced from a position shown in FIG. 47 to a necessary position shown in FIG. 55 (far therefrom in the case of FIG. 55) relative to a hologram recording material PH1 and a master point-image hologram HG2 is prepared.

Figure 56:
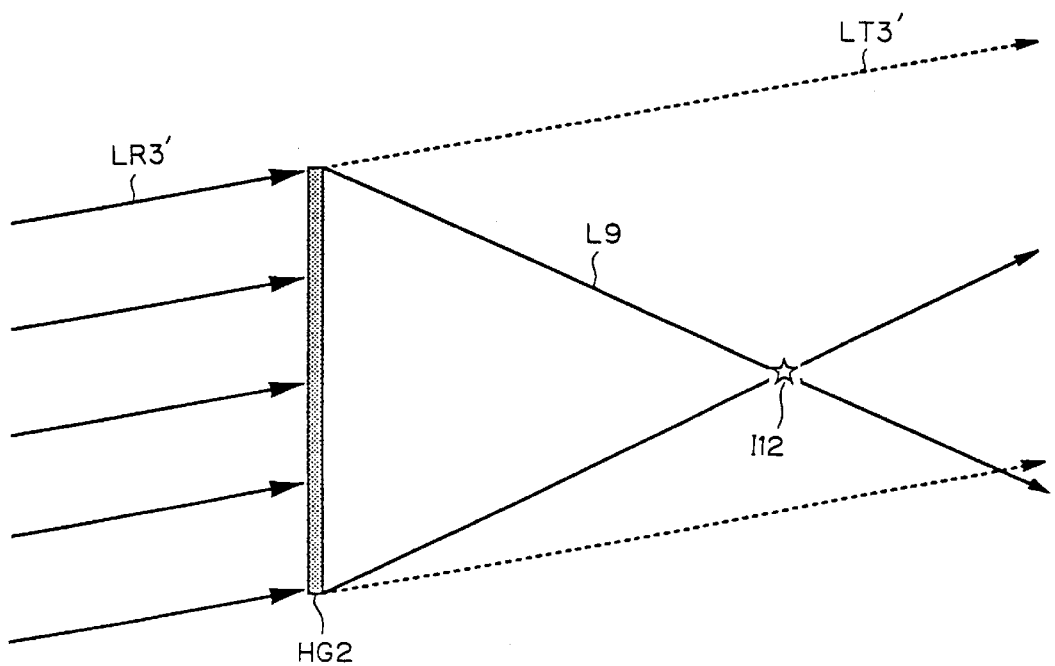
FIG. 56 shows a method for forming a reproduced image of a point-image hologram prepared by the optical system shown in FIG. 55.

When the recorded point-image hologram HG2 is illuminated by a plane-wave beam LR3' (FIG. 56) whose propagating direction is reverse to that of a plane-wave beam LR3 (FIG. 55), a diffracted beam L9 is produced and forms a real point-image I2 at a position whereat the diffusing plate was placed.

Figure 57:
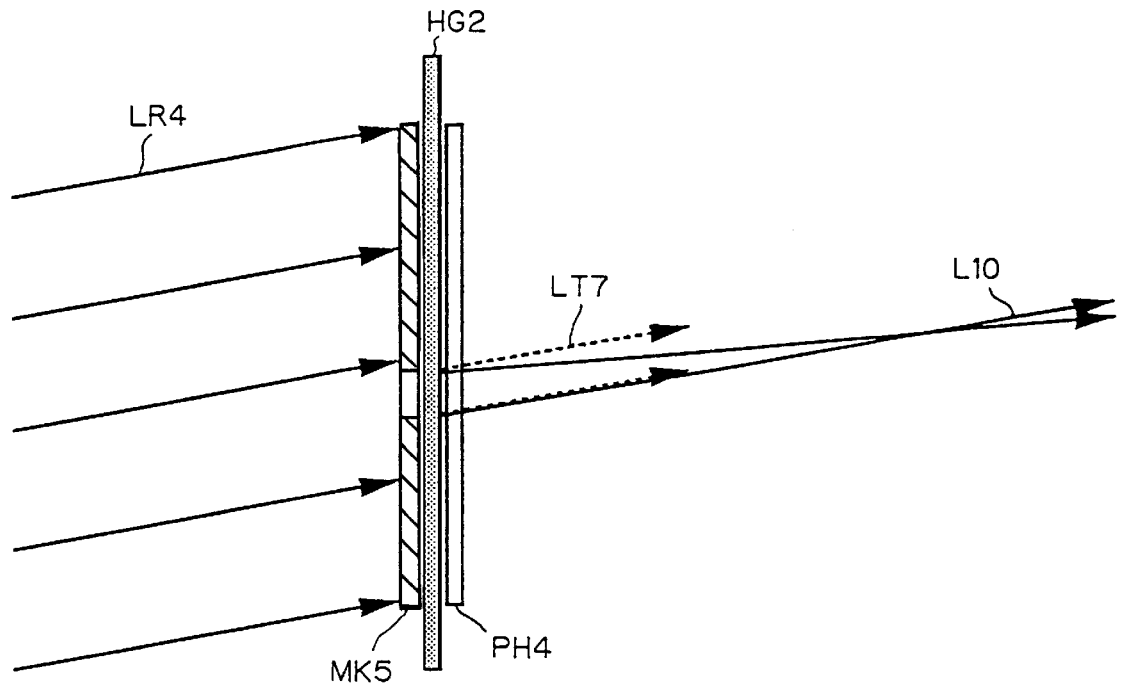
FIG. 57 shows an optical system for producing an elementary hologram prepared by the optical system shown in FIG. 55.

As shown in FIG. 57, thus acting point-image hologram HG2 is sandwiched between a hologram recording material PH4 and a mask MK5 having an opening whose position is different from that of the mask shown in FIG. 54. With radiation of a plane-wave beam LR4 through the mask MK5, a transmitted beam LT7 and a diffracted beam L10 from the point-image hologram HG2 form a two-beam interference pattern which is recorded on an unexposed portion of the hologram recording material PH4 as an elementary hologram.

Figure 58:
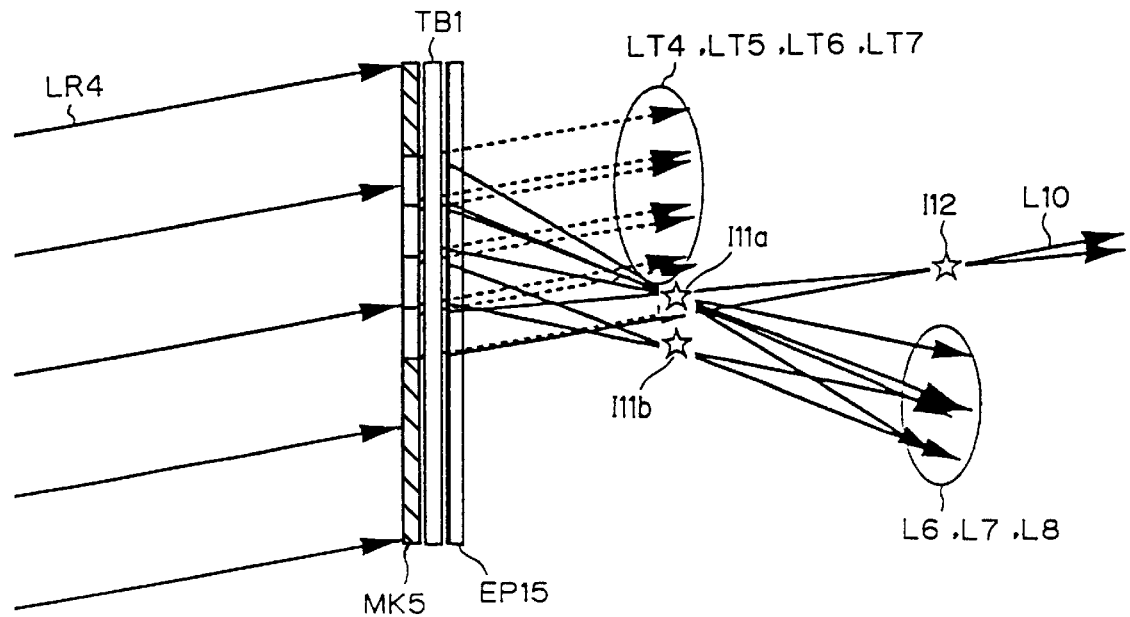
FIG. 58 shows an optical system for reproducing an elementary hologram synthesized from holograms of FIGS. 54 and 57.

A thus prepared elementary hologram panel EP15 is placed in a position shown in FIG. 58 and can reproduce another distant point-image I12 in addition to two point-images I11a and I11b (FIG. 54).

A plurality of master holograms of point-images having different depths are prepared by discretely changing a distance between the hologram recording material PH1 and the diffusing plate D1 (FIG. 55), then elementary holograms for reproducing point-images at different distant positions in a depth direction can be prepared by repeating the above-described procedure with the master holograms.

Furthermore, a number of elementary holograms for dividing a visible area of each of different distant point-images are recorded on a whole surface of a hologram recording material by applying the method shown in FIG. 49 as well as a plurality of elementary holograms for reproducing point-images in different two-dimensional planes being parallel to the elementary hologram panel are recorded on a whole surface of the hologram recording material by applying the method shown in FIG. 53.

A total procedure including the above-mentioned methods is as follows:

First step is to prepare a plurality of holograms for reproducing point-images at different levels and tightly sandwich an unexposed hologram recording materiel between each point-image hologram and a liquid-crystal spatial light-modulator.

The point-image hologram is moved in its spatial plane. The transmittance of suitably selected pixel openings of a whole surface of the liquid-crystal spatial light-modulator is increased to allow light for satisfactorily exposing the hologram recording material, thus copying point-image holograms thereto. When the point-image hologram moved all over the plane of the hologram recording material and all point-image holograms were copied thereon, the point-image hologram is replaced by another one and, then, the same copying procedure is repeated. As the result of the repeated operations, an elementary hologram panel EP6 is prepared and can reproduce a three-dimensional group of point-images images set in a space above the elementary hologram panel EP6 as shown in FIG. 41.

Eighth Embodiment

A three-dimensional image display device which is the eighth embodiment of the present invention and which uses a transmission type elementary hologram panel made by the procedure described in the seventh embodiment will be explained below.

Figure 59:
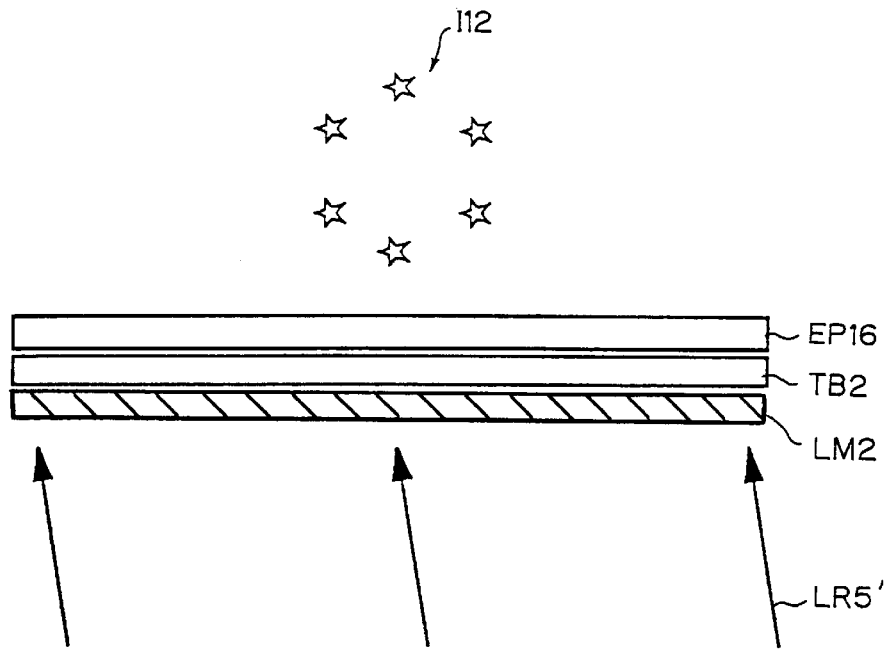
FIG. 59 is a construction view of a three-dimensional image display device using transmission type elementary holograms according to the present invention.

In FIG. 59, a transparent substrate TB2 (which has the same refractive index and thickness as the transparent substrate TB1 used when preparing the elementary hologram panel by the seventh embodiment) is sandwiched between an elementary hologram panel EP16 and a liquid crystal spatial light-modulator LM2. When plane-wave light RL5' enters into the liquid-crystal spatial light-modulator LM2, the latter LM2 selects illumination or non-illumination for each elementary hologram and reproduces a circular image I12 in a space above the elementary hologram panel EP16.

In this instance, the elementary hologram panel EP16 contains elementary holograms which can reproduce discrete point-images in a limited three-dimensional space above the elementary hologram panel EP16 as shown in FIG. 41. The liquid-crystal spatial light-modulator LM2 can control every elementary hologram to be reproduced (illuminated) or not to be reproduced (illuminated) by controlling the transmittance of its pixel openings each of which corresponds to one of the elementary holograms in the elementary hologram panel EP16.

A circular image shown in FIG. 59 can be represented above the elementary hologram panel when element holograms for reproducing point-images composing the circle are selected, only corresponding pixel openings are lightened (by increasing their transmittance) and other pixel openings are shut off (by reducing their transmittance to zero) by the liquid-crystal spatial light-modulator LM2.

When all elementary holograms corresponding to respective point-images are reproduced, all point-images obtain a widened visible area and normally hidden point-images appear. To solve this problem, the shown device conducts the following hidden point/line processing:

The procedure of processing hidden points and lines is as follows:

Commonly in the cases of FIGS. 59 to 62, the bottom surface of the liquid-crystal spatial light-modulator LM2 is illuminated by a plane-wave beam LR5' which diameter is the same as the diameter of the modulator LM2. This is achieved by using a well known optical system (not shown). Namely, a coherent laser beam from a laser light source is enlarged by a combination of a microscope object lens and collimating lens for or a combination of a microscope object lens and a parabolic mirror.

Figure 60:
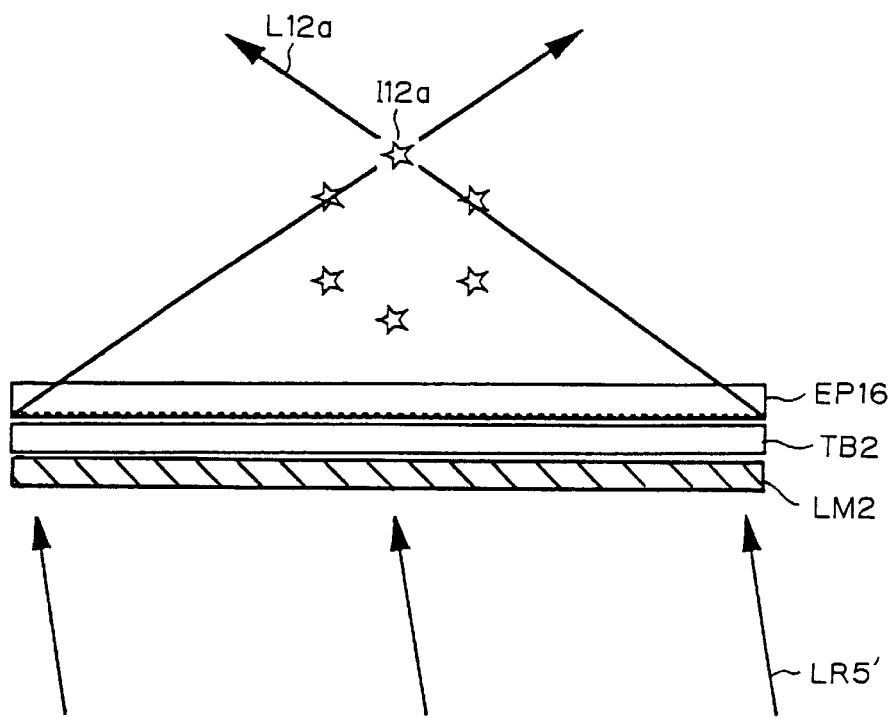
FIG. 60 shows is a view for explaining how to process hidden dots and lines, which is a part 1 of the explanation and illustrates a three-dimensional image display similar to that shown in FIG. 59.

In FIG. 60, a top point-image I12a, which is one of point-images forming a circular image and has a plurality of elementary holograms widely dispersed on a whole surface of an elementary hologram panel EP16, may be reproduced by reproducing all corresponding elementary holograms since a light beam from the reproduced point-image I12a does not transverse any other point-image. Therefore, the liquid-crystal spatial light-modulator LM2 selects and reproduces all relating elementary holograms of the top point-image I12a.

Figure 61:
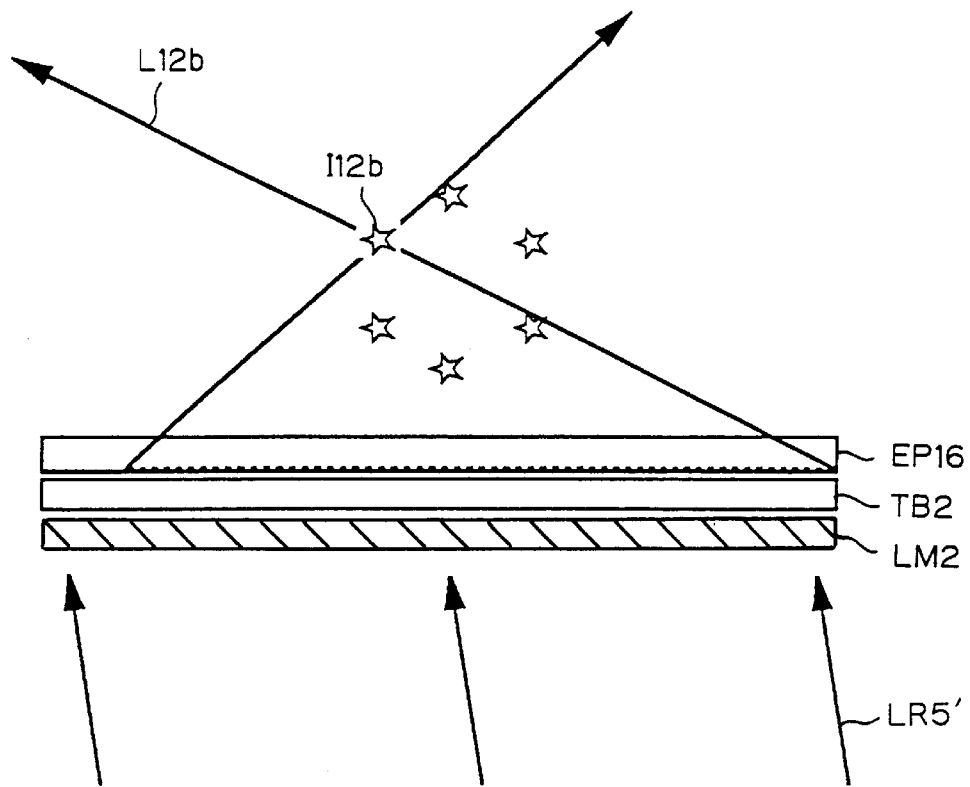
FIG. 61 is a view for explaining how to process hidden dots and lines, which is a part 2 of the explanation and illustrates a three-dimensional image display similar to that shown in FIG. 59.

In FIG. 61, a second (from the top) point-image 112b may be reproduced after processing hidden points and lines by the following method:

In this case, the second point-image 112b can be reproduced by selecting and reproducing all elementary holograms which relate to the second image point 112b and exist on a right-side area (dotted-line portion of the panel EP16 shown in FIG. 61) since light (diffracted light I12b) from the reproduced second point-image I12b does not cross any other point-image and can not be seen through any other point image. Accordingly, it is possible to process the hidden points and lines in relation to this point image I12b.

Figure 62:
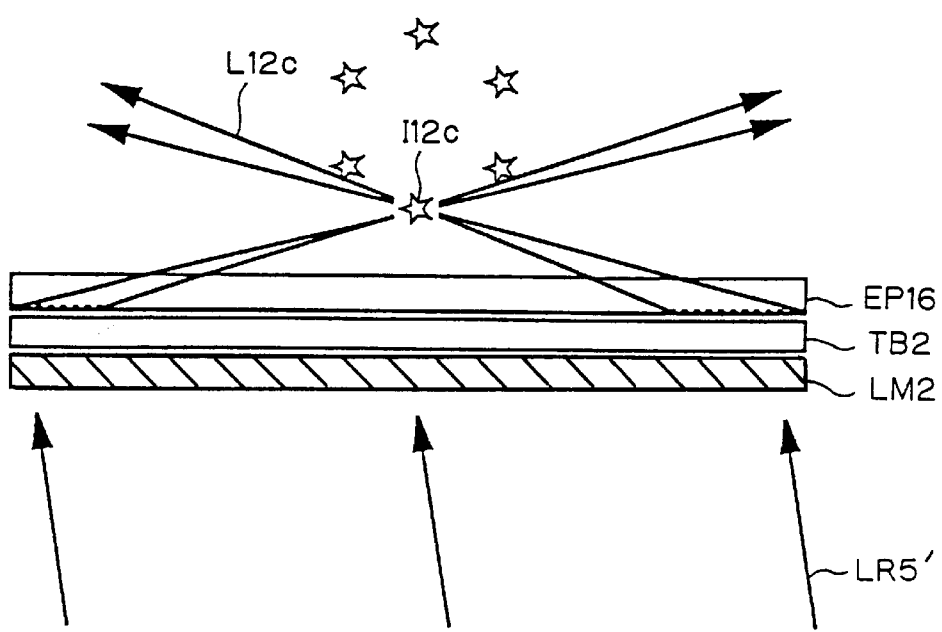
FIG. 62 is a view for explaining how to process hidden dots and lines, which is a part 3 of the explanation and illustrates a three-dimensional image display similar to that shown in FIG. 59.

Similarly, a bottom point image I12c may be reproduced by selecting and reproducing elementary holograms which exist on both end-side-areas (shown by a dotted line on the elementary hologram panel EP16) and correspond to the point-image 112c, as shown in FIG. 62.

Other point-images are produced in the same way and at the same time. As a result of this, no light-beam L7 from any one of the point images is found within the areas of respective point-images when viewing a whole reproduced image from the top side of the elementary hologram panel EP16 is shown in FIG. 46. Namely, a three-dimensional circular image can be visually recognized with processed hidden points and lines.

As described above, the three-dimensional image display device provided with the elementary hologram panel according to the present invention can reproduce any desired three-dimensional image with processed hidden points and lines (without appearing hidden points and lines) above the transmission-side of the elementary hologram panel.

Although transmitted zero-order light is not shown in related figures, it may be brought out of visible area by slanting incident plane-wave light relative to the liquid-crystal spatial light-modulator.

An elementary hologram panel having a high first-order diffraction efficiency may be prepared on a thick sheet of hologram-recording material such as photopolymer HRF700X001-10 (made by Doupon Company), which can effectively reduce the intensity of zero-order transmitted light.

Data on a three-dimensional image to be reproduced may be previously stored in a memory by using electronic means or may be computed by a computer. The data is transferred to a driver (not shown) of the liquid-crystal spatial light-modulator that can realize real time representation of a three-dimensional image. This feature enables three-dimensional moving picture display.

Ninth Embodiment

Figure 63:
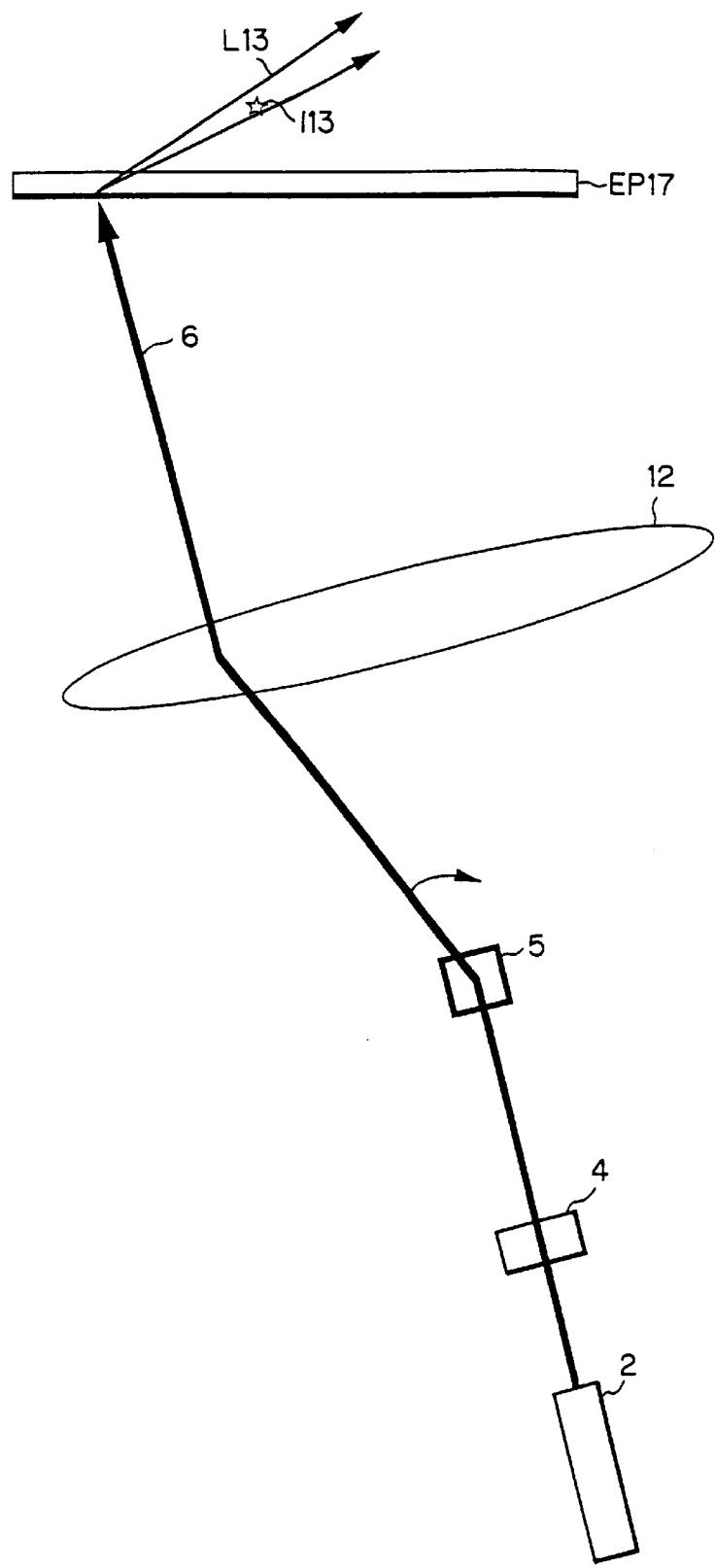
FIG. 63 is a construction view of a light-beam deflection type three-dimensional image display device which uses a transmission type elementary hologram panel.

While the eighth embodiment uses the liquid-crystal spatial light-modulator to select and reproduce necessary elementary holograms on the elementary hologram panel, the selection of elementary holograms to be reproduced can be also realized by using the following embodiment which uses a high-speed X-Y laser scanning optical system (which is, as shown in FIG. 63, composed of a light-beam deflector 5 and lens 12) in combination with a light-beam intensity modulator 4.

In this case, the light-beam intensity modulator 4 not only selects transmission or non-transmission of light but also can control transmittance of light, thus changing the intensity of diffracted light L13 for reproducing a point-image. Namely, the brightness of each reproduced image 113 can be adjusted.

The operation of the light-beam intensity modulator 4 is synchronized with the scanning operation of the light-deflector 5 by synchronizing means (not shown). The light-beam intensity modulator 5 determines elementary holograms necessary to be reproduced and brightness of reproduced light on the basis of three-dimensional image data stored by means of a suitable electronic device.

The light-beam deflector 5 performs high-speed horizontal and vertical (X-Y) scans of a plane-wave light-beam 6 having an intensity modulated by the light-beam intensity modulator 4. This light-beam deflector 5 is disposed at a distance of the focal length from the optical lens 12.

The light 6 deflected by the light-beam deflector 5 is directed to an elementary hologram panel EP17 in such a way that it may fall onto the elementary hologram panel EP17 at a substantially right angle thereto. Thus, the shown system can conduct raster scanning of all elementary holograms on the elementary hologram panel EP17 with plane-wave light 6.

A three-dimensional image with processed hidden points and lines according to the present system can be represented on the same principle as described with the eighth embodiment. The further description is therefore omitted.

Although light beams are illustrated as falling perpendicularly to the elementary hologram panel EP17 in the related drawings, this embodiment in contrast to the eighth embodiment has no liquid-crystal spatial light-modulator for selecting elementary holograms to be reproduced and can, therefore, slant the incident light to the elementary hologram panel so as to bring zero-order diffracted light from each elementary hologram out of a visible area of an image to be reproduced.

However, in the case of preparing an elementary hologram panel, the liquid-crystal spatial-light-modulator can not be used as a masking device for the above-mentioned purpose because it has usually inferior diffraction characteristics for slant incident light. In this instance, it is desirable to a fixed mask having openings made therein.

As described above, this embodiment can display a three-dimensional image with processed hidden points and lines on an elementary hologram panel according to the image data held by electronic means and can realize real-time rewriting.

In the above-mentioned embodiment with the transmission type elementary hologram panel, incident light of plane wave is slanted in relation to the liquid-crystal spatial light-modulator so as to guide zero-order diffraction transmitted light out of the visible area of the three-dimensional image. It is possible to introduce incident light at a right angle to the liquid-crystal spatial light-modulator if the zero-order diffraction efficiency of the elementary hologram panel is small enough not to affect visual recognition of a reproduced three-dimensional image. In this case, there is no need of using a transparent substrate TB1, TB2 in FIGS. 50, 52, 54, 58, 59, 60, 61, and 62.

(1) An embodiment of the present invention is capable of controlling light illumination of each of plural diffraction elements composing a screen panel by control means on the basis of three-dimensional image data, eliminating the needs of calculating on interference patterns, i.e., the necessity of a large capacity memory and transmission facility for storing and transmitting a large number of data computed by the computer. It can, therefore, reproduce a wide three-dimensional image.

Furthermore, this embodiment is capable of controlling light acting upon each of diffracting elements made according to the three-dimensional image data so that respective diffraction elements may represent different point-images according to their characteristics, and of controlling output light by control means. By thus adapting the control means to the object, the embodiment can represent a three-dimensional image with an increased natural reality. For example, it is possible to control diffracted light not to be directed towards a part of a three-dimensional image, which must be hidden (invisible) in practice from a viewing point. Consequently, the embodiment can provide three-dimensional images of many kinds of objects to be viewed from any directions, which can be used in wide fields of application.

Furthermore, point-images reproduced by diffracting elements are displayed in a space apart from the screen panel which, therefore, does not require to be moved. Namely, the screen has no moving portion, thus assuring the safety of users and widening its application field.

(2) Another embodiment of the present invention can provide, in addition to the features of the embodiment (1), such a feature that a visible area of each point-image can be divided and a visible area of a total image can be also distributed to plural diffraction elements composing a screen panel. This feature enables processing hidden points and lines and representing various kinds of images by selecting display conditions for each diffracting element.

(3) Another embodiment of the present invention can provide, in addition to the features of the embodiments (1) and (2), such a feature that modulated-light generating means comprises means for generating coherent light-beams, light-modulating means for modulating the coherent light-beams and two-dimensional scanning means, which can be supplied as separate functional available and interchangeable parts.

(4) Another embodiment of the present invention can provide, in addition to the features of the embodiment (3), such a feature that scanning means for two-dimensionally scanning can scan the screen panel with parallel light beams repeatedly within a specified scanning area and thereby allows effective use of displaying surface of the screen panel by the light beams while scanning the screen panel. This can increase the efficiency of using a space of the device, making it easier to prepare necessary elementary holograms.

(5) Another embodiment of the present invention can provide, in addition to the features of the embodiments (1) to (4), such a feature that elementary holograms prepared by the holographic technique are used as diffraction elements, thereby a screen panel can be composed of the diffraction elements which can output wave fronts of diffracted light in the specified direction under the same conditions as they have manufactured and which are easy to prepare and have excellent characteristics.

(6) Another embodiment of the present invention can provide, in addition to the features of the embodiment (5), such a feature that a liquid-crystal spatial light-modulator is used as a component of a modulated-light generating system which is thereby simplified in construction (with the saved components).

(7) Another embodiment of the present invention can provide, in addition to the features of the embodiments (5) and (6), such a feature that an optical system enlarges the diameter of light from a coherent light generating source, a liquid-crystal spatial light-modulator disposed in the optical path of the optical system modulates spatial transmittance of the enlarged light and guides the modulated light into a required area of a reflection type elementary hologram panel which contains point-image holograms recorded as dot-like patterns with divided visible areas on a substrate and which in turn reproduces the holograms held by electronic means and represents a three-dimensional real image with processed hidden elements above the incident side of the elementary hologram panel.

(8) Another embodiment of the present invention can provide, in addition to the features of the embodiments (5) and (6), such a feature that an optical system enlarges the diameter of light from a coherent light generating source, a liquid-crystal spatial light-modulator disposed in the optical path of the optical system modulates spatial transmittance of the enlarged light and guides the modulated light into a required area of a transmission type elementary hologram panel which contains point-image holograms recorded as dot-like patterns with divided visible areas on a substrate and which in turn reproduces the holograms held by electronic means and represents a three-dimensional real image with processed hidden elements above the light-outgoing side of the elementary hologram panel.

(9) Another embodiment of the present invention can provide, in addition to the features of the embodiment (8), such a feature that a transparent substrate (which refractive index and thickness are the same as those of a transparent substrate used for preparing the element hologram) is interposed between the liquid-crystal spatial modulator and the elementary hologram panel, thereby the enlarged light can be entered at a slant angle into the liquid-crystal spatial modulator so that zero-order diffracted light unnecessary for producing a three-dimensional image can be brought out of a visible area.

(10) Another embodiment of the present invention can provide, in addition to the features of the embodiments (1) to (9), such a feature that the screen panel is composed of two or more sheets of screen panels overlaid on each other so that it can represent more point-images and a larger three-dimensional image thereon. This enables the provision of a color-display screen panel having, improved characteristics to be widely applied.

(11) Another embodiment of the present invention can provide, in addition to the features of the embodiments (1) to (10), such a feature that the screen panel has a curved surface for representing an increased visible area.

(12) Another embodiment of the present invention can provide, in addition to the features of the embodiments (1) to (11), such a feature that a light-diffusing plate capable of acting upon light beams forming a three-dimensional image is provided to obtain a wider visible area by saved diffracting elements and to represent more point-images and a larger three-dimensional image there on. (13) Another embodiment of the present invention can provide, in addition to the features of the embodiments (1) to (12), such a feature that each elementary hologram in the elementary hologram panel can represent a plurality of point-images and, thereby, can display more point-images and a larger three-dimensional image thereon.

(14) Another embodiments of the present invention can provide a method for preparing an elementary hologram panel, which is featured in that elementary holograms forming a point-image in a three-dimensional space are recorded on a specified area of elementary hologram panel by holographically exposing through a mask having openings made according to a desired distribution pattern, thereby the reflection type elementary holograms of the point-image with a divided visible area can be easily prepared, and hologram preparing process is also simplified and can obtain accurate elementary holograms by using a flat plate type hologram as a reflecting element which functions as a concave (parabolic) mirror for preparing the elementary holograms.

(15) Another embodiments of the present invention can provide a method for preparing an elementary hologram panel, which is featured in that elementary holograms forming a point-image in a three-dimensional space are recorded on a specified area of elementary hologram panel by holographically exposing through a mask having openings made according to a desired distribution pattern, thereby the transmission type elementary holograms of the point-image with a divided visible area can be easily prepared, and hologram preparing process is also simplified and can obtain accurate element holograms by using a flat plate type hologram as a reflecting element which functions as a concave (parabolic) mirror for preparing the elementary holograms.

(16) Another embodiment of the present invention can provide a method for preparing an elementary hologram panel, which has, in addition to the features of the embodiment (14) and (15), such a feature that a previously prepared reflection-type point-image hologram as a master hologram (or a reflecting mirror being capable of reflecting and collecting incident plane-wave light at a point) is laid on an unused hologram recording material covered with a liquid-crystal spatial light-modulator, a whole surface of the liquid-crystal spatial light-modulator is illuminated by plane-wave light and, then, the transmittance of desired pixel openings of the liquid-crystal spatial light-modulator is increased so that an interference patterns formed by the plane-wave light and the reflected and collected light (diffracted by point-image holograms) can be accurately recorded only on a specified area of the elementary hologram panel, which area corresponds to an opening (with an increased transmittiviy) of the liquid-crystal spatial light-modulator. This method can also realize real-time rewriting of a master pattern by the liquid-crystal spatial light-modulator: a reflection-type point-image hologram with a divided visible area can be easily recorded as dot-like elements on the elementary hologram recording material.

We claim:

1. A three-dimensional image display device comprising:
a screen panel,
modulated-light generating means for generating coherent light and being capable of designating illuminating places on the screen panel and modulations for the illuminating places, data inputting means for inputting data on three-dimensional image to be displayed and image display control means for controlling the modulated-light generating means according to the data of the three-dimensional image entered by the data inputting means, wherein the screen panel is composed of a plurality of diffraction elements prepared according to data of a three-dimensional image to be displayed, the image display control means controls the modulated-light generating means to illuminate the diffraction elements by modulated coherent light beams respectively, and wherein plural diffraction elements composing the screen panel form a same point-image and respective diffraction elements of the plural diffraction elements divide a visible area of the three-dimensional image to be displayed.

2. A three-dimensional image display device as defined in claim 1, wherein the modulated-light generating means comprises means for generating coherent light-beams, light-modulating means for modulating the coherent light-beams and scanning means for two-dimensionally scanning with the light-beams from the modulating means.

3. A three-dimensional image display device as defined in claim 2, wherein the scanning means for two-dimensionally beam scanning scans the screen panel in the normal direction to the screen panel with parallel light-beams.

4. A three-dimensional image display device as defined in any one of claims 1, 2 or 3, wherein the diffraction elements are elementary holograms.

5. A three-dimensional image display device as defined in claim 4, wherein the modulated-light generating means comprises a light source for generating coherent light, an optical system for enlarging a diameter of a light beam from the light source and a liquid crystal spatial modulator being capable of regulating transmission ratio and disposed in a path of a light beam enlarged in diameter by the optical system, and the screen panel composed of the diffracting elements being elementary holograms and the liquid-crystal spatial modulator are integrated with each other.

6. A three-dimensional image display device as defined in claim 4, wherein the screen panel composed of the diffracting elements being elementary holograms is made of reflection-type.

7. A three-dimensional image display device as defined in claim 4, wherein the screen panel composed of the diffracting elements being elementary holograms is made of transmission type.

8. A three-dimensional image display device as defined in claim 7, wherein a transparent substrate is interposed between the liquid-crystal spatial modulator and the screen panel composed of the diffracting elements being elementary holograms.

9. A three-dimensional image display device as defined in any one of claims 1, 2 or 3, wherein the screen panel is composed of two or more sheets of screen panels overlaid on each other.

10. A three-dimensional image display device as defined in any one of claims 1, 2 or 3, wherein the screen panel has a curved surface.

11. A three-dimensional image display device as defined in any one of claims 1, 2 or 3, wherein a light-diffusing plate for effecting light beams forming a three-dimensional image is added.

12. A three-dimensional image display device as defined in claim 4, wherein each elementary hologram in the elementary hologram panel can represent a plurality of point-images.

13. A method for preparing an elementary hologram panel composed of a plurality of elementary holograms, each hologram serving as an optical element, which comprises steps of:

tightly disposing a hologram recording material between a reflection optical element for reflecting and focusing incident plane-wave light at a point and a mask covering the reflecting optical element and having a plurality of openings made therein according to a specified distribution pattern; illuminating the masked side of the recording material by coherent light; and exposing the hologram recording material by light entered through the openings in the mask and light entered through the openings in the mask and then reflected by the reflecting optical element to form a record of a dot-like pattern on the hologram recording material according to the opening pattern of the mask.

14. A method for preparing an elementary hologram panel as defined in claim 13, wherein a reflection-type hologram is used as the reflecting optical element.

\* \* \* \* \*